(12) United States Patent
Towler et al.

(10) Patent No.: US 12,527,691 B2
(45) Date of Patent: Jan. 20, 2026

(54) FLUID DRAINAGE DEVICES, SYSTEMS, AND METHODS

(71) Applicant: W. L. Gore & Associates, Inc., Newark, DE (US)

(72) Inventors: Jeffrey C. Towler, Wilmington, DE (US); Peter J. Roeber, Oxford, PA (US); Kevin M. Savory, West Grove, PA (US)

(73) Assignee: W. L. Gore & Associates, Inc., Newark, DE (US)

( * ) Notice: Subject to any disclaimer, the term of this patent is extended or adjusted under 35 U.S.C. 154(b) by 507 days.

(21) Appl. No.: 17/980,417

(22) Filed: Nov. 3, 2022

(65) Prior Publication Data

US 2023/0142433 A1     May 11, 2023

Related U.S. Application Data

(60) Provisional application No. 63/276,170, filed on Nov. 5, 2021.

(51) Int. Cl.
*A61F 9/007* (2006.01)
*A61F 9/00* (2006.01)
*A61M 27/00* (2006.01)

(52) U.S. Cl.
CPC ........ *A61F 9/00781* (2013.01); *A61F 9/0017* (2013.01); *A61M 27/002* (2013.01); *A61M 2210/0612* (2013.01)

(58) Field of Classification Search
CPC . A61F 9/00781; A61F 9/0017; A61M 27/002; A61M 2210/0612; A61M 27/00; A61M 2027/004; A61M 27/006
See application file for complete search history.

(56) References Cited

U.S. PATENT DOCUMENTS 3,618,604 A   11/1971  Ness
3,683,928 A    8/1972  Kuntz
(Continued)

FOREIGN PATENT DOCUMENTS

AU       06600/12 B2    6/1995
AU     2014280907 A1    1/2015
(Continued)

OTHER PUBLICATIONS

Doble, M., Makadia, N., Pavithran, S., & Kumar, R. S. (2008). Analysis of explanted ePTFE cardiovascular grafts (modified BT shunt). Biomedical Materials, 3(3), 034118. (Year: 2008).*
(Continued)

*Primary Examiner* — Adam Marcetich
(74) *Attorney, Agent, or Firm* — Nelson Mullins Riley & Scarborough LLP

(57) ABSTRACT

A glaucoma shunt for draining a fluid from an eye to a tissue surrounding the eye, the glaucoma shunt being implantable within tissue of the eye, the glaucoma shunt includes a shunt body that is formed from a microporous material that is arranged so as to form a reservoir within the shunt body; and a conduit in fluid communication with the reservoir, the conduit being insertable into the eye such that the fluid at a distal end of the conduit is allowed to flow through the conduit and accumulate within the reservoir, wherein the microporous material transitions from a hydrophobic state to a hydrophilic state as the fluid that is accumulated in the reservoir diffuses to the tissue surrounding the eye through the microporous material so as to provide a variable flow resistance as the microporous material transitions from the hydrophobic state to the hydrophilic state.

78 Claims, 24 Drawing Sheets

(56) References Cited

U.S. PATENT DOCUMENTS

| | | | |
|---|---|---|---|
| 3,828,777 | A | 8/1974 | Ness |
| 3,960,150 | A | 6/1976 | Hussain et al. |
| 3,962,414 | A | 6/1976 | Michaels |
| 4,014,335 | A | 3/1977 | Arnold |
| 4,182,342 | A | 1/1980 | Smith |
| 4,186,184 | A | 1/1980 | Zaffaroni |
| 4,554,918 | A | 11/1985 | White |
| 4,579,221 | A | 4/1986 | Corella |
| 4,729,761 | A | 3/1988 | White |
| 4,759,759 | A | 7/1988 | Walker et al. |
| 5,026,395 | A * | 6/1991 | Nakajima ............. A61F 2/1613 623/6.57 |
| 5,037,434 | A | 8/1991 | Lane |
| 5,147,647 | A | 9/1992 | Darougar |
| 5,163,955 | A | 11/1992 | Love et al. |
| 5,282,851 | A | 2/1994 | Jacob-LaBarre |
| 5,378,475 | A | 1/1995 | Smith et al. |
| 5,423,777 | A | 6/1995 | Tajiri et al. |
| 5,476,445 | A | 12/1995 | Baerveldt et al. |
| 5,676,679 | A | 10/1997 | Simon et al. |
| 5,681,275 | A | 10/1997 | Ahmed |
| 5,702,414 | A | 12/1997 | Richter et al. |
| 5,708,044 | A | 1/1998 | Branca |
| 5,713,953 | A | 2/1998 | Vallana et al. |
| 5,773,019 | A | 6/1998 | Ashton et al. |
| 5,861,028 | A | 1/1999 | Angell |
| 5,882,327 | A | 3/1999 | Jacob |
| 5,928,281 | A | 7/1999 | Huynh et al. |
| 5,935,163 | A | 8/1999 | Gabbay |
| 6,050,970 | A | 4/2000 | Baerveldt |
| 6,074,419 | A | 6/2000 | Healy et al. |
| 6,086,612 | A | 7/2000 | Jansen |
| 6,142,969 | A | 11/2000 | Nigam |
| 6,171,335 | B1 | 1/2001 | Wheatley et al. |
| 6,174,331 | B1 | 1/2001 | Moe et al. |
| 6,186,974 | B1 | 2/2001 | Allan et al. |
| 6,197,143 | B1 | 3/2001 | Bodnar |
| 6,254,636 | B1 | 7/2001 | Peredo |
| 6,261,256 | B1 | 7/2001 | Ahmed |
| 6,283,995 | B1 | 9/2001 | Moe et al. |
| 6,287,338 | B1 | 9/2001 | Sarnowski et al. |
| 6,364,905 | B1 | 4/2002 | Simpson et al. |
| 6,432,542 | B1 | 8/2002 | Tsai |
| 6,450,984 | B1 | 9/2002 | Lynch et al. |
| 6,471,689 | B1 | 10/2002 | Joseph et al. |
| 6,541,589 | B1 | 4/2003 | Baillie |
| 6,562,069 | B2 | 5/2003 | Cai et al. |
| 6,562,446 | B1 | 5/2003 | Totsuka |
| 6,613,086 | B1 | 9/2003 | Moe et al. |
| 6,613,087 | B1 | 9/2003 | Healy et al. |
| 6,696,526 | B1 | 2/2004 | Kaulbach et al. |
| 6,699,210 | B2 | 3/2004 | Williams et al. |
| 6,699,211 | B2 | 3/2004 | Savage |
| 6,713,081 | B2 | 3/2004 | Robinson et al. |
| 6,881,197 | B1 | 4/2005 | Nigam |
| 6,994,666 | B2 | 2/2006 | Shannon et al. |
| 7,018,404 | B2 | 3/2006 | Holmberg et al. |
| 7,261,732 | B2 | 8/2007 | Justino |
| 7,306,729 | B2 | 12/2007 | Bacino et al. |
| 7,320,705 | B2 | 1/2008 | Quintessenza |
| 7,331,993 | B2 | 2/2008 | White |
| 7,361,189 | B2 | 4/2008 | Case et al. |
| 7,462,675 | B2 | 12/2008 | Chang et al. |
| 7,531,611 | B2 | 5/2009 | Sabol et al. |
| 7,604,663 | B1 | 10/2009 | Reimink et al. |
| 7,833,565 | B2 | 11/2010 | O'Connor et al. |
| 7,862,610 | B2 | 1/2011 | Quintessenza |
| 7,883,717 | B2 | 2/2011 | Varner et al. |
| 8,216,631 | B2 | 7/2012 | O'Connor et al. |
| 8,219,229 | B2 | 7/2012 | Cao et al. |
| 8,246,676 | B2 | 8/2012 | Acosta et al. |
| 8,267,994 | B2 | 9/2012 | Jin |
| 8,273,101 | B2 | 9/2012 | Garcia et al. |
| 8,303,647 | B2 | 11/2012 | Case |
| 8,399,006 | B2 | 3/2013 | De Juan, Jr. et al. |
| 8,545,430 | B2 | 10/2013 | Silvestrini |
| 8,556,960 | B2 | 10/2013 | Agnew et al. |
| 8,623,395 | B2 | 1/2014 | De et al. |
| 8,632,489 | B1 | 1/2014 | Ahmed |
| 8,637,144 | B2 | 1/2014 | Ford |
| 8,690,939 | B2 | 4/2014 | Miller et al. |
| 8,834,406 | B2 | 9/2014 | Snyder et al. |
| 8,834,911 | B2 | 9/2014 | Glezer et al. |
| 8,888,734 | B2 | 11/2014 | Nissan et al. |
| 8,961,593 | B2 | 2/2015 | Bonhoeffer et al. |
| 8,961,599 | B2 | 2/2015 | Bruchman et al. |
| 8,961,600 | B2 | 2/2015 | Nissan et al. |
| 9,139,669 | B2 | 9/2015 | Xu et al. |
| 9,155,610 | B2 | 10/2015 | Soletti et al. |
| 9,155,618 | B2 | 10/2015 | Kalmann et al. |
| 9,216,108 | B2 | 12/2015 | Jain et al. |
| 9,259,313 | B2 | 2/2016 | Wheatley |
| 9,301,835 | B2 | 4/2016 | Campbell et al. |
| 9,301,837 | B2 | 4/2016 | Beith |
| 9,326,891 | B2 | 5/2016 | Horvath et al. |
| 9,364,322 | B2 | 6/2016 | Conklin et al. |
| 9,370,444 | B2 | 6/2016 | Cunningham, Jr. |
| 9,375,347 | B2 | 6/2016 | Stergiopulos |
| 9,539,089 | B2 | 1/2017 | Beith |
| 9,572,713 | B2 | 2/2017 | Lind et al. |
| 9,636,219 | B2 | 5/2017 | Keidar et al. |
| 9,636,254 | B2 | 5/2017 | Yu et al. |
| 9,655,720 | B2 | 5/2017 | Bluestein et al. |
| 9,675,453 | B2 | 6/2017 | Guttenberg et al. |
| 9,833,314 | B2 | 12/2017 | Corbett |
| 9,849,629 | B2 | 12/2017 | Zagl et al. |
| 9,987,120 | B2 | 6/2018 | Soletti et al. |
| 9,999,500 | B2 | 6/2018 | Greenslet et al. |
| 10,052,200 | B2 | 8/2018 | Chung et al. |
| 10,195,023 | B2 | 2/2019 | Wrobel |
| 10,299,915 | B2 | 5/2019 | Edelman et al. |
| 10,307,292 | B2 | 6/2019 | Litvin |
| 10,398,593 | B2 | 9/2019 | Erickson et al. |
| 10,398,707 | B2 | 9/2019 | Hughes |
| 10,413,402 | B2 | 9/2019 | Squara |
| 10,413,403 | B2 | 9/2019 | Boden et al. |
| 10,426,609 | B2 | 10/2019 | Edelman et al. |
| 10,433,955 | B2 | 10/2019 | Edelman et al. |
| 10,512,537 | B2 | 12/2019 | Corbett et al. |
| 10,588,746 | B2 | 3/2020 | Bernstein et al. |
| 10,603,164 | B2 | 3/2020 | Girard et al. |
| 10,849,731 | B2 | 12/2020 | Cully et al. |
| 10,959,941 | B2 | 3/2021 | Haffner |
| 11,351,058 | B2 | 6/2022 | Roeber et al. |
| 11,406,533 | B2 | 8/2022 | Roeber et al. |
| 11,523,940 | B2 | 12/2022 | Roeber et al. |
| 2002/0106395 | A1 | 8/2002 | Brubaker |
| 2002/0110635 | A1 | 8/2002 | Brubaker et al. |
| 2002/0156413 | A1 | 10/2002 | Williams et al. |
| 2002/0165478 | A1 | 11/2002 | Gharib et al. |
| 2002/0198594 | A1 | 12/2002 | Schreck |
| 2003/0014036 | A1 | 1/2003 | Varner et al. |
| 2003/0027332 | A1 | 2/2003 | Lafrance et al. |
| 2003/0088260 | A1 | 5/2003 | Smedley et al. |
| 2003/0094731 | A1 | 5/2003 | Simpson |
| 2003/0109923 | A1 | 6/2003 | Chinn et al. |
| 2003/0229303 | A1 | 12/2003 | Haffner et al. |
| 2004/0024345 | A1 | 2/2004 | Gharib et al. |
| 2004/0215333 | A1 | 10/2004 | Duran et al. |
| 2005/0085892 | A1 | 4/2005 | Goto et al. |
| 2005/0106211 | A1 | 5/2005 | Nelson et al. |
| 2005/0137538 | A1 | 6/2005 | Kunzler et al. |
| 2005/0171507 | A1 | 8/2005 | Christian et al. |
| 2005/0182350 | A1 | 8/2005 | Nigam |
| 2005/0228487 | A1 | 10/2005 | Kujawski |
| 2005/0234546 | A1 | 10/2005 | Nugent et al. |
| 2005/0250788 | A1 | 11/2005 | Tu et al. |
| 2005/0261759 | A1 | 11/2005 | Lambrecht et al. |
| 2005/0266047 | A1 | 12/2005 | Tu et al. |
| 2005/0267398 | A1 | 12/2005 | Protopsaltis et al. |
| 2005/0273033 | A1 | 12/2005 | Grahn et al. |
| 2006/0036207 | A1 | 2/2006 | Koonmen et al. |
| 2006/0109923 | A1 | 5/2006 | Cai et al. |
| 2006/0110429 | A1 | 5/2006 | Reiff et al. |

(56) References Cited

U.S. PATENT DOCUMENTS

| | | |
|---|---|---|
| 2006/0189917 A1 | 8/2006 | Mayr et al. |
| 2006/0195187 A1 | 8/2006 | Stegmann et al. |
| 2006/0258994 A1 | 11/2006 | Avery |
| 2007/0077270 A1 | 4/2007 | Wen |
| 2007/0078371 A1 | 4/2007 | Brown et al. |
| 2007/0083184 A1 | 4/2007 | Simpson |
| 2007/0088432 A1 | 4/2007 | Solovay et al. |
| 2007/0118147 A1 | 5/2007 | Smedley et al. |
| 2007/0207186 A1 | 9/2007 | Scanlon et al. |
| 2007/0293872 A1 | 12/2007 | Peyman |
| 2008/0071361 A1 | 3/2008 | Tuval et al. |
| 2008/0082161 A1 | 4/2008 | Woo |
| 2008/0091261 A1 | 4/2008 | Long et al. |
| 2008/0133005 A1 | 6/2008 | Andrieu et al. |
| 2008/0147021 A1* | 6/2008 | Jani ............... A61K 9/0051 604/288.01 |
| 2008/0200977 A1 | 8/2008 | Paul et al. |
| 2008/0264993 A1 | 10/2008 | Schulte et al. |
| 2008/0268314 A1 | 10/2008 | Han et al. |
| 2008/0312737 A1 | 12/2008 | Jin |
| 2009/0043321 A1 | 2/2009 | Conston et al. |
| 2009/0155326 A1 | 6/2009 | Mack et al. |
| 2009/0157175 A1 | 6/2009 | Benichou |
| 2009/0226731 A1 | 9/2009 | Wittmann et al. |
| 2009/0227933 A1 | 9/2009 | Karageozian |
| 2009/0240215 A1 | 9/2009 | Humayun et al. |
| 2009/0240320 A1 | 9/2009 | Tuval et al. |
| 2009/0299469 A1 | 12/2009 | Kollar |
| 2009/0325030 A1 | 12/2009 | Hamrock et al. |
| 2010/0015200 A1 | 1/2010 | Mcclain et al. |
| 2010/0082094 A1 | 4/2010 | Quadri et al. |
| 2010/0114006 A1 | 5/2010 | Baerveldt |
| 2010/0114307 A1 | 5/2010 | Agnew et al. |
| 2010/0114309 A1 | 5/2010 | De et al. |
| 2010/0119580 A1 | 5/2010 | Guo et al. |
| 2010/0137981 A1 | 6/2010 | Silvestrini et al. |
| 2010/0161040 A1 | 6/2010 | Braido et al. |
| 2010/0168644 A1 | 7/2010 | Brown |
| 2010/0168839 A1 | 7/2010 | Braido et al. |
| 2010/0185138 A1 | 7/2010 | Yaron et al. |
| 2010/0185277 A1 | 7/2010 | Braido et al. |
| 2010/0234793 A1* | 9/2010 | Dacey, Jr. ........ A61B 5/14546 604/8 |
| 2010/0241046 A1 | 9/2010 | Pinchuk et al. |
| 2010/0241241 A1* | 9/2010 | McKnight ............ A61F 2/04 623/24 |
| 2010/0259748 A1 | 10/2010 | Suzuki |
| 2011/0027579 A1 | 2/2011 | Tate |
| 2011/0028918 A1 | 2/2011 | Hartwell et al. |
| 2011/0066098 A1* | 3/2011 | Stergiopulos ....... A61F 9/00781 604/9 |
| 2011/0098640 A1 | 4/2011 | Horne et al. |
| 2011/0112620 A1 | 5/2011 | Du |
| 2011/0118835 A1 | 5/2011 | Silvestrini et al. |
| 2011/0196487 A1 | 8/2011 | Badawi et al. |
| 2011/0244014 A1 | 10/2011 | Williams et al. |
| 2011/0257738 A1 | 10/2011 | Corbett et al. |
| 2011/0270388 A9 | 11/2011 | Stevens |
| 2011/0275912 A1* | 11/2011 | Boyden ............... A61L 2/24 600/309 |
| 2011/0276128 A1 | 11/2011 | Cao et al. |
| 2011/0282440 A1 | 11/2011 | Cao et al. |
| 2011/0288635 A1 | 11/2011 | Miller et al. |
| 2012/0035525 A1 | 2/2012 | Silvestrini |
| 2012/0089073 A1 | 4/2012 | Cunningham, Jr. |
| 2012/0123315 A1 | 5/2012 | Horvath et al. |
| 2012/0123317 A1 | 5/2012 | Horvath et al. |
| 2012/0141914 A1 | 6/2012 | Namba et al. |
| 2012/0165720 A1 | 6/2012 | Horvath et al. |
| 2012/0197175 A1 | 8/2012 | Horvath et al. |
| 2012/0253453 A1 | 10/2012 | Bruchman et al. |
| 2012/0310137 A1 | 12/2012 | Silvestrini |
| 2012/0323315 A1 | 12/2012 | Bruchman et al. |
| 2013/0046379 A1 | 2/2013 | Paolitto et al. |
| 2013/0131577 A1 | 5/2013 | Bronstein et al. |
| 2013/0158381 A1 | 6/2013 | Rickard |
| 2013/0184810 A1 | 7/2013 | Hall et al. |
| 2013/0190868 A1* | 7/2013 | Kahook ............... A61F 2/1635 623/6.38 |
| 2013/0211314 A1 | 8/2013 | Venkatraman et al. |
| 2013/0218081 A1 | 8/2013 | Roth |
| 2013/0226330 A1 | 8/2013 | Sopori et al. |
| 2013/0274691 A1 | 10/2013 | De Juan, Jr. et al. |
| 2013/0317413 A1 | 11/2013 | Field et al. |
| 2013/0325024 A1 | 12/2013 | Nissan et al. |
| 2013/0325111 A1 | 12/2013 | Campbell et al. |
| 2014/0012371 A1 | 1/2014 | Li |
| 2014/0031927 A1 | 1/2014 | Bruchman et al. |
| 2014/0039468 A1 | 2/2014 | Dunn |
| 2014/0107776 A1 | 4/2014 | Williamson et al. |
| 2014/0114226 A1 | 4/2014 | Snyder et al. |
| 2014/0128960 A1 | 5/2014 | Greenslet et al. |
| 2014/0154321 A1 | 6/2014 | Ashton |
| 2014/0170204 A1 | 6/2014 | Desai et al. |
| 2014/0186420 A1 | 7/2014 | Utkhede et al. |
| 2014/0214158 A1 | 7/2014 | Board et al. |
| 2014/0236067 A1 | 8/2014 | Horvath et al. |
| 2014/0236068 A1 | 8/2014 | Van et al. |
| 2014/0243729 A1 | 8/2014 | Rynerson |
| 2014/0343475 A1 | 11/2014 | Smedley et al. |
| 2014/0343476 A1 | 11/2014 | Penhasi |
| 2014/0358224 A1 | 12/2014 | Tegels et al. |
| 2015/0005689 A1 | 1/2015 | Horvath et al. |
| 2015/0057595 A1 | 2/2015 | Gunn et al. |
| 2015/0119980 A1 | 4/2015 | Beith et al. |
| 2015/0224200 A1 | 8/2015 | De Juan, Jr. et al. |
| 2015/0224231 A1 | 8/2015 | Bruchman et al. |
| 2015/0320975 A1 | 11/2015 | Simpson et al. |
| 2015/0342875 A1 | 12/2015 | Haffner |
| 2015/0374545 A1 | 12/2015 | Horvath et al. |
| 2016/0000602 A1* | 1/2016 | Meng ............... A61F 9/0017 604/891.1 |
| 2016/0015516 A1 | 1/2016 | Bernstein et al. |
| 2016/0038412 A1 | 2/2016 | Guo et al. |
| 2016/0058615 A1 | 3/2016 | Camras et al. |
| 2016/0058616 A1 | 3/2016 | Camras et al. |
| 2016/0067032 A1 | 3/2016 | Soletti et al. |
| 2016/0067093 A1 | 3/2016 | Johnson et al. |
| 2016/0100939 A1 | 4/2016 | Armstrong et al. |
| 2016/0153591 A1 | 6/2016 | Fonfara et al. |
| 2016/0242962 A1 | 8/2016 | Torello et al. |
| 2016/0245432 A1 | 8/2016 | Fonfara et al. |
| 2016/0256321 A1 | 9/2016 | Horvath et al. |
| 2016/0256382 A1 | 9/2016 | Shi et al. |
| 2016/0270958 A1 | 9/2016 | De et al. |
| 2016/0287513 A1 | 10/2016 | Rakic et al. |
| 2016/0296322 A1 | 10/2016 | Edelman et al. |
| 2016/0302965 A1 | 10/2016 | Erickson et al. |
| 2016/0302967 A1 | 10/2016 | Ahn |
| 2016/0331528 A1 | 11/2016 | Parker et al. |
| 2016/0374856 A1 | 12/2016 | Pinchuk et al. |
| 2017/0000610 A1 | 1/2017 | Eppihimer et al. |
| 2017/0014227 A1 | 1/2017 | Boden et al. |
| 2017/0020731 A1 | 1/2017 | Baerveldt |
| 2017/0071729 A1 | 3/2017 | Wrobel |
| 2017/0079779 A1 | 3/2017 | Tabor |
| 2017/0079782 A1 | 3/2017 | Beith |
| 2017/0092974 A1 | 3/2017 | Macphee |
| 2017/0141423 A1 | 5/2017 | Okada et al. |
| 2017/0156854 A1 | 6/2017 | Hammer |
| 2017/0172794 A1 | 6/2017 | Varner et al. |
| 2017/0189175 A1 | 7/2017 | Justino et al. |
| 2017/0245989 A1 | 8/2017 | Bluestein et al. |
| 2017/0252156 A1 | 9/2017 | Bernstein et al. |
| 2017/0296783 A1 | 10/2017 | Connolly et al. |
| 2017/0367888 A1 | 12/2017 | Brown |
| 2018/0028361 A1 | 2/2018 | Haffner et al. |
| 2018/0049872 A1 | 2/2018 | Bennett |
| 2018/0071143 A1 | 3/2018 | Silvestrini et al. |
| 2018/0110650 A1 | 4/2018 | Da Silva Curiel et al. |
| 2018/0125632 A1 | 5/2018 | Cully et al. |
| 2018/0126134 A1 | 5/2018 | Cully et al. |
| 2018/0133002 A1 | 5/2018 | Yi et al. |

(56) References Cited

U.S. PATENT DOCUMENTS

| | | |
|---|---|---|
| 2018/0133149 A1 | 5/2018 | Zilberman |
| 2018/0177592 A1 | 6/2018 | Benichou et al. |
| 2018/0185151 A1 | 7/2018 | Bishop et al. |
| 2018/0263718 A1 | 9/2018 | Griffiths et al. |
| 2018/0263775 A1 | 9/2018 | Shah |
| 2018/0263817 A1 | 9/2018 | Roeber et al. |
| 2018/0263818 A1 | 9/2018 | Roeber et al. |
| 2018/0263819 A1 | 9/2018 | Roeber et al. |
| 2018/0303752 A1 | 10/2018 | Haffner |
| 2018/0325732 A1 | 11/2018 | Burns et al. |
| 2018/0344457 A1 | 12/2018 | Gross et al. |
| 2018/0344526 A1 | 12/2018 | Pinchuk |
| 2019/0000673 A1 | 1/2019 | Fjield et al. |
| 2019/0015191 A1 | 1/2019 | Berdajs |
| 2019/0046696 A1 | 2/2019 | Parikh et al. |
| 2019/0091014 A1 | 3/2019 | Arcaro et al. |
| 2019/0091015 A1 | 3/2019 | Dienno et al. |
| 2019/0105199 A1 | 4/2019 | Ahmed et al. |
| 2019/0125529 A1 | 5/2019 | Colavito et al. |
| 2019/0125530 A1 | 5/2019 | Arcaro et al. |
| 2019/0125531 A1 | 5/2019 | Bennett et al. |
| 2019/0133826 A1 | 5/2019 | Horvath et al. |
| 2019/0167475 A1 | 6/2019 | Horvath et al. |
| 2019/0224047 A1 | 7/2019 | Kao et al. |
| 2019/0282360 A1 | 9/2019 | Colavito et al. |
| 2019/0298572 A1 | 10/2019 | Chu |
| 2019/0343617 A1 | 11/2019 | Sobrino-Serrano et al. |
| 2019/0365531 A1 | 12/2019 | Beith |
| 2020/0113681 A1 | 4/2020 | Armstrong et al. |
| 2020/0121454 A1 | 4/2020 | Spence |
| 2020/0188114 A1 | 6/2020 | Radspinner et al. |
| 2020/0188147 A1* | 6/2020 | Throckmorton .... A61M 27/002 |
| 2020/0214886 A1* | 7/2020 | Gutierrez ............. A61B 3/00 |
| 2020/0214887 A1* | 7/2020 | Gutierrez .......... A61K 9/0009 |
| 2020/0229977 A1 | 7/2020 | Mixter et al. |
| 2020/0330377 A1 | 10/2020 | Banerjee et al. |
| 2020/0337897 A1 | 10/2020 | Sacherman et al. |
| 2021/0315806 A1 | 10/2021 | Haffner |
| 2021/0322217 A1 | 10/2021 | Roeber et al. |
| 2021/0346197 A1 | 11/2021 | Roeber et al. |
| 2022/0080049 A1 | 3/2022 | Garcia et al. |
| 2022/0331162 A1 | 10/2022 | Roeber et al. |
| 2022/0354996 A1* | 11/2022 | Engman ............. A61L 27/3604 |
| 2022/0378611 A1 | 12/2022 | Conia et al. |
| 2022/0395397 A1 | 12/2022 | Chu |
| 2023/0054622 A1 | 2/2023 | Roeber et al. |
| 2023/0117758 A1 | 4/2023 | Roeber et al. |
| 2023/0142430 A1 | 5/2023 | Towler et al. |
| 2023/0218286 A1 | 7/2023 | McAlister et al. |
| 2024/0041645 A1 | 2/2024 | Conia et al. |

FOREIGN PATENT DOCUMENTS

| | | |
|---|---|---|
| AU | 2015266850 A1 | 12/2016 |
| AU | 2020201236 A1 | 3/2020 |
| AU | 2017439185 A1 | 5/2020 |
| AU | 2021218010 A1 | 9/2021 |
| CA | 2502761 A1 | 4/1997 |
| CA | 2974600 A1 | 10/2015 |
| CA | 2950187 A1 | 12/2015 |
| CN | 1208602 A | 2/1999 |
| CN | 2414757 Y | 1/2001 |
| CN | 1285724 A | 2/2001 |
| CN | 1425826 A | 6/2003 |
| CN | 1592640 A | 3/2005 |
| CN | 1976732 A | 6/2007 |
| CN | 101965211 A | 2/2011 |
| CN | 202619978 U | 12/2012 |
| CN | 103179927 A | 6/2013 |
| CN | 103619366 A | 3/2014 |
| CN | 104000684 A | 8/2014 |
| CN | 104114201 A | 10/2014 |
| CN | 104168863 A | 11/2014 |
| CN | 105377202 A | 3/2016 |
| CN | 105579001 A | 5/2016 |
| CN | 205198254 U | 5/2016 |
| CN | 107613917 A | 1/2018 |
| EP | 2226624 A1 | 9/2010 |
| EP | 2472297 A1 | 7/2012 |
| EP | 2349147 B1 | 3/2015 |
| EP | 2958530 A1 | 12/2015 |
| EP | 3148491 A1 | 4/2017 |
| EP | 3677229 A1 | 7/2020 |
| EP | 3773377 A1 | 2/2021 |
| GB | 2513194 A | 10/2014 |
| JP | 08-117267 A | 5/1996 |
| JP | 11-505159 A | 5/1999 |
| JP | 2000-513248 A | 10/2000 |
| JP | 2002-521145 A | 7/2002 |
| JP | 2003-301948 A | 10/2003 |
| JP | 2005-500101 A | 1/2005 |
| JP | 2005-121438 A | 5/2005 |
| JP | 2005-294016 A | 10/2005 |
| JP | 2007-521125 | 8/2007 |
| JP | 2008-101926 A | 5/2008 |
| JP | 2010-540079 A | 12/2010 |
| JP | 2011-504127 A | 2/2011 |
| JP | 2011-507631 A | 3/2011 |
| JP | 2012-504031 A | 2/2012 |
| JP | 2012-164647 A | 8/2012 |
| JP | 2013-009982 A | 1/2013 |
| JP | 2014-517720 A | 7/2014 |
| JP | 2014-199348 A | 10/2014 |
| JP | 2014-239034 A | 12/2014 |
| JP | 2015-039515 A | 3/2015 |
| JP | 2015-175815 A | 10/2015 |
| JP | 2016-137278 A | 8/2016 |
| JP | 2017-517363 A | 6/2017 |
| JP | 6655610 B2 | 2/2020 |
| JP | 2020-075162 A | 5/2020 |
| JP | 6872650 B2 | 5/2021 |
| JP | 2021-112598 A | 8/2021 |
| KR | 10-2008-0020259 A | 3/2008 |
| KR | 10-2016-0026107 A | 3/2016 |
| WO | 2001/066037 A2 | 9/2001 |
| WO | 02/00318 A1 | 1/2002 |
| WO | 2002/100318 A2 | 12/2002 |
| WO | 2003/007795 A2 | 1/2003 |
| WO | 03/15659 A2 | 2/2003 |
| WO | 2005/076973 A2 | 8/2005 |
| WO | 2007/100408 A2 | 9/2007 |
| WO | 2008/030246 A2 | 3/2008 |
| WO | 2008/030951 A2 | 3/2008 |
| WO | 2008/133852 A1 | 11/2008 |
| WO | 2009/042196 A2 | 4/2009 |
| WO | 2009/137785 A2 | 11/2009 |
| WO | 2010/037141 A1 | 4/2010 |
| WO | 2011/147849 A1 | 12/2011 |
| WO | 2012/018779 A2 | 2/2012 |
| WO | 2012/135603 A2 | 10/2012 |
| WO | 2012/142318 A1 | 10/2012 |
| WO | 2013/090006 A1 | 6/2013 |
| WO | 2013/096854 A3 | 8/2013 |
| WO | 2014/028725 A2 | 2/2014 |
| WO | 2014/130574 A1 | 8/2014 |
| WO | 2014/145811 A1 | 9/2014 |
| WO | 2015/064312 A1 | 5/2015 |
| WO | 2015/065646 A1 | 5/2015 |
| WO | 2015/085234 A1 | 6/2015 |
| WO | 2015/126332 A1 | 8/2015 |
| WO | 2015/184173 A1 | 12/2015 |
| WO | 2016/033270 A1 | 3/2016 |
| WO | 2016/168686 A1 | 10/2016 |
| WO | 2016/196841 A1 | 12/2016 |
| WO | 2017/156293 A1 | 9/2017 |
| WO | 2017/176886 A1 | 10/2017 |
| WO | 2018/150392 A1 | 8/2018 |
| WO | 2018/170429 A1 | 9/2018 |
| WO | 2018/170433 A1 | 9/2018 |
| WO | 2018/187714 A1 | 10/2018 |
| WO | 2019/018807 A1 | 1/2019 |
| WO | 2019/094004 A1 | 5/2019 |
| WO | 2019/154927 A1 | 8/2019 |

(56) References Cited

FOREIGN PATENT DOCUMENTS

| WO | 2020/047221 A1 | 3/2020 |
| WO | 2020/047222 A1 | 3/2020 |
| WO | 2020/223525 A1 | 11/2020 |

OTHER PUBLICATIONS

Tang, H., Zhang, Y., Wang, F., Zhang, H., & Guo, Y. (2016). Long-term stability of polytetrafluoroethylene (PTFE) hollow fiber membranes for CO2 capture. Energy & Fuels, 30(1), 492-503. (Year: 2019).*

Office Action received for Chinese Patent Application No. 202110966241.1, mailed on May 15, 2024, 11 pages (5 pages of English Translation and 6 pages of Original Document).

"AHMED(Registered) ClearPath Giaucoma Drainage Device Model CP250 and CP350," New World Medical, Inc., Part # 50-0109, pp. 28. Downloaded Mar. 6, 2020.

"The Ahmed Giaucoma Valve Model FP7," New World Medical, Inc., Part #50-0088 Rev C, URL: htps://www.newworldmedical.com/wp-content/uploads/2020/07/AGV-FP7-IFU-50-0088-Rev-C.pdf, Nov. 2019, pp. 1-28.

Kahook et al., "Location of glaucoma drainage devices relative to the optic nerve," British Journal of Ophthalmol, vol. 90, No. 8, Aug. 2006, pp. 1010-1013.

Mcmenamin et al., "Normal anatomy of the aqueous humour outflow system in the domestic pig eye," Journal of Anatomy, vol. 178, Oct. 1991, pp. 65-77.

Mohammadi et al., "Sheep practice eye for ophthalmic surgery training in skills laboratory," Journal of Cataract and Refractive Surgery, vol. 37, No. 6, Jun. 2011, pp. 987-991.

Molteno, Anthony C.B., "Molteno3 Glaucoma Drainage Device," Surgical Guide, 0817-SG/GDD, 2006, pp. 44.

Palioura S. et al., "Role of steroids in the treatment of bacterial keratitis," Clinical Ophthalmology. vol. 10, Jan. 27, 2016, pp. 179-186.

Plemel et al., "Tube shunt surgery in pig eyes: a wet lab teaching model," Canadian Journal of Ophthalmology, vol. 54, Issue 5, Oct. 2019, pp. 585-589.

Shastri, V et. al. Non-Degradable Biocompatible Polymers in Medicine: Past, Present, and Future. Current Pharmaceutical Biotechnology, vol. 4, No. 5, 2003, pp. 331-337 [online], [retrieved on Nov. 8, 2023], Retrieved from the Internet <URL: https://pubmed.ncbi.nlm.nih.gov/14529423/> (Year: 2003).

Wadhawan, A et. al. Gore-tex® versus resolut adapt® GTR membranes with perioglas® in periodontal regeneration. Contemp. Clin. Dent., vol. 3, No. 4, Oct.-Dec. 2012, pp. 406-411 [online], [retrieved on Nov. 8, 2023], Retrieved from the Internet <URL: https://www.ncbi.nlm.nih.gov/pmc/articles/PMC3636825/> (Year: 2012).

Ando et al., Ten-year experience with handmade trileaflet polytetrafluoroethylene valved conduit used for pulmonary reconstruction. The Journal of Thoracic and Cardiovascular Surgery, Jan. 2009, vol. 137, No. 1, pp. 124-131.

Gedde et al., "Treatment Outcomes in the Tube Versus Trabeculectomy (TVT) Study After Five Years of Follow-up", Am J Ophthalmol., vol. 153, No. 5, 2012, pp. 789-803.

Han, et al. "Membrane-tube-type glaucoma shunt device for refractory glaucoma surgery", Glaucoma, Graefes Arch Clin Exp Opthalmol, DOI 10, 1007/s00417-016-3510-z. Springer-Verlag Berlin Heidelberg 2016.

International Search Report and Written Opinion received for PCT Patent Application No. PCT/US2022/048960, mailed on Mar. 2, 2023, 17 pages.

Karthikeyan et al., "The concept of ocular inserts as drug delivery systems: An overview", Asian Journal Of Pharmaceutics, vol. 2, No. 4, 2008, pp. 192-200.

Lee et al., "Aqueous-Venous Shunt for Glaucoma A Further Report", Arch Opthalmol, vol. 99, 1981, pp. 2007-2012.

Lee et al., "Aqueous-Venous Shunt in The Rabbit Eye: A Long-Term Follow-Up", Trans. Soc. Ophthal. Sin., vol. 8, 1969, pp. 7-24.

Lee et al., "Effect of an Aqueous-Venous Shunt In The Monkey Eye", Canad. J. Ophthal., 3:22, 1968, pp. 22-27.

Lee et al., "Effect of aqueous-venous shunt on rabbit eyes", Inivestigative Ophthalmology, vol. 5, No. 3, 1996, pp. 304-311.

Lee et al., "Glaucoma Microsurgery Aqueous-Venous Shunt Procedure", International Surgery, vol. 57, No. 1, Jan. 1972, pp. 37-41.

Miyazaki, et al., Expanded polytetrafluoroethylene conduits and patches with bulging sinuses and fan-shaped valves in right ventricular outflow tract reconstruction: Multicneter study in Japan. The Journal of Thoracic and Cardiovascula Surgery, Nov. 2011, vol. 142, No. 5, pp. 1122-1129.

Miyazaki, et al., Expanded polytetrafluoroethylene valved conduit and patch with bulging sinuses in right ventricular outflow tract reconstruction. The Journal of Thoracic and Cardiovascular Surgery, Aug. 2007, vol. 134, No. 2, pp. 327-332.

Ootaki et al., Medium-term outcomes after implantation of expanded polytetrafluoroethylene valved conduit. The Annals of Thoracic Surgery, 2018; 105 (3), pp. 843-850.

Rese et al., "Sustained drug delivery in glaucoma", Current Opinion in Ophthalmology, vol. 25, No. 2, 2014, pp. 112-117.

Shinkawa et al., Valved polytetrafluoroethylene conduits for right ventricular outflow tract reconstruction. The Annals of Thoracic Surgery. Jul. 2015; 100(1), pp. 129-137.

Stevenson et al., "Reservoir-Based Drug Delivery Systems Utilizing Microtechnology", Advanced Drug Delivery Reviews, vol. 64, No. 14, 2012, pp. 1590-1602.

Understanding Your Heart Valve. Medtronic USA, Inc., 2006. Pamphlet.

Yamagishi et al. Outflow reconstruction of tetralogy of fallot using a Gore-Tex valve. The Anais of Thoracic Surgery, Dec. 1993; 56(6), pp. 1414-1417.

International Preliminary Report on Patenlability received for PCT Patent Application No. PCT/US2018/022929, mailed on Sep. 26, 2019, 9 pages.

International Preliminary Report on Patentability received for PCT Patent Application No. PCT/US18/22922, mailed on Sep. 26, 2019, 9 pages.

International Preliminary Report on Patentability received for PCT Patent Application No. PCT/US18/22933, mailed on Sep. 26, 2019, 9 pages.

International Preliminary Report on Patentability received for PCT Patent Application No. PCT/US19/48759, mailed on Mar. 11, 2021, 12 pages.

International Preliminary Report on Patentability received for PCT Patent Application No. PCT/US19/48760, mailed on Mar. 11, 2021, 9 pages.

International Preliminary Report on Patentability received for PCT Patent Application No. PCT/US2015/055348, dated Apr. 27, 2017, 18 pages.

International Preliminary Report on Patentability received for PCT Patent Application No. PCT/US2019/065890, mailed on Jun. 24, 2021, 8 pages.

International Preliminary Report on Patentability received for PCT Patent Application No. PCT/US2022/031305, mailed on Dec. 7, 2023, 18 pages.

International Preliminary Report on Patentability received for PCT Patent Application No. PCT/US2023/010660, mailed on Jul. 25, 2024, 10 pages.

International Preliminary Report on Patentability received for PCT Patent Application No. PCT/US22/48960, mailed on May 16, 2024, 10 pages.

International Preliminary Report on Patentability received for PCT Patent Application No. PCT/US22/48971, mailed on May 16, 2024, 13 pages.

International Search Report and Written Opinion received for PCT Patent Application No. PCT/US18/22922, mailed on Jul. 23, 2018, 12 pages.

International Search Report and Written Opinion received for PCT Patent Application No. PCT/US18/22929, mailed on Jun. 28, 2018, 12 pages.

International Search Report and Written Opinion received for PCT Patent Application No. PCT/US18/22933, mailed on Jul. 3, 2018, 12 pages.

(56) References Cited

OTHER PUBLICATIONS

International Search Report and Written Opinion received for PCT Patent Application No. PCT/US19/48759, mailed on Feb. 12, 2020, 16 pages.
International Search Report and Written Opinion received for PCT Patent Application No. PCT/US19/48760, mailed on Dec. 3, 2019, 11 pages.
International Search Report and Written Opinion received for PCT Patent Application No. PCT/US2015/055348, mailed on Apr. 11, 2016, 23 pages.
International Search Report and Written Opinion received for PCT Patent Application No. PCT/US2018/050771, mailed on Feb. 25, 2019, 16 pages.
International Search Report and Written Opinion received for PCT Patent Application No. PCT/US2019/065890, dated Mar. 18, 2020, 9 pages.
International Search Report and Written Opinion received for PCT Patent Application No. PCT/US2022/031305, mailed on Nov. 7, 2022, 26 pages.
International Search Report and Written Opinion received for PCT Patent Application No. PCT/US2022/048971, mailed on Apr. 24, 2023, 19 pages.
International Search Report and Written Opinion received for PCT Patent Application No. PCT/US2023/010660, mailed on May 24, 2023, 17 pages.
International Search Report and Written Opinion received for PCT Patent Application No. PCT/US2023/029614, mailed on Nov. 10, 2023, 13 pages.
Lee et al., "Aqueous-Venus Shunt for Glaucoma: Report on 15 cases", AnnalOphthal, Oct. 1974, pp. 1083-1088.
Lee et al., "Pig eye trabeculectomy—a wet-lab teaching model," Eye, vol. 20, Jan. 28, 2005, pp. 32-37.

* cited by examiner

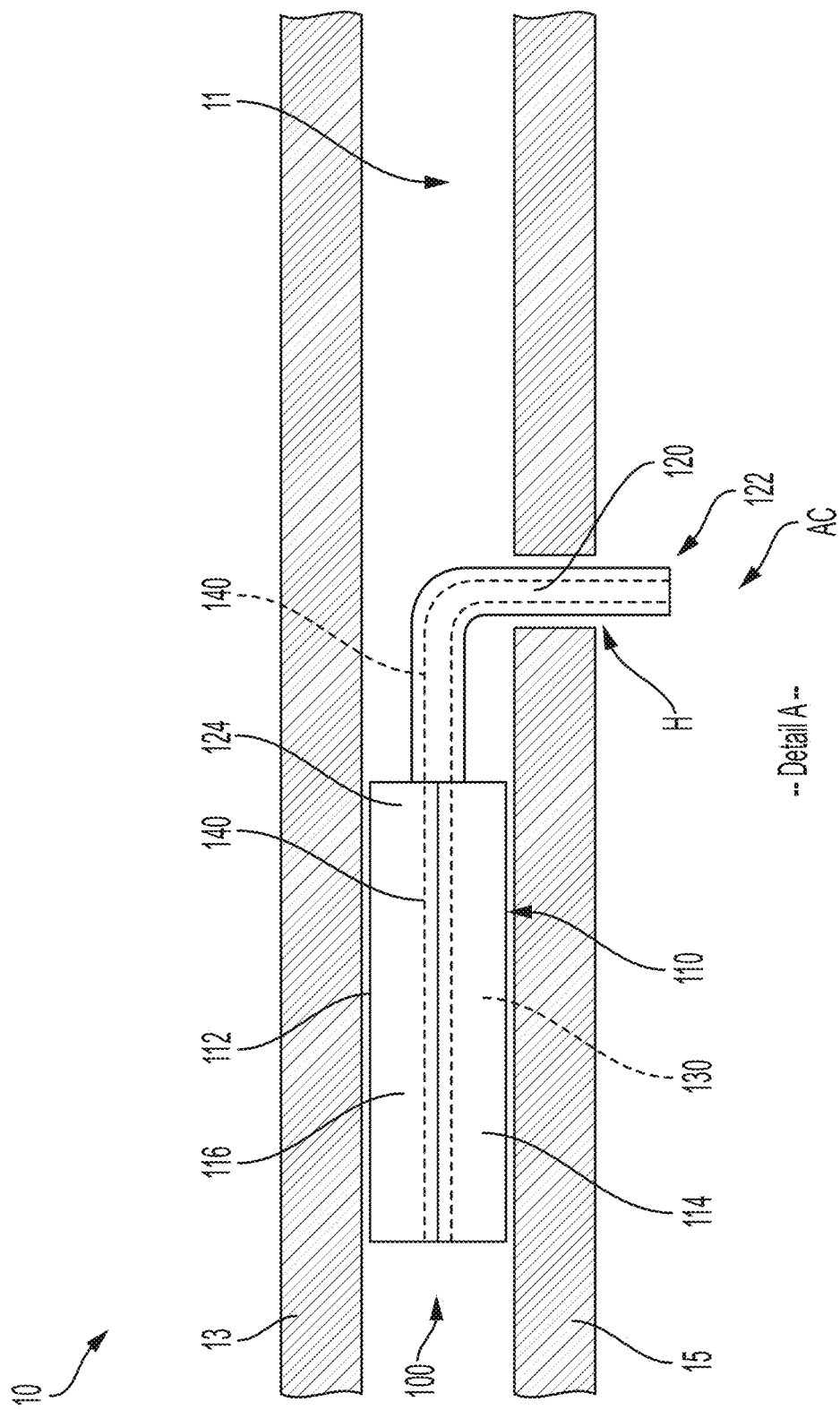

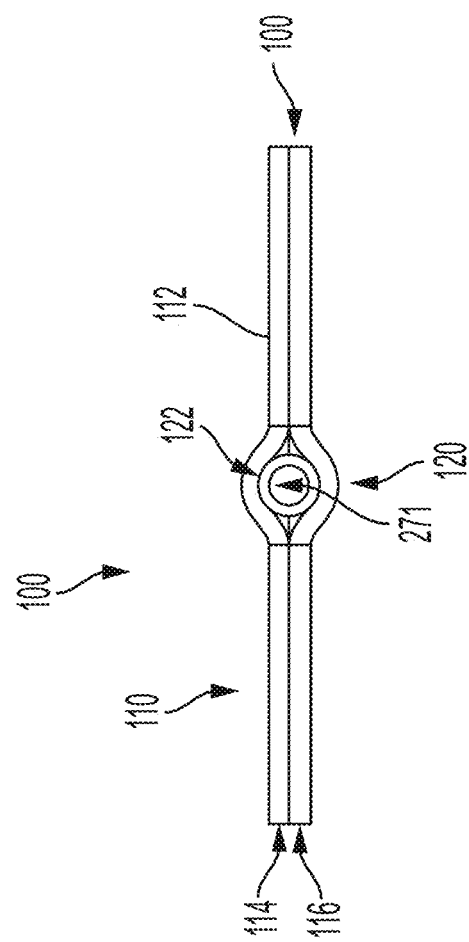
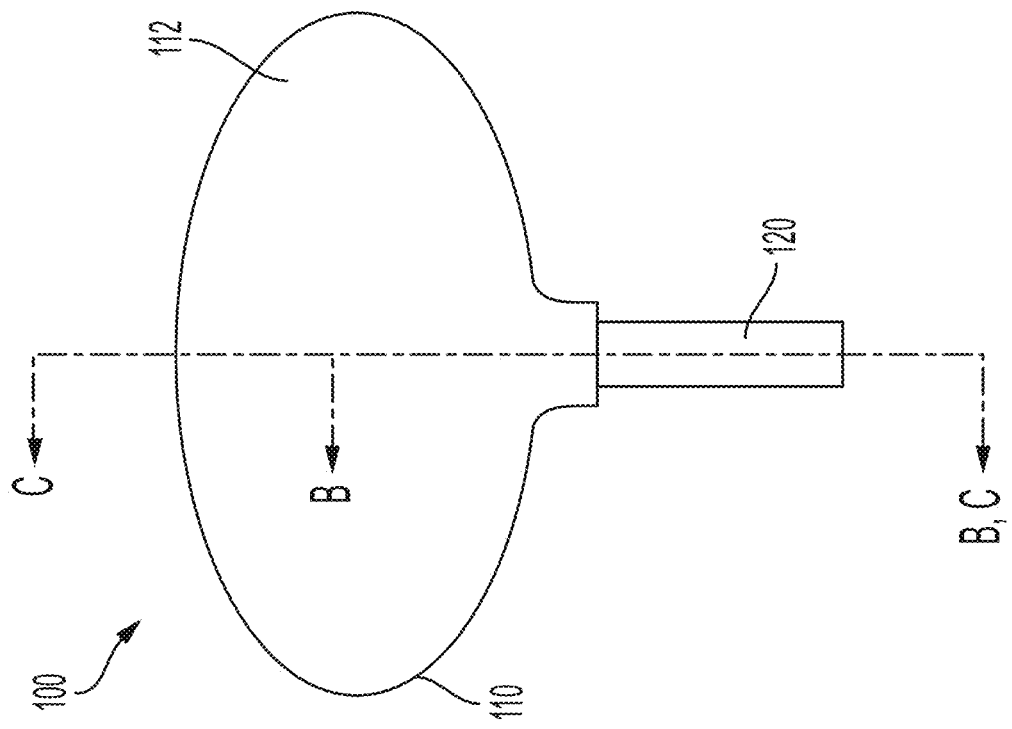
FIG. 2B
FIG. 2A

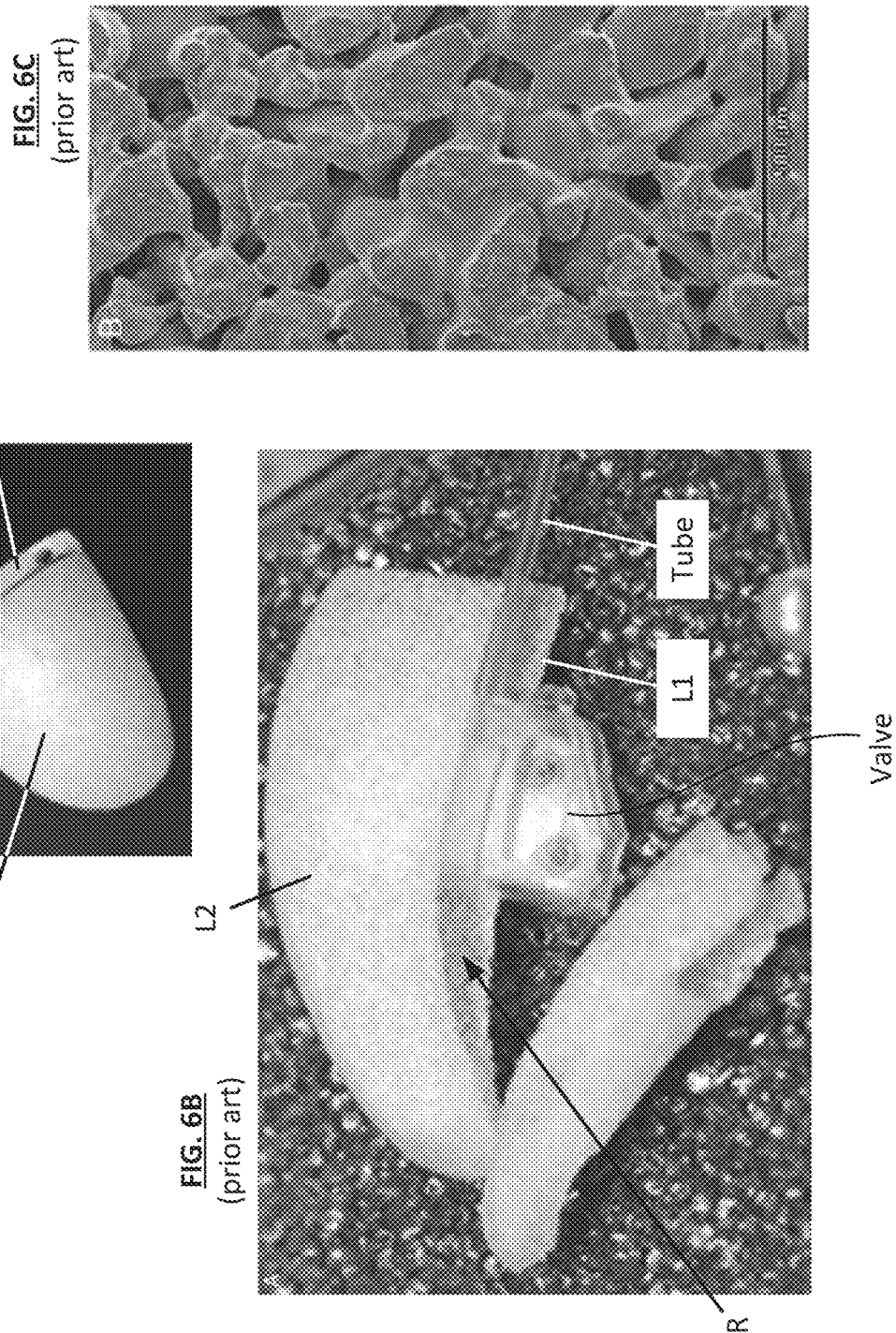

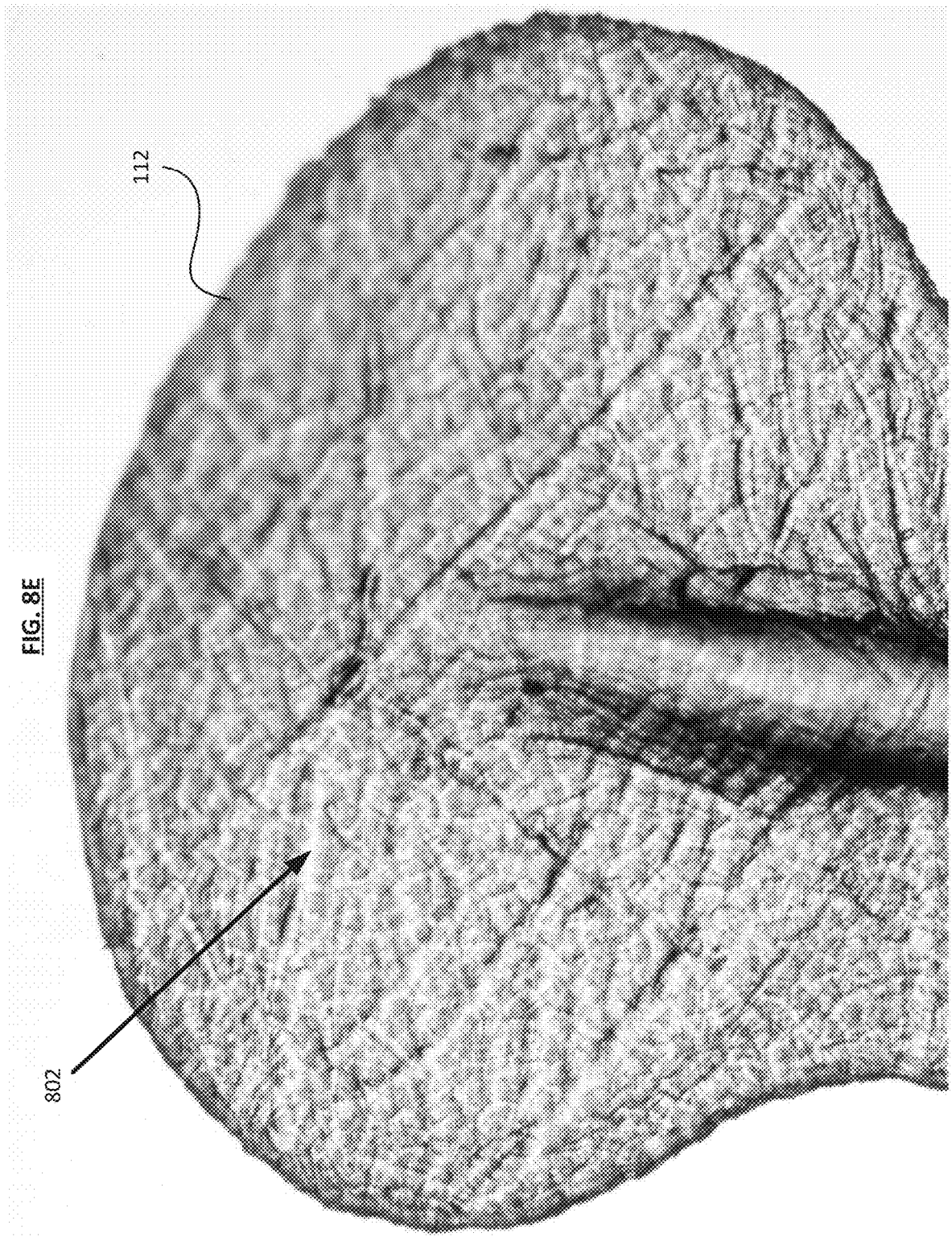

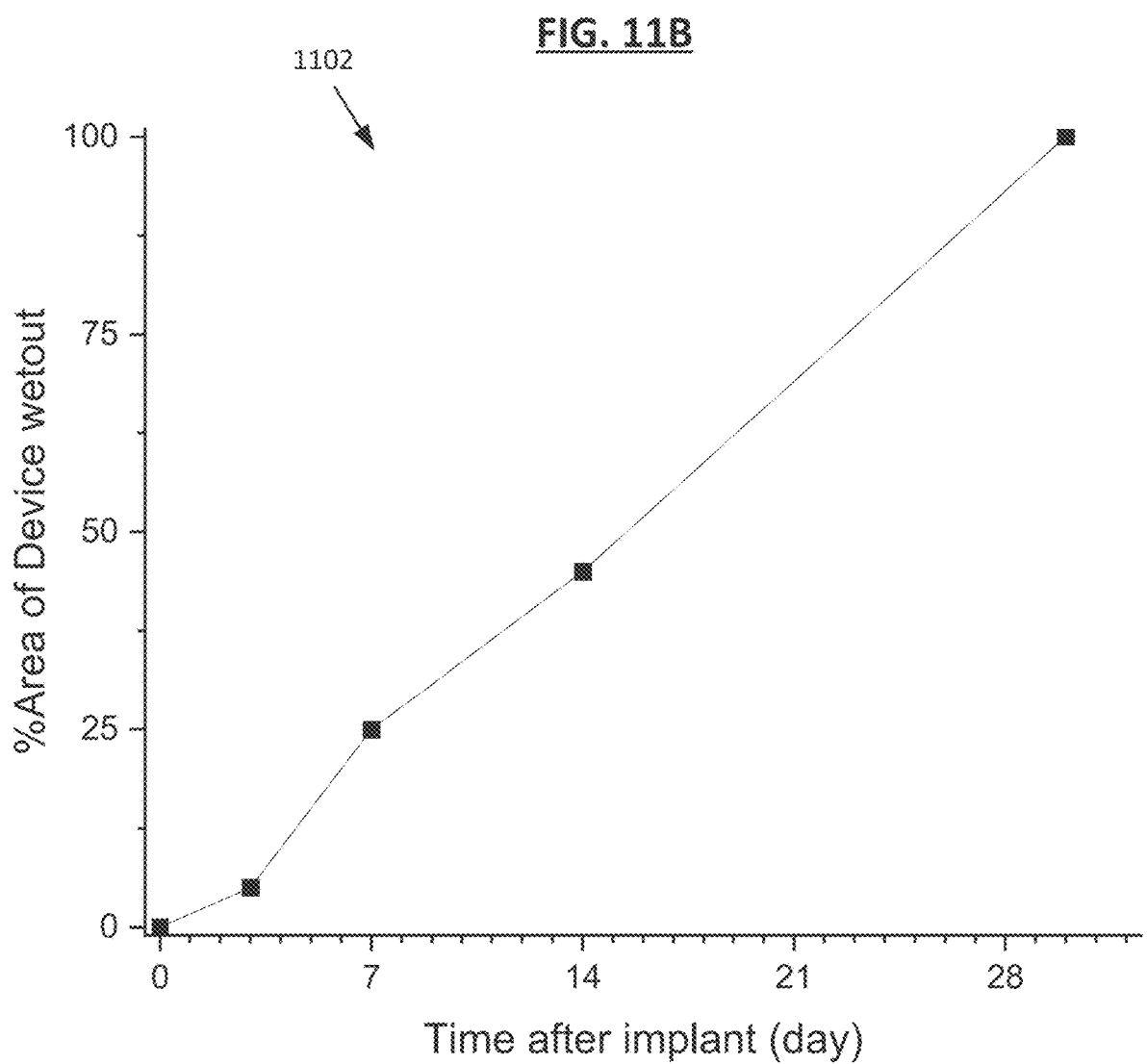

FLUID DRAINAGE DEVICES, SYSTEMS, AND METHODS

CROSS-REFERENCE TO RELATED APPLICATIONS

This application claims priority to U.S. Provisional Application No. 63/276,170, filed Nov. 5, 2021, which is hereby incorporated by reference in its entirety.

FIELD

The present disclosure relates generally to apparatuses, systems, and methods for draining fluid and diverting the fluid to be reabsorbed elsewhere in the body. More specifically, the disclosure relates to apparatuses, systems, and methods for draining aqueous humor from the anterior chamber of a patient's eye such that it may be reabsorbed by the body.

BACKGROUND

Various medical interventions involve evacuating excess fluid such as biological fluid from one portion of the body and redirecting it to another location of the body where it can be reabsorbed. In certain instances, this evacuation is achieved via minimally invasive procedures such as endoscopic third ventriculostomy (ETV) and choroid plexus cauterization procedure (CPC). In other instances, this evacuation is performed post-operatively via implantable medical devices, such as a shunt. Proven useful in various medical procedures, shunts of different forms have been employed as treatment for numerous diseases, such as hydrocephalus and glaucoma.

Without treatment, excessive biological fluid can lead to unhealthy pressure build ups. For instance, glaucoma is a progressive eye disease characterized by elevated intraocular pressure. Aqueous humor is a fluid that fills the anterior chamber of the eye and contributes to intraocular pressure or intraocular fluid pressure. This increase in intraocular pressure is usually caused by an insufficient amount of aqueous humor absorbed by the body. In some cases, the aqueous humor is not absorbed quickly enough or even not absorbed at all, while in other cases, the aqueous humor is additionally or alternatively produced too quickly. Elevated intraocular pressure is associated with gradual and sometimes permanent loss of vision in the affected eye.

Many attempts have been made to treat glaucoma. However, some conventional devices are relatively bulky and lack flexibility, compliance, and device/tissue attachment required to avoid relative motion between the device and the surrounding tissue. Such movement can result in continued stimulation of the surrounding tissue, causing irritation at the implantation site. Irritation, in turn, can lead to increased chronic inflammatory tissue response, excessive scarring at the device site, and increased risk of device erosion through conjunctival and endophthalmitis. Scar tissue effectively prevents resorption of aqueous humor without erosion. These complications may prevent the device from functioning properly. The result is a gradual rise in intraocular pressure and progression of glaucoma.

SUMMARY

According to one example ("Example 1"), a glaucoma shunt for draining a fluid from an eye to a tissue surrounding the eye is disclosed herein. The glaucoma shunt is implantable within tissue of the eye and includes: a shunt body that is formed from a microporous material that is arranged so as to form a reservoir within the shunt body; and a conduit in fluid communication with the reservoir, the conduit being insertable into the eye such that the fluid at a distal end of the conduit is allowed to flow through the conduit and accumulate within the reservoir. The microporous material transitions from a hydrophobic state to a hydrophilic state within 30 days as the fluid that is accumulated in the reservoir diffuses to the tissue surrounding the eye through the microporous material so as to provide a variable flow resistance as the microporous material transitions from the hydrophobic state to the hydrophilic state.

According to another example ("Example 2") further to Example 1, a first portion of the microporous material transitions from the hydrophobic state to the hydrophilic state within 3 days.

According to another example ("Example 3") further to Example 2, a second portion of the microporous material different from the first portion transitions from the hydrophobic state to the hydrophilic state within 7 days.

According to another example ("Example 4") further to any preceding Example, an entirety of the microporous material transitions from the hydrophobic state to the hydrophilic state within 30 days.

According to another example ("Example 5") further to any preceding Example, in the hydrophobic state, the microporous material is opaque.

According to another example ("Example 6") further to any preceding Example, in the hydrophilic state, the microporous material is transparent.

According to another example ("Example 7") further to any preceding Example, the shunt body has a maximum thickness of no greater than 500 µm.

According to another example ("Example 8") further to any preceding Example, in the hydrophobic state, a drop of water placed on a surface of the microporous material forms a contact angle of greater than 90 degrees with respect to the surface, and in the hydrophilic state, a drop of water placed on a surface of the microporous material forms the contact angle of less than 90 degrees with respect to the surface. The transition from the hydrophobic state to the hydrophilic state constitutes a decrease in the contact angle by at least 10 degrees.

According to another example ("Example 9") further to any preceding Example, the variable flow resistance is greater in the hydrophobic state than in the hydrophilic state.

According to another example ("Example 10") further to any preceding Example, the microporous material is more translucent in the hydrophilic state than in the hydrophobic state.

According to another example ("Example 11") further to any preceding Example, the shunt body has a continuous wall that defines the reservoir and a reservoir opening in the continuous wall communicating with the internal reservoir and through which the conduit is engagingly receive. At least a portion of the continuous wall has a wall portion composed of the microporous material. The wall portion has an internal side facing the internal reservoir and an opposing external side facing the exterior region of the human eye. The wall portion internal side has a low porosity surface extending an entirety of the wall portion internal side. The wall portion external side has an alternating surface including the low porosity surface disposed between high porosity surfaces.

According to another example ("Example 12") further to any preceding Example, the microporous material comprises a first layer having a first microporous membrane integrated with a second microporous membrane and a second layer having a third microporous membrane integrated with a fourth microporous membrane.

According to another example ("Example 13") further to Example 12, the microporous material comprises expanded polytetrafluoroethylene (ePTFE).

According to another example ("Example 14") further to Example 13, a first microporous membrane permeability of the first microporous membrane is greater than a second microporous membrane permeability of the second microporous membrane. A fourth microporous membrane permeability of the fourth microporous membrane is greater than a third microporous membrane permeability of the third microporous membrane.

According to another example ("Example 15") further to Example 14, the first layer and the second layer are in a stacked configuration such that the first microporous membrane and the fourth microporous membrane are outermost membranes of the shunt body and the second microporous membrane and third microporous membrane are innermost membranes of the shunt body defining the reservoir.

According to another example ("Example 16") further to Example 12, the first microporous membrane has a first microporous membrane permeability, the second microporous membrane has a second microporous membrane permeability, the third microporous membrane has a third microporous membrane permeability, and the fourth microporous membrane has a fourth microporous membrane permeability. The second microporous membrane permeability is about the same as the third microporous membrane permeability, and the first microporous membrane permeability is about the same as the fourth microporous membrane permeability. Each of the second microporous membrane permeability and the third microporous membrane permeability are different from the first microporous membrane permeability and the fourth microporous membrane permeability.

According to another example ("Example 17") further to Example 12, the second and third microporous membranes are bonded to each other along peripheral edges of the first and second layers to define the reservoir and to dispose the reservoir between the second and third microporous membranes. The second and third microporous membranes are configured to resist tissue ingrowth. The second and third microporous membranes have an expanded state that is maintained adjacent to the peripheral edges of the first and second layers.

According to another example ("Example 18") further to Example 12, the reservoir is configured to move between a collapsed state in which the second and third microporous membranes resist fluid flow therebetween and an expanded state in which fluid is allowed to flow between the second and third microporous membranes.

According to another example ("Example 19") further to Example 18, fluid flow into the reservoir is directed from the distal end of the conduit toward a periphery of chamber.

According to another example ("Example 20") further to Example 18, the reservoir has a reservoir proximal section that is adjacent the distal end of the conduit and a reservoir distal section that is positioned opposite of the reservoir proximal section. During drainage of the fluid, the reservoir proximal section is configured to inflate before the reservoir distal section.

According to another example ("Example 21") further to any preceding Example, the variable flow resistance corresponds to a rate of change in pressure with respect to flow rate over time.

According to another example ("Example 22") further to Example 21, the microporous material transitions from the hydrophobic state having a first flow resistance to a partially hydrophilic state having a second flow resistance and then to the hydrophilic state having a third flow resistance. The first flow resistance is greater than both the second flow resistance and the third flow resistance, and the second flow resistance is greater than the third flow resistance.

According to another example ("Example 23") further to any preceding Example, the microporous material is configured to transition from the hydrophobic state to the hydrophilic state based on a wetting of the microporous material with the fluid. The microporous material is configured such that wetting of an outer portion of the shunt body occurs before wetting of the reservoir.

According to another example ("Example 24"), an aqueous humor diffusion device is disclosed herein. The device includes a device body that is formed from a microporous material that is arranged so as to form a reservoir within the device body, the reservoir being configured to receive and accumulate fluid. The microporous material transitions from a hydrophobic state to a hydrophilic state within 30 days as fluid that is accumulated in the reservoir diffuses to tissue surrounding the device through the microporous material so as to provide a variable flow resistance as the microporous material transitions from the hydrophobic state to the hydrophilic state.

According to another example ("Example 25") further to Example 24, a first portion of the microporous material transitions from the hydrophobic state to the hydrophilic state within 3 days.

According to another example ("Example 26") further to Example 25, a second portion of the microporous material different from the first portion transitions from the hydrophobic state to the hydrophilic state within 7 days.

According to another example ("Example 27") further to any one of Examples 24-26, an entirety of the microporous material transitions from the hydrophobic state to the hydrophilic state within 30 days.

According to another example ("Example 28") further to any one of Examples 24-27, in the hydrophobic state, the microporous material is opaque.

According to another example ("Example 29") further to any one of Examples 24-28, in the hydrophilic state, the microporous material is transparent.

According to another example ("Example 30") further to any one of Examples 24-29, the shunt body has a maximum thickness of no greater than 500 µm.

According to another example ("Example 31") further to any one of Examples 24-30, in the hydrophobic state, a drop of water placed on a surface of the microporous material forms a contact angle of greater than 90 degrees with respect to the surface, and in the hydrophilic state, a drop of water placed on a surface of the microporous material forms the contact angle of less than 90 degrees with respect to the surface. The transition from the hydrophobic state to the hydrophilic state constitutes a decrease in the contact angle by at least 10 degrees.

According to another example ("Example 32") further to any one of Examples 24-31, the variable flow resistance is greater in the hydrophobic state than in the hydrophilic state.

According to another example ("Example 33") further to any one of Examples 24-32, the microporous material is more translucent in the hydrophilic state than in the hydrophobic state.

According to another example ("Example 34") further to any one of Examples 24-33, the microporous material comprises a first layer having a first microporous membrane bonded to a second microporous membrane and a second layer comprising a third microporous membrane bonded to a fourth microporous membrane.

According to another example ("Example 35") further to Example 34, the microporous material comprises expanded polytetrafluoroethylene (ePTFE).

According to another example ("Example 36") further to Example 35, a first microporous membrane permeability of the first microporous membrane is greater than a second microporous membrane permeability of the second microporous membrane. A fourth microporous membrane permeability of the fourth microporous membrane is greater than a third microporous membrane permeability of the third microporous membrane.

According to another example ("Example 37") further to Example 36, the first layer and the second layer are in a stacked configuration such that the first microporous membrane and the fourth microporous membrane are outermost membranes of the device body and the second microporous membrane and third microporous membrane are innermost membranes of the device body defining the reservoir.

According to another example ("Example 38") further to Example 34, the first microporous membrane has a first microporous membrane permeability, the second microporous membrane has a second microporous membrane permeability, the third microporous membrane has a third microporous membrane permeability, and the fourth microporous membrane has a fourth microporous membrane permeability. The second microporous membrane permeability is about the same as the third microporous membrane permeability, and the first microporous membrane permeability is about the same as the fourth microporous membrane permeability. Each of the second microporous membrane permeability and the third microporous membrane permeability are different from the first microporous membrane permeability and the fourth microporous membrane permeability.

According to another example ("Example 39") further to Example 34, the second and third microporous membranes are bonded to each other along peripheral edges of the first and second layers to define the reservoir and to dispose the reservoir between the second and third microporous membranes. The second and third microporous membranes are configured to resist tissue ingrowth. The first and fourth microporous membranes are configured to permit tissue ingrowth. The second and third microporous membranes have an expanded state that is maintained adjacent to the peripheral edges of the first and second layers.

According to another example ("Example 40") further to Example 34, the reservoir is configured to move between a collapsed state in which the second and third microporous membranes resist fluid flow therebetween and an expanded state in which fluid is allowed to flow between the second and third microporous membranes.

According to another example ("Example 41") further to Example 40, fluid flow into the reservoir is directed from a proximal portion of the reservoir toward a periphery of chamber.

According to another example ("Example 42") further to Example 40, the reservoir has a reservoir proximal section that is configured to be positioned adjacent a reservoir port through which the fluid is received and a reservoir distal section that is positioned opposite of the reservoir proximal section. During drainage of the fluid, the reservoir proximal section is configured to inflate before the reservoir distal section.

According to another example ("Example 43") further to any one of Examples 24-42, the variable flow resistance corresponds to a rate of change in pressure with respect to flow rate over time.

According to another example ("Example 44") further to Example 43, the microporous material transitions from the hydrophobic state having a first flow resistance to a partially hydrophilic state having a second flow resistance and then to the hydrophilic state having a third flow resistance. The first flow resistance is greater than both the second flow resistance and the third flow resistance, and the second flow resistance is greater than the third flow resistance.

According to another example ("Example 45") further to any one of Examples 24-44, the microporous material is configured to transition from the hydrophobic state to the hydrophilic state based on a wetting of the microporous material with the fluid. The microporous material is configured such that wetting of an outer portion of the device body occurs before wetting of the reservoir.

According to another example ("Example 46"), methods are disclosed for forming glaucoma drainage device that is implantable. The method includes: arranging a microporous material so as to form a device body with a reservoir defined therein, the reservoir being configured to receive and accumulate fluid; and securing portions of the microporous material that forms the reservoir such that as fluid is accumulated in the reservoir the microporous material transitions from a hydrophobic state to a hydrophilic state within 30 days as the fluid diffuses to tissue surrounding the device through the microporous material so as to provide a variable flow resistance as the microporous material transitions from the hydrophobic state to the hydrophilic state.

According to another example ("Example 47") further to Example 46, a first portion of the microporous material transitions from the hydrophobic state to the hydrophilic state within 3 days.

According to another example ("Example 48") further to Example 47, a second portion of the microporous material different from the first portion transitions from the hydrophobic state to the hydrophilic state within 7 days.

According to another example ("Example 49") further to any one of Examples 46-48, an entirety of the microporous material transitions from the hydrophobic state to the hydrophilic state within 30 days.

According to another example ("Example 50") further to any one of Examples 46-49, in the hydrophobic state, the microporous material is opaque.

According to another example ("Example 51") further to any one of Examples 46-50, in the hydrophilic state, the microporous material is transparent.

According to another example ("Example 52") further to any one of Examples 46-51, the shunt body has a maximum thickness of no greater than 500 µm.

According to another example ("Example 53") further to any one of Examples 46-52, in the hydrophobic state, a drop of water placed on a surface of the microporous material forms a contact angle of greater than 90 degrees with respect to the surface, and in the hydrophilic state, a drop of water placed on a surface of the microporous material forms the contact angle of less than 90 degrees with respect to the surface. The transition from the hydrophobic state to the hydrophilic state constitutes a decrease in the contact angle by at least 10 degrees.

According to another example ("Example 54") further to any one of Examples 46-53, the variable flow resistance is greater in the hydrophobic state than in the hydrophilic state.

According to another example ("Example 55") further to any one of Examples 46-54, the microporous material is more translucent in the hydrophilic state than in the hydrophobic state.

According to another example ("Example 56") further to any one of Examples 46-55, the reservoir receives the fluid through a port in the device body. The method further comprises securing an intake conduit to the device body at the port, the intake conduit being configured to receive the drainage.

According to another example ("Example 57") further to any one of Examples 46-56, the one or more microporous materials comprise a first layer having a first microporous membrane bonded to a second microporous membrane and a second layer comprising a third microporous membrane bonded to a fourth microporous membrane. Securing portions of the one or more microporous materials comprises bonding the second microporous membrane to the third microporous membrane.

According to another example ("Example 58") further to Example 57, the second and third microporous membranes are bonded to each other along peripheral edges of the first and second layers to define the reservoir and to dispose the reservoir between the second and third microporous membranes. The second and third microporous membranes are configured to resist tissue ingrowth. The first and fourth microporous membranes are configured to permit tissue ingrowth. The second and third microporous membranes have an expanded state that is maintained adjacent to the peripheral edges of the first and second layers.

According to another example ("Example 59") further to Example 57, securing portions of the microporous material comprises refraining from bonding the first microporous membrane to the fourth microporous membrane.

According to another example ("Example 60") further to Example 57, securing portions of the one or more microporous materials comprises arranging the first layer and the second layer in a stacked configuration such that the first microporous membrane and the fourth microporous membrane are outermost membranes of the device body and the second microporous membrane and third microporous membrane are innermost membranes of the device body.

According to another example ("Example 61"), a glaucoma drainage device for draining a fluid from an interior region of a human eye to an exterior region of the human eye is disclosed herein. The device includes a body having a continuous wall defining an internal reservoir within the body and a reservoir opening in the wall communicating with the internal reservoir, and a conduit extending from the body by a conduit length. The conduit has opposing first and second ends defining a passage through the conduit extending between the opposing first and second ends, the conduit first end engaging the reservoir opening to provide a fluidic connection between the conduit second end and the reservoir, the conduit length being sufficient to dispose the conduit first end at the exterior region of the human eye and to dispose the conduit second end at the interior region of the human eye. At least a portion of the continuous wall has a wall portion composed of a microporous material. The wall portion has an internal side facing the reservoir and an opposing external side facing the exterior region of the human eye, the wall portion internal side low porosity surface extending an entirety of the wall portion internal side. The wall portion external side has an alternating surface comprising the low porosity surface disposed between high porosity surfaces. The wall portion has an initial hydrophobic state that transitions to a final hydrophilic state within 30 days when the fluid engages the wall portion.

According to another example ("Example 62") further to Example 61, a first portion of the microporous material transitions from the hydrophobic state to the hydrophilic state within 3 days.

According to another example ("Example 63") further to Example 62, a second portion of the microporous material different from the first portion transitions from the hydrophobic state to the hydrophilic state within 7 days.

According to another example ("Example 64") further to any one of Examples 61-63, an entirety of the microporous material transitions from the hydrophobic state to the hydrophilic state within 30 days.

According to another example ("Example 65") further to any one of Examples 61-64, in the hydrophobic state, the microporous material is opaque.

According to another example ("Example 66") further to any one of Examples 61-65, in the hydrophilic state, the microporous material is transparent.

According to another example ("Example 67") further to any one of Examples 61-66, the shunt body has a maximum thickness of no greater than 500 μm.

According to another example ("Example 68") further to any one of Examples 61-67, in the hydrophobic state, a drop of water placed on a surface of the microporous material forms a contact angle of greater than 90 degrees with respect to the surface, and in the hydrophilic state, a drop of water placed on a surface of the microporous material forms the contact angle of less than 90 degrees with respect to the surface. The transition from the hydrophobic state to the hydrophilic state constitutes a decrease in the contact angle by at least 10 degrees.

According to another example ("Example 69") further to any one of Examples 61-68, the variable flow resistance is greater in the hydrophobic state than in the hydrophilic state.

According to another example ("Example 70") further to any one of Examples 61-69, the microporous material is more translucent in the hydrophilic state than in the hydrophobic state.

According to another example ("Example 71") further to any one of Examples 61-70, the wall portion defines a wall portion thickness extending between the internal side and the external side. The wall portion thickness defines an internal region of the wall portion having a transition porosity that is between a porosity of the low porosity surface of the internal side and a porosity of the high porosity surface of the external side.

According to another example ("Example 72") further to any one of Examples 61-70, the wall portion defines a wall portion thickness extending between the internal side and the external side. The wall portion thickness defines an internal region of the wall portion extending between the low porosity surface of the internal side and the low porosity surface of the external side. The internal region has an internal region porosity that is equal to porosities of the low porosity surfaces of the internal side and the external side.

According to another example ("Example 73") further to any one of Examples 61-70, the wall portion defines a wall portion thickness extending between the internal side and the external side. The wall portion thickness defines an internal region of the wall portion extending between the low porosity surface of the internal side and the high porosity surface of the external side. The internal region has an internal region porosity that is equal to a porosity of the low porosity surface of the internal side.

According to another example ("Example 74") further to any one of Examples 61-70, the wall portion defines a wall portion thickness extending between the internal side and the external side. The wall portion thickness defines an internal region of the wall portion extending between the low porosity surface of the internal side and the high porosity surface of the external side. The internal region has an internal region porosity that is equal to a porosity of the high porosity surface of the external side.

According to another example ("Example 75") further to any one of Examples 61-74, the fluidic connection between the conduit second end and the reservoir further extends from the reservoir through the microporous material to provide a fluidic communication from the reservoir to the exterior region of the human eye.

According to another example ("Example 76") further to Example 75, the fluidic communication defines a flow path through the microporous material.

According to another example ("Example 77") further to Example 76, the flow path through the microporous material is in a direction that is directed away from the reservoir.

According to another example ("Example 78") further to Example 76, the flow path through the microporous material proceeds from a microporous region having a low porosity to a microporous region having a high porosity.

According to another example ("Example 79"), a method is disclosed for controlling a flow of a fluid from an eye to a tissue surrounding the eye. The method includes: inflating a reservoir with the fluid disposed to engage a hydrophobic material defining the reservoir, the hydrophobic material providing a first flow resistance; transitioning the hydrophobic material into a hydrophilic material within 30 days after engaging the fluid, the transitioning defining a variable flow resistance of the material that decreases from the first flow resistance to a second flow resistance that is lower than the first flow resistance; and draining the reservoir by directing the fluid out through the hydrophilic material to the tissue surrounding the eye to relieve a fluidic pressure of the eye.

According to another example ("Example 80") further to Example 79, the hydrophobic material and the hydrophilic material are a microporous material.

According to another example ("Example 81") further to Example 80, the hydrophobic material is the microporous material in a hydrophobic state.

According to another example ("Example 82") further to Example 80, he hydrophilic material is the microporous material in a hydrophilic state.

According to another example ("Example 83") further to Example 80, the microporous material is initially in a hydrophobic state and the transitioning of the hydrophobic material into the hydrophilic material changes the microporous material from the hydrophobic state to the hydrophobic state.

According to another example ("Example 84") further to Example 83, a first portion of the microporous material transitions from the hydrophobic state to the hydrophilic state within 3 days.

According to another example ("Example 85") further to Example 84, a second portion of the microporous material different from the first portion transitions from the hydrophobic state to the hydrophilic state within 7 days.

According to another example ("Example 86") further to Example 83, an entirety of the microporous material transitions from the hydrophobic state to the hydrophilic state within 30 days.

According to another example ("Example 87") further to Example 83, in the hydrophobic state, the microporous material is opaque.

According to another example ("Example 88") further to Example 83, in the hydrophilic state, the microporous material is transparent.

According to another example ("Example 89") further to Example 79, the hydrophobic material has a maximum thickness of no greater than 500 µm.

According to another example ("Example 90") further to Example 83, in the hydrophobic state, a drop of water placed on a surface of the microporous material forms a contact angle of greater than 90 degrees with respect to the surface, and in the hydrophilic state, a drop of water placed on a surface of the microporous material forms the contact angle of less than 90 degrees with respect to the surface. The transition from the hydrophobic state to the hydrophilic state constitutes a decrease in the contact angle by at least 10 degrees.

According to another example ("Example 91") further to Example 83, the variable flow resistance is greater in the hydrophobic state than in the hydrophilic state.

According to another example ("Example 92") further to Example 83, the microporous material is more translucent in the hydrophilic state than in the hydrophobic state.

According to another example ("Example 93") further to Example 80, the method includes providing a continuous wall that defines the reservoir and a reservoir opening in the continuous wall communicating with the reservoir and through which the conduit is engagingly received. At least a portion of the continuous wall has a wall portion composed of the microporous material. The wall portion has an internal side facing the reservoir and an opposing external side facing the exterior region of the eye. The wall portion internal side has a low porosity surface extending an entirety of the wall portion internal side. The wall portion external side has alternating low porosity and high porosity surfaces.

According to another example ("Example 94") further to Example 80, the microporous material comprises a first layer having a first microporous membrane integrated with a second microporous membrane and a second layer having a third microporous membrane integrated with a fourth microporous membrane.

According to another example ("Example 95") further to Example 94, the microporous material comprises expanded polytetrafluoroethylene (ePTFE).

According to another example ("Example 96") further to Example 95, a first microporous membrane permeability of the first microporous membrane is greater than a second microporous membrane permeability of the second microporous membrane. A fourth microporous membrane permeability of the fourth microporous membrane is greater than a third microporous membrane permeability of the third microporous membrane.

According to another example ("Example 97") further to Example 96, the first layer and the second layer are in a stacked configuration such that the first microporous membrane and the fourth microporous membrane are outermost membranes of the shunt body and the second microporous membrane and third microporous membrane are innermost membranes of the shunt body defining the reservoir.

According to another example ("Example 98") further to Example 94, the first microporous membrane has a first microporous membrane permeability, the second microporous membrane has a second microporous membrane permeability, the third microporous membrane has a third microporous membrane permeability, and the fourth microporous membrane has a fourth microporous membrane permeability. The second microporous membrane permeability is about the same as the third microporous membrane permeability, and the first microporous membrane permeability is about the same as the fourth microporous membrane permeability. Each of the second microporous membrane permeability and the third microporous membrane permeability are different from the first microporous membrane permeability and the fourth microporous membrane permeability.

According to another example ("Example 99") further to Example 94, the second and third microporous membranes are bonded to each other along peripheral edges of the first and second layers to define the reservoir and to dispose the reservoir between the second and third microporous membranes. The second and third microporous membranes are configured to resist tissue ingrowth. The first and fourth microporous membranes are configured to permit tissue ingrowth. The second and third microporous membranes have an expanded state that is maintained adjacent to the peripheral edges of the first and second layers.

According to another example ("Example 100") further to Example 94, the reservoir is configured to move between a deflated state in which the second and third microporous membranes resist fluid flow therebetween and an inflated state in which fluid is allowed to flow between the second and third microporous membranes.

According to another example ("Example 101") further to Example 100, fluid flow into the reservoir is directed from the distal end of the conduit toward a periphery of chamber.

According to another example ("Example 102") further to Example 100, the reservoir has a reservoir proximal section that is adjacent the distal end of the conduit and a reservoir distal section that is positioned opposite of the reservoir proximal section. During drainage of the fluid, the reservoir proximal section is configured to inflate before the reservoir distal section.

According to another example ("Example 103") further to Example 83, the variable flow resistance corresponds to a rate of change in pressure with respect to flow rate over time.

According to another example ("Example 104") further to Example 103, the microporous material transitions from the hydrophobic state having a first flow resistance to a partially hydrophilic state having a second flow resistance and then to the hydrophilic state having a third flow resistance. The first flow resistance is greater than both the second flow resistance and the third flow resistance, and the second flow resistance is greater than the third flow resistance.

According to another example ("Example 105") further to Example 83, the microporous material is configured to transition from the hydrophobic state to the hydrophilic state based on a wetting of the microporous material with the fluid. The microporous material is configured such that wetting of an outer portion of the shunt body occurs before wetting of the reservoir.

According to another example ("Example 106"), a method is disclosed for managing a fluidic pressure of the eye. The method includes: identifying an undesirable fluidic pressure of the eye relating to an ocular fluid disposed in the eye; inflating a reservoir proximate to the eye with a conduit fluidically engaging the ocular fluid to deliver the ocular fluid to the reservoir and engage a reservoir wall comprising a material that transitions from an initial hydrophobic state to a hydrophilic state within 30 days after the reservoir wall engages the ocular fluid, the transition from the hydrophobic state to the hydrophilic state defining a variable flow resistance of the material that decreases from an initial first flow resistance to a second flow resistance that is lower than the first flow resistance; and draining the reservoir by directing the ocular fluid through the material to the tissue surrounding the eye to improve the undesirable fluidic pressure of the eye.

According to another example ("Example 107") further to Example 106, the variable flow resistance provides sufficient flow resistance to maintain a minimal fluidic pressure to mitigate the creation of a short-term post-operative hypotony condition.

According to another example ("Example 108") further to Example 106 or 107, the material is a microporous material.

According to another example ("Example 109") further to Example 108, a first portion of the microporous material transitions from the hydrophobic state to the hydrophilic state within 3 days.

According to another example ("Example 110") further to Example 109, a second portion of the microporous material different from the first portion transitions from the hydrophobic state to the hydrophilic state within 7 days.

According to another example ("Example 111") further to Example 108, an entirety of the microporous material transitions from the hydrophobic state to the hydrophilic state within 30 days.

According to another example ("Example 112") further to Example 108, in the hydrophobic state, the microporous material is opaque.

According to another example ("Example 113") further to Example 108, in the hydrophilic state, the microporous material is transparent.

According to another example ("Example 114") further to Example 108, the microporous material in the hydrophobic state has a maximum thickness of no greater than 500 µm.

According to another example ("Example 115") further to Example 108, in the hydrophobic state, a drop of water placed on a surface of the microporous material forms a contact angle of greater than 90 degrees with respect to the surface, and in the hydrophilic state, a drop of water placed on a surface of the microporous material forms the contact angle of less than 90 degrees with respect to the surface. The transition from the hydrophobic state to the hydrophilic state constitutes a decrease in the contact angle by at least 10 degrees.

According to another example ("Example 116") further to Example 106, the variable flow resistance is greater in the hydrophobic state than in the hydrophilic state.

According to another example ("Example 117") further to Example 108, the microporous material is more translucent in the hydrophilic state than in the hydrophobic state.

According to another example ("Example 118") further to Example 108, the reservoir wall defines a reservoir opening communicating with the reservoir and through which the conduit is engagingly received. At least a portion of the reservoir wall has a wall portion composed of the microporous material. The wall portion has an internal side facing the reservoir and an opposing external side facing the exterior region of the eye. The wall portion internal side has a low porosity surface extending an entirety of the wall portion internal side. The wall portion external side has alternating low porosity and high porosity surfaces.

According to another example ("Example 119") further to Example 108, the microporous material comprises a first layer having a first microporous membrane integrated with a second microporous membrane and a second layer having a third microporous membrane integrated with a fourth microporous membrane.

According to another example ("Example 120") further to Example 108, the microporous material comprises expanded polytetrafluoroethylene (ePTFE).

According to another example ("Example 121") further to Example 120, a first microporous membrane permeability of the first microporous membrane is greater than a second microporous membrane permeability of the second microporous membrane, and wherein a fourth microporous membrane permeability of the fourth microporous membrane is greater than a third microporous membrane permeability of the third microporous membrane.

According to another example ("Example 122") further to Example 121, the first layer and the second layer are in a stacked configuration such that the first microporous membrane and the fourth microporous membrane are outermost membranes of the shunt body and the second microporous membrane and third microporous membrane are innermost membranes of the shunt body defining the reservoir.

According to another example ("Example 123") further to Example 119, the first microporous membrane has a first microporous membrane permeability, the second microporous membrane has a second microporous membrane permeability, the third microporous membrane has a third microporous membrane permeability, and the fourth microporous membrane has a fourth microporous membrane permeability. The second microporous membrane permeability is about the same as the third microporous membrane permeability, and the first microporous membrane permeability is about the same as the fourth microporous membrane permeability. Each of the second microporous membrane permeability and the third microporous membrane permeability are different from the first microporous membrane permeability and the fourth microporous membrane permeability.

According to another example ("Example 124") further to Example 119, the second and third microporous membranes are bonded to each other along peripheral edges of the first and second layers to define the reservoir and to dispose the reservoir between the second and third microporous membranes. The second and third microporous membranes are configured to resist tissue ingrowth. The first and fourth microporous membranes are configured to permit tissue ingrowth. The second and third microporous membranes have an expanded state that is maintained adjacent to the peripheral edges of the first and second layers.

According to another example ("Example 125") further to Example 119, the reservoir is configured to move between a deflated state in which the second and third microporous membranes resist fluid flow therebetween and an inflated state in which fluid is allowed to flow between the second and third microporous membranes.

According to another example ("Example 126") further to Example 125, fluid flow into the reservoir is directed from the distal end of the conduit toward a periphery of chamber.

According to another example ("Example 127") further to Example 125, the reservoir has a reservoir proximal section that is adjacent the distal end of the conduit and a reservoir distal section that is positioned opposite of the reservoir proximal section. During drainage of the fluid, the reservoir proximal section is configured to inflate before the reservoir distal section.

According to another example ("Example 128") further to Example 108, the variable flow resistance corresponds to a rate of change in pressure with respect to flow rate over time.

According to another example ("Example 129") further to Example 128, the microporous material transitions from the hydrophobic state having a first flow resistance to a partially hydrophilic state having a second flow resistance and then to the hydrophilic state having a third flow resistance. The first flow resistance is greater than both the second flow resistance and the third flow resistance, and the second flow resistance is greater than the third flow resistance.

According to another example ("Example 130") further to Example 108, the microporous material is configured to transition from the hydrophobic state to the hydrophilic state based on a wetting of the microporous material with the fluid. The microporous material is configured such that wetting of an outer portion of the shunt body occurs before wetting of the reservoir.

The foregoing Examples are just that, and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

FIG. 1C is a schematic representation of the implanted drainage device at Detail A2 in FIG. 1B;

FIG. 2A is a side-view illustration of a drainage system in the form of a glaucoma shunt consistent with various aspects of the present disclosure;

FIG. 2B is a bottom-view illustration of the drainage system of FIG. 2A;

FIG. 6A (prior art) is a photograph of a top view of a prior-art Ahmed glaucoma valve modified with a polyethylene shell and implementing solid plates as known in the art;

FIG. 6B (prior art) is a photograph of a side view of the prior-art glaucoma valve of FIG. 6A when a portion of the solid plates are removed to show the reservoir located therein; and FIG. 6C (prior art) is an SEM image of a portion of a surface of the solid plate used in the prior-art glaucoma valve of FIG. 6A;

FIGS. 8A through 8E are backlit microscope images of a drainage device in various states of transitioning from a hydrophobic state to a hydrophilic state consistent with various aspects of the present disclosure;

FIG. 11B is a graph comparing a percentage of the area of the device that is wetted over the course of wetting.

DETAILED DESCRIPTION

Definitions and Terminology

Figure 1A:
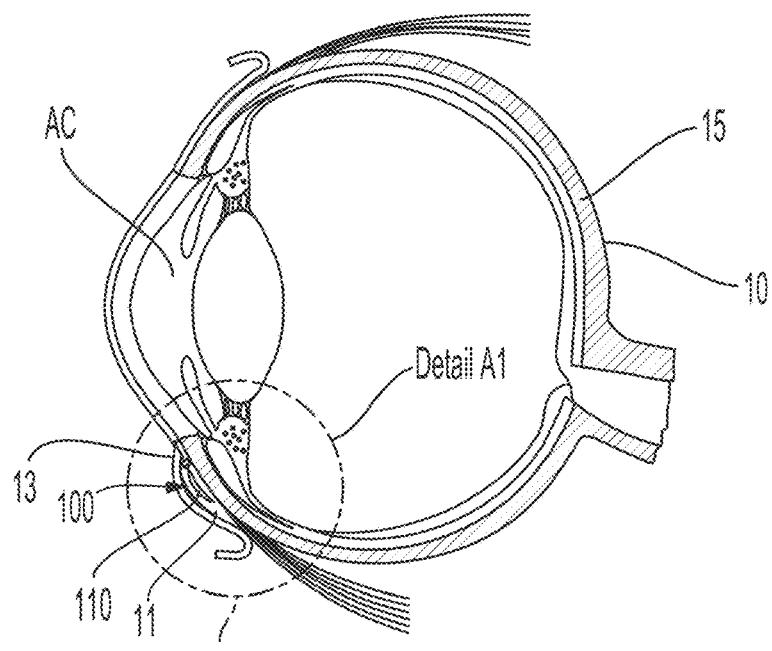
FIG. 1A is an illustration of an eye with a drainage system implanted therein consistent with various aspects of the present disclosure.

This disclosure is not meant to be read in a restrictive manner. For example, the terminology used in the application should be read broadly in the context of the meaning those in the field would attribute such terminology.

With respect to terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error, differences in measurement and/or manufacturing equipment calibration, human error in reading and/or setting measurements, minor adjustments made to optimize performance and/or structural parameters in view of differences in measurements associated with other components, particular implementation scenarios, imprecise adjustment and/or manipulation of objects by a person or machine, and/or the like, for example. In the event it is determined that individuals having ordinary skill in the relevant arts would not readily ascertain values for such reasonably small differences, the terms "about" and "approximately" can be understood to mean plus or minus 10% of the stated value.

DESCRIPTION OF VARIOUS EMBODIMENTS

Persons skilled in the art will readily appreciate that various aspects of the present disclosure can be realized by any number of methods and apparatuses configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

Figure 5A:
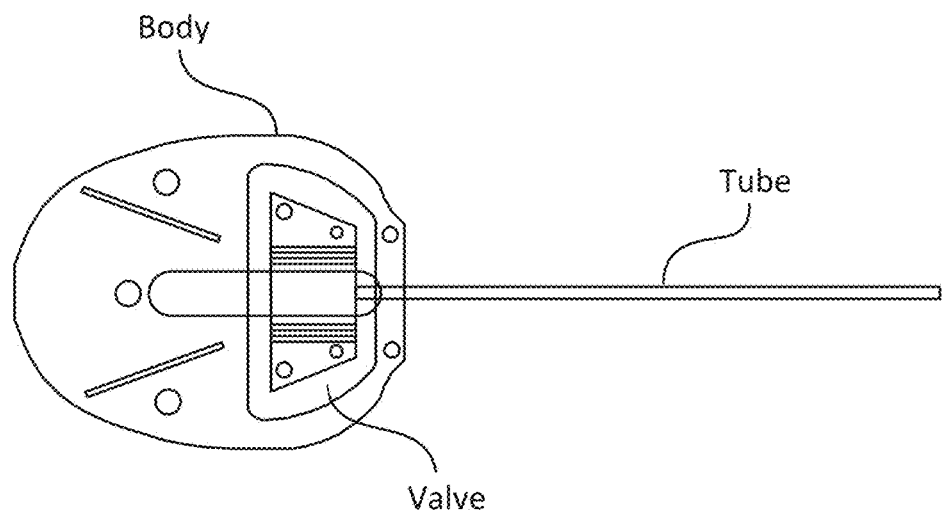
FIGS. 5A and 5B (prior art) are schematic top and side views, respectively, of a prior-art Ahmed glaucoma valve device for glaucoma drainage.
Figure 5B:
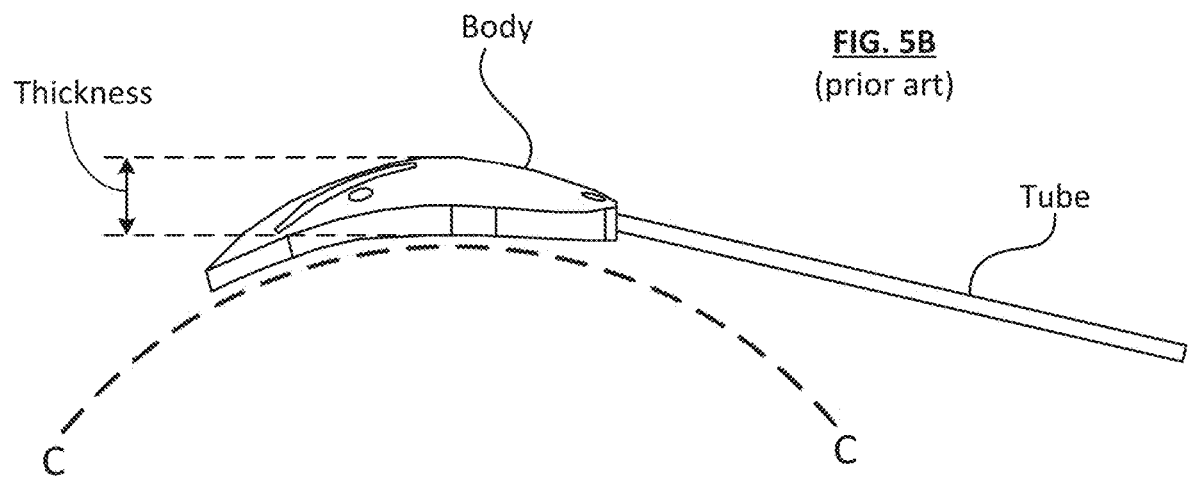

The device shown in FIGS. 5A and 5B is an Ahmed Glaucoma Value model FP7 (New World Medical, Inc., Rancho Cucamonga, CA) with a silicone plate, a silicone drainage tube, a silicone valve membrane, and a polypropylene (PP) valve casing, with a maximum thickness of 2.1 mm. The Ahmed device includes a plate body ("Body") which defines a surface over which the drained fluid (aqueous humor) is directed to flow, and a drainage tube ("Tube") which directs the fluid (aqueous humor) to flow over the surface of the plate body. The plate body has a maximum thickness ("Thickness") and is made of medical-grade silicone which is rigid and lacks flexibility to conform to the curvature of the eye when implanted. As such, the plate body has a curvature (defined by the broken line C-C) which is preformed (that is, formed before implantation) to approximate the curvature of the surface of the eye. The curvature C-C is fixed and is the same for all similarly designed Ahmed glaucoma drainage devices and thus, in some cases, may fail to accommodate the unique curvature of each patient's eye. Additionally, in order to regulate fluidic pressures, the device requires the inclusion of a mechanical valve structure ("Valve") that is non-dissolvable and non-biodegradable in order to control a fluid pressure within the device over a long period of time (e.g., for years). The valve, in certain examples known in the art, is capable of closing when the pressure exceeds above a threshold, such as 7 mmHg, in order to decrease the risk of postoperative hypotony-related complications. The valve, as shown, has a certain thickness and rigidity which defines the thickness of the device, thereby causing the device to lack the flexibility to conform to the curvature of the eye when implanted, as well as increasing the thickness of the plate body.

It is understood that the Ahmed Glaucoma Valves are designed such that flow resistance remains the same for years, but as the flow rate decreases over a prolonged period of time, the devices' functionality and performance as a valve may vary, according to articles such as: Choudhari et al. "Is Ahmed Glaucoma Valve Consistent in Performance?" Translational Vision Science & Technology. 2018 June 22; 7(3):19. doi: 10.1167/tvst.7.3.19. PMID: 29946493; PMCID: PMC6016431; Moss et al. "Assessment of closing pressure in silicone Ahmed FP7 glaucoma valves." Journal of Glaucoma. 2008 September; 17(6):489-93. doi: 10.1097/IJG.0b013e3181622532. PMID: 18794686; and Bochmann et al. "Intraoperative testing of opening and closing pressure predicts risk of low intraocular pressure after Ahmed glaucoma valve implantation." Eye (Lond). 2014 October; 28(10):1184-9. doi: 10.1038/eye.2014.168. Epub 2014 Jul. 25. PMID: 25060848; PMCID: PMC4194337.

FIGS. 6A through 6C show another example of a glaucoma drainage device as known in the art. The device as shown includes two solid plates, such as those made from silicone as shown in FIGS. 5A and 5B, forming two layers ("L1" and "L2") to receive fluid from the anterior chamber (AC) of the eye and store it inside an internal chamber formed between the plates. The device shown in FIGS. 6A and 6B is an Ahmed Glaucoma Value model M4 (New World Medical, Inc., Rancho Cucamonga, CA) with a polyethylene shell to reduce the fibrotic reaction around the drainage plate compared with the S2 and FP7 models in patients with glaucoma, as previously disclosed in Kim et al. "Clinical experience with a novel glaucoma drainage implant." Journal of Glaucoma. 2014 February; 23(2):e91-7. DOI: 10.1097/ijg.0b013e3182955d73. PMID: 23689073.

The prior-art device is made of a tube ("Tube") installed between the two layers L1 and L2 of solid material such as porous polyethylene shells (e.g., Medpor) that follow the curvature of the eye, and between the layers L1 and L2 is defined a reservoir ("R") into which the tube directs the fluid from the eye. As shown in the prior-art device of FIG. 6C, which is scaled such that the black bar on the bottom of the figure represents 500 µm, the surface of the layers L1 and L2 include pores to improve tissue integration, such that the adjacent tissue can be integrated into the polyethylene shell surrounding the drainage device, as well as to ensure that fluid stored inside the reservoir R can be released back to the surrounding environment in order to prevent the shell from applying undue stress on the surrounding tissue.

However, in contrast to various embodiments described herein, implanting a solid or rigid piece of material, such as those shown in FIGS. 6A to 6C, (that is, a material lacking in flexibility and thinness) inside the eye increases the stress applied on the eye, especially within the conjunctival tissue of the eye, when subjected to pressure from the anterior chamber of the eye, which may not only lead to discomfort but also other complications that may arise from extended pressure increase within such a sensitive area of the eye.

Figure 1B:
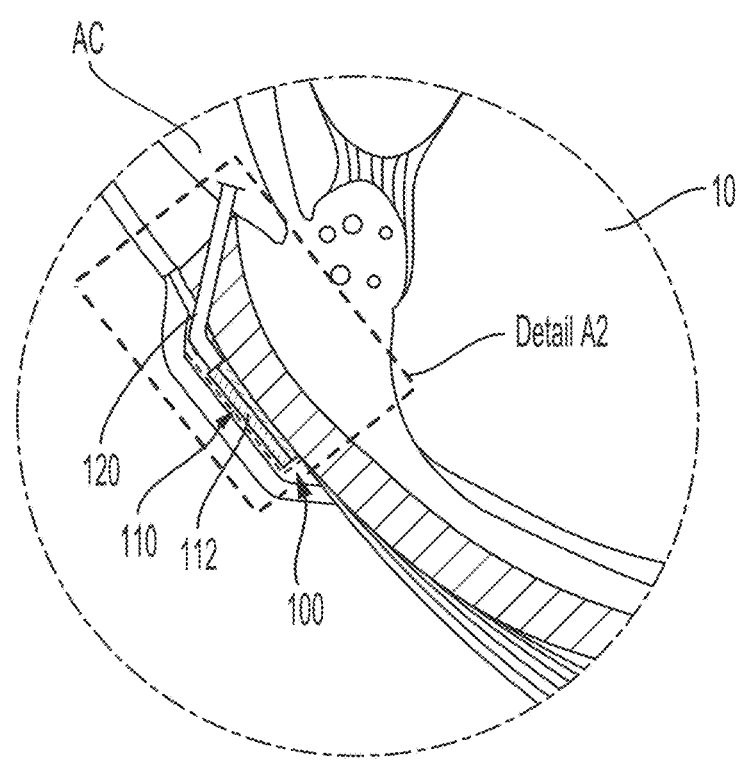
FIG. 1B is an illustration of a cross section of Detail A1 from FIG. 1A.

Various features of devices, systems, and methods disclosed herein can be seen in FIGS. 1A-1C. Aspects of the present disclosure relate to drainage devices, systems, and methods for biological fluids. More particularly, the present disclosure relates to devices, systems, and methods for draining aqueous humor from the anterior chamber 'AC' of an eye 10 of a patient so that the aqueous humor may be resorbed by the body elsewhere. To that end, FIG. 1A is an illustration of an eye 10 with a subconjunctival space 11 between a conjunctiva 13 and a sclera 15 of the eye 10. Implanted within the eye 10 is a drainage system 100 in accordance with principles of the present disclosure. FIG. 1B shows a cross section of detail A1 from FIG. 1A. FIG. 1C shows a schematic representation of the implanted drainage device 110 at Detail A2 in FIG. 1B. In an aspect of the present disclosure, a mechanism is provided for reabsorption of aqueous humor that has been expelled from the anterior chamber 'AC' of the eye 10 to reduce or otherwise stabilize intraocular pressure. One skilled in the art, however, will appreciate that aspects of the present disclosure are useful in other applications where drainage of biological fluid to be redirected in the body is desired.

The drainage system 100 illustrated in FIGS. 1A-1C includes a drainage device 110 for treating glaucoma. As illustrated here, this glaucoma drainage device 110 has a wall 112 (best seen in FIGS. 1B and 1C) that has a first side 114 and a second side 116. Although discussed below in connection with an intake conduit 120, it should be understood that the drainage device 110 can be a standalone product so long as some portion thereof is configured to receive fluid (e.g., directly from an incision, from the fluid conduit 120, etc.) and as such should not be considered outside the scope of this disclosure. Fluidly coupled to the drainage device 110 can be an intake conduit 120. When implanted, the intake conduit 120 extends from the anterior chamber CAC' of the eye 10 to the drainage device 110. The aqueous humor at the anterior chamber CAC' then flows through intake conduit 120 and into the drainage device 110.

Material selection of the drainage device 110 can contribute to its functionality and relatively low profile in comparison to other devices known in the art. The drainage device 110 can comprise biocompatible materials, including microporous materials such as expanded polytetrafluoroethylene (ePTFE) as discussed below. The intake conduit 120 can include biocompatible materials that are flexible and suitable for use in constructing elongate members. Some such suitable materials can include silicone, polytetrafluoroethylene, polypropylene, polymethyl methacrylate, acrylic, polyurethane, silastic, and metal. Such construction of the drainage system 100 is particularly useful for surgical implantation.

In general, surgical implantation of drainage devices, such as the drainage system 100, involve risk of abnormal pressures within the eye 10. For instance, when drainage devices are surgically implanted, such as in surgeries that require the creation of a bleb (as indicated by the dashed lines around the device 110) under the exterior surface tissue of the eye 10 (i.e., the conjunctiva 13), surrounding tissues fresh from the insult of the surgery do not provide appreciable flow resistance to aqueous flow until sufficient wound healing occurs. During this early post-operation period, the patient is at risk of hypotony of the eye 10 (e.g., too low eye pressure). To avoid hypotony, measures are taken to manage flow through the drainage device 110 for a period of time. For example, surgeons traditionally 'tie-off' a portion of the intake conduit 120 near its proximal end fora period of time and release the tie after surgical wound healing has sufficiently progressed such that the surrounding tissue will provide the necessary flow resistance. In certain commercial glaucoma shunt devices, a restrictive flow 'valve' is added distal of the intake conduit 120 where a plate section is located. These devices, however, are relatively stiff and bulky and still can result in hypotony. To the contrary, advantageously, drainage devices, systems, and methods according to principles of the present disclosure include low profile devices without the presence of a valve that generate appreciable flow resistance in the early post-operation period (a.k.a. a post-surgical wound healing period which may last for about 30 days after the operation), e.g., to avoid hypotony, by changing the flow resistance over a period of time from a state of high resistance with hydrophobic properties to a state of low resistance with hydrophilic properties over time, for example 30 days.

With reference to FIGS. 1B and 1C, a non-limiting example implantation of the drainage system 100 is shown. In this example, the drainage system 100 is shown disposed in a subconjunctival space 11 between the conjunctiva 13 and the sclera 15 of the eye 10. The drainage system 100 is shown oriented such that the first layer 114 extends along the sclera 15 and such that the second layer 116 extends along the conjunctiva 13. It will be appreciated that the portion of the second layer 116 that interfaces with the conjunctiva 13 may be configured to promote or permit tissue ingrowth, as discussed below. It will also be appreciated that the portion of the first layer 114 that interfaces with the sclera 15 may additionally or alternatively be configured to promote or permit tissue ingrowth, as discussed below. Such configurations help minimize relative movement between the drainage device 110 and the surrounding tissue.

Moreover, the intake conduit 120 is shown in FIGS. 1B and 1C as extending from the drainage device 110, and extending through a scleral access, perforation, or hole CH' (e.g., made by a physician during the implantation procedure according to known methods) such that a first end 122 (e.g., a proximal end) accesses the anterior chamber CAC' and places a port 271 in communication therewith. In some embodiments, when implanted, aqueous humor enters the first end 122 of the intake conduit 120 and travels to a second end 124 (e.g., a distal end) of the intake conduit 120 in fluid communication with the drainage device 110. Together, the wall 112 and the intake conduit 120 can define a flow passage 140 along which the drainage flows through the drainage device 110. In some embodiments the second end 124 is positioned within the drainage device 110 such that the evacuated aqueous humor enters a reservoir 130 defined within the drainage device 110 and penetrates through the various diffusion membranes of the drainage device 110, where the aqueous humor is then absorbable by the surrounding and/or ingrown tissue.

Figure 2C:
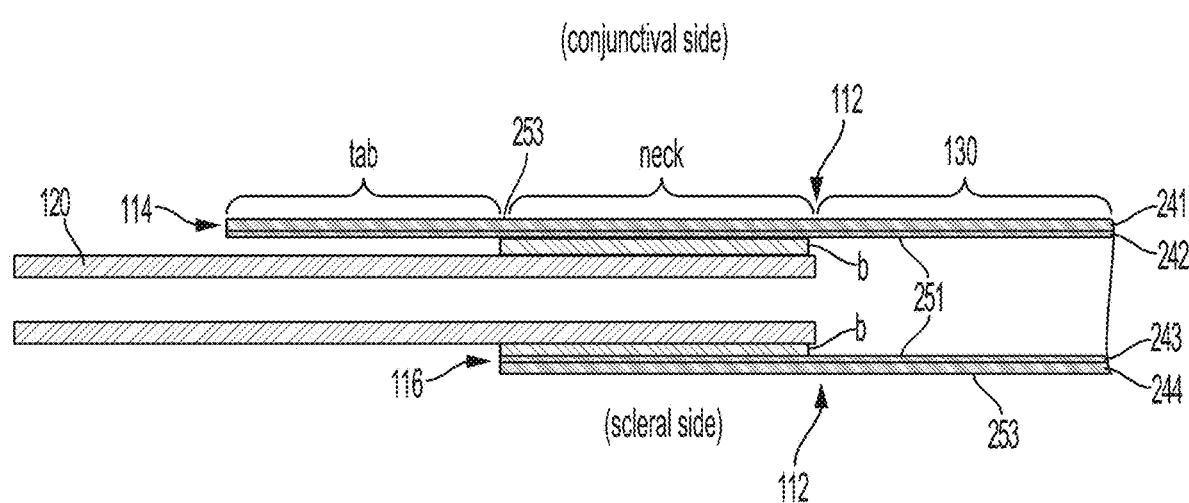
FIG. 2C is a cross-sectional view of the drainage system of FIG. 2A taken at section B-B with the drainage system in a deflated state and having a conjunctival tab.
Figure 2D:
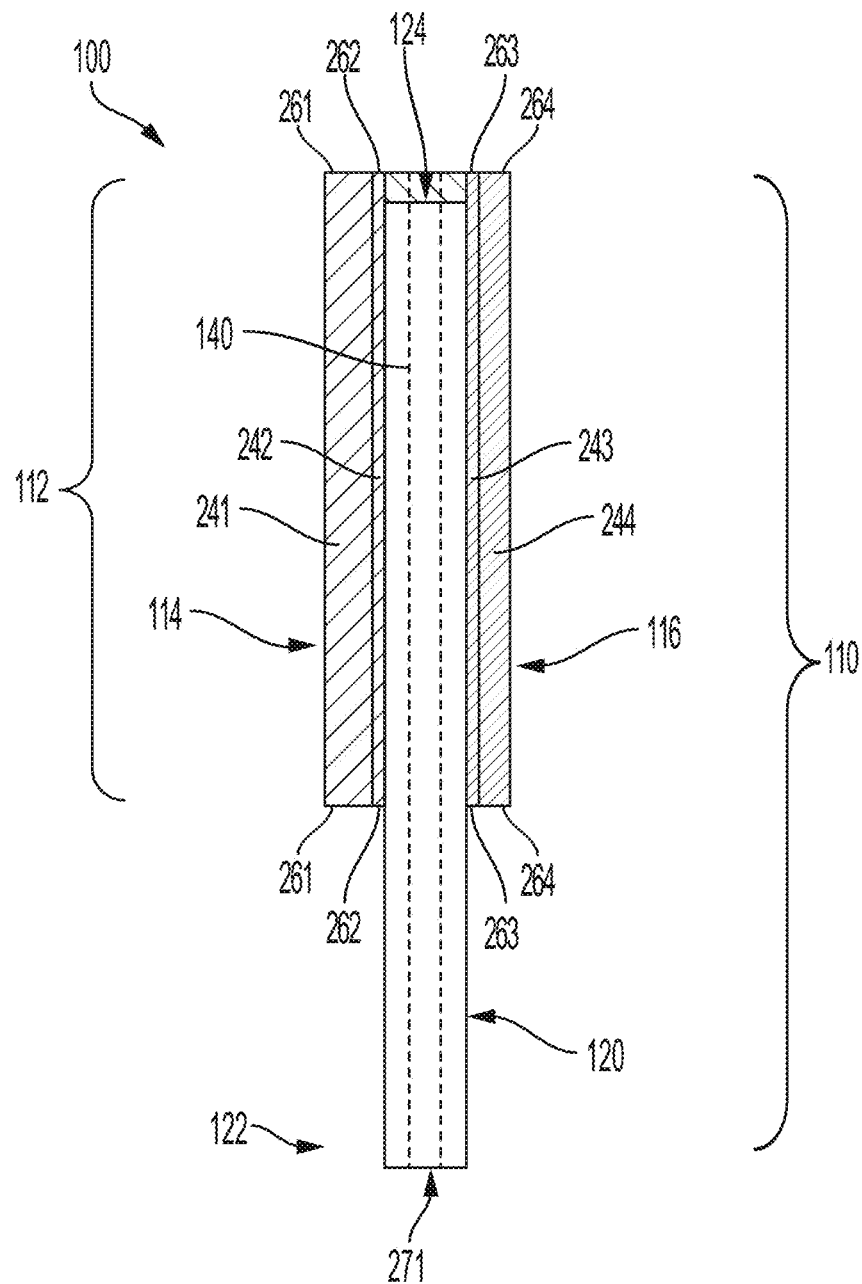
FIG. 2D is a cross-sectional view of the drainage system 100 of FIG. 2A taken at section C-C with the drainage system in the deflated state and having first and second layers with different microstructure and thickness.
Figure 2E:
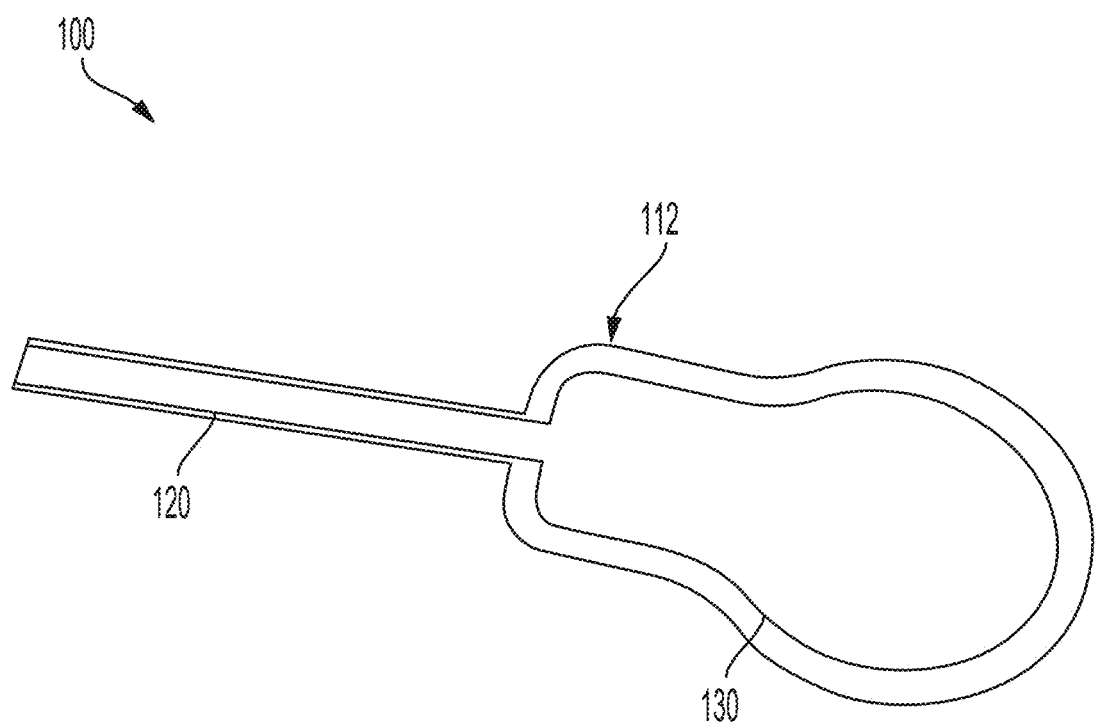
FIG. 2E is a perspective view of an alternative, miniature embodiment of the drainage system 100 of FIG. 2A.

Turning to FIGS. 2A-2E, various aspects of an example drainage system 100 in the form of a glaucoma shunt 110 are shown. FIG. 2A shows a side-view illustration of a drainage system 100. FIG. 2B shows a bottom-view illustration of the drainage system 100 of FIG. 2A. FIG. 2C shows a cross-sectional view of the drainage system 100 of FIG. 2A taken at section B-B with the drainage system 100 in a deflated state, a collapsed state, or a drained state in which the drainage system 100 (or more particularly the reservoir 130) is drained of its inner fluid such as a biological fluid. This drainage system 100 illustrates a conjunctival tab to prevent erosion of the conjunctiva 13 by the conduit 120, a neck where the conduit 120 is bonded (e.g., via adhesive at "b") to the wall 112, and a reservoir 130 at a distal end of the conduit 120. FIG. 2D shows a cross-sectional view of the drainage system 100 of FIG. 2A taken at section C-C with the drainage system 100 in the deflated state or the collapsed state. FIG. 2E shows a perspective view of an alternative, miniature embodiment of the drainage system 100 of FIG. 2A. As is also the case in FIGS. 1A-1C, here, the drainage system 100 relates to draining biological fluid from one portion of a patient's body to another. Notably, the conduit 120 can be inserted into the reservoir 130 at variable depth such as at a shallow depth as shown in FIG. 2C or a major depth in as shown in FIG. 2D so long as fluid is allowed to escape the distal end 124 of the conduit 120 to fill the reservoir 130. Such devices can have a low profile with appreciable fluid flow resistance in the early post-operation period to avoid hypotony.

Being a glaucoma shunt 110, the drainage system 100 shown in these figures is useful for draining a biological fluid from the eye. This drainage can proceed from an internal portion (e.g., the anterior chamber) of the eye to a surrounding tissue external to an eye. The drainage device 110 can include a wall 112 that defines a reservoir 130 disposed within the wall 112. The reservoir 130 can be configured to be in fluid communication with the eye to receive the drainage from the internal portion of the eye into the reservoir 130. The wall 112 may be integrated into or altogether form a body of the drainage device 110. In this regard, the body can have a wall 112 defining an internal reservoir 130 within the body and an internal reservoir opening (e.g., at or around adhesive 'b' in FIG. 2C) that is arranged in the wall 112 so as to communicate with the internal reservoir 130. As often described herein, this wall 112 is continuous (e.g., a continuous wall 112) but other types of walls 112 with sealed discontinuities are also contemplated.

According to some examples, a user may identify an undesirable fluidic pressure of the eye relating to an ocular fluid disposed in the eye. The user may inflate the reservoir 130 proximate to the eye with the conduit 120 fluidically engaging the ocular fluid to deliver the ocular fluid to the reservoir 130 and engage the reservoir wall 112 comprising a material that transitions from an initial hydrophobic state to a hydrophilic state within 30 days after the wall 112 engages the ocular fluid. The transition from the hydrophobic state to the hydrophilic state defines a variable flow resistance of the material that decreases from an initial first flow resistance to a second flow resistance that is lower than the first flow resistance. Subsequently, the reservoir 130 may be drained by directing the ocular fluid through the hydrophilic material to the tissue surrounding the eye to improve the undesirable fluidic pressure of the eye. The hydrophilic material may be the wall 112 in the hydrophilic state as explained herein.

The wall 112 can include a microporous material that transitions from a hydrophobic state to a hydrophilic state. In examples, the wall 112 is configured to provide a variable flow resistance as the wall 112 transitions from the hydrophobic state to the hydrophilic state. The drainage device 110 can include a flow passage 140 that is configured to facilitate the drainage of a biological fluid from the internal portion of the eye to a surrounding tissue that is external to the eye. Notably, the flow passage 140 can include a variable flow resistance to the drainage that passes through the flow passage 140. The flow passage 140 can have a first flow resistance portion with a first flow resistance and a second flow resistance portion with a second flow resistance. Optionally, as explained in more detail below, the first flow resistance can be different from the second flow resistance.

The wall 112 can be a multi-layered structure comprising one or more microstructures. The wall 112 can also be a continuous single-layer structure comprising multiple sub-layers within the continuous single-layer structure or that can define opposing sides of the continuous single-layer structure that present one porosity on a first side and a second porosity on a second side of the single-layer structure. In this regard, examples of the wall 112 can include a first layer 114 having a first microporous membrane 241 engaging a second microporous membrane 242 and a second layer 116 comprising a third microporous membrane 243 engaging a fourth microporous membrane 244. In many instances, this engaging between the first and second microporous membranes 241, 242 and the third and fourth microporous membranes 243, 244 is such that the first and second microporous membranes 241, 242 and the third and fourth microporous membranes 243, 244 respectively are integrally formed with each other. In certain instances, the first and second layers 114, 116 can comprise more or less microporous membranes, some such configurations are discussed in U.S. application Ser. No. 15/922,692 entitled "Integrated aqueous shunt for glaucoma treatment" and filed on Mar. 15, 2018, the full contents of which are incorporated herein by reference.

The presentation of varying microporous materials within the continuous single-layer structure can facilitate operation of the reservoir 130. As fluid flows into the reservoir 130, the fluid can engage the microporous material of the wall 112. Under certain circumstances, the second and third microporous membranes 242, 243 are engaging each other along peripheral edges 247 of the drainage device 110. For instance, the second and third microporous membranes 242, 243 can engage at the periphery of the first and second layers 114, 116 to define a reservoir 130 disposed between the second and third microporous membranes 242, 243. This engagement can be a bond that is a hermitically sealing bond to ensure structural integrity of the reservoir 130. In certain instances, the second and third microporous membranes 242, 243 may initially contact or be in close proximity to one another such that, to initially inflate the reservoir 130, the fluid can engage the interface between the second and third microporous membranes 242, 243. In this regard, initially and thereafter, the reservoir 130 can be configured to move between a deflated state (or, alternatively, a collapsed state, a draining state, or a drained state) in which the second and third microporous membranes 242, 243 resist fluid flow therebetween and an inflated state (or, alternatively, an expanded state) in which fluid is allowed to flow between the second and third microporous membranes 242, 243. In certain instances, the first and fourth microporous membranes 241, 244 can remain unbonded to each other while in other instances it may be useful to engage them to one another (e.g., similarly to the engagement of the second and third microporous membranes 242, 243).

The wall portion has an initial hydrophobic state that transitions to a final hydrophilic state when the biological fluid engages the wall portion. In an embodiment, a first sub-layer within the wall portion has a first initial hydrophobic state that transitions to a first final hydrophilic state at a transition rate that is greater than another second sub-layer within the wall portion that transitions from a second initial hydrophobic state to a second final hydrophilic state. In some examples, the draining or emptying of the reservoir may occur when the wall portion is in the hydrophilic state. For instance, upon initial filling, the first and second layers may be gradually separated by inflowing drainage filling the reservoir formed between the first and second layers. As fluid from the drainage encounters the wall portion internal side 251, due to its low porosity, the microporous material at this side can take an extended time wetting out but may wet out fully at a reservoir proximal portion before wetting out fully at a reservoir distal portion. At the same time, tissue ingrowth is penetrating through the microstructure at the wall portion external side 253 until it reaches an area of low porosity such as at the wall portion internal side 251. Because the wall portion external side 253 has a higher porosity than that of the wall portion internal side 251, fluid from surrounding tissue may begin to wet out the wall portion external side 253 more quickly than the drainage within the reservoir. This action creates a gradient across the thickness of the microstructure where certain portions (e.g., high porosity portions) of the microporous material wet out and transition from hydrophobic to hydrophilic more quickly than other portions. On average, this gradient will be such that the wall portion internal side 251 makes this transition later (and thus provides a greater flow resistance that is variable) than the wall portion external side 253. Eventually, this gradient will disperse as both the wall portion internal side 251 and wall portion external side 253 become hydrophilic to a point where drainage through the microporous material is fairly constant in some examples.

Arrangement of the microporous material to form the wall 112 can be such that wetting of the microporous material is promoted at an external side 253 of the wall 112 before an internal side 251 of the wall 112. In this regard, the internal side 251 of the wall 112 can form the reservoir 130. In examples, the first layer 114 and the second layer 116 are in a stacked configuration such that the first microporous membrane 241 and the fourth microporous membrane 244 are the outermost membranes of the wall 112 and the second microporous membrane 242 and third microporous membrane 243 are the innermost membranes of the wall 112.

In examples, the microporous material can comprise ePTFE. In this regard, the microporous material can be configured to transition from the hydrophobic state to the hydrophilic state based on a wetting of the microporous material with the biological fluid, and wherein the microporous material is configured such that wetting of an outer portion of the wall 112 occurs before wetting of the surfaces defining the reservoir 130. In examples, the hydrophilic state promotes tissue ingrowth. In some such examples, the hydrophilic state can define a first side of the microporous material, and the hydrophobic state can define a second side of the microporous material. Furthermore, other materials similar to ePTFE are contemplated. Those other materials can include polymers, such as, but not limited, to polyethylene, polyurethane, polysulfone, polyvinylidene fluorine (PVDF), polyhexafluoropropylene (PHFP), perfluoroalkoxy polymer (PFA), polyolefin, fluorinated ethylene propylene (FEP), acrylic copolymers and other suitable fluoro-copolymers.

Drainage from the internal portion of the eye can flow through the drainage device 110 via a flow passage 140 as exemplified in FIGS. 1C and 2D but also as presented in other figures defining a reservoir and/or a tube to allow a fluid to pass into the device. The flow passage 140 can include portions (e.g., some or all) of the wall 112 and, optionally, an intake conduit 120 as discussed in further detail below. In this regard, in an example, fluid can flow into the reservoir 130 via the flow passage 140 after being received at the wall 112 via an intake conduit 120 or directly and then out of the reservoir 130. For instance, upon a first instance of the reservoir 130 filling with biological fluid, the reservoir 130 can gradually move from the deflated state (collapsed state) toward the inflated state (expanded state). Biological fluid can then remain in the reservoir 130 until portions of the wall 112 transition from the hydrophobic state to the hydrophilic state. In such instances, the biologic fluid can penetrate through the wall 112 (e.g., from the internal side 251 of the wall 112 to either the external side 253 or peripheral edge of the wall 112) to be diverted into surrounding portions of the body at the wall 112.

In an embodiment that may in part or in whole use bonding to secure membranes together, the bonding of the microporous material can occur at the peripheral edges 261, 262, 263, 264 of the microporous membranes 241, 242, 243, 244 in the drainage device 110. In particular, the first microporous membrane 241 is shown with a first peripheral edge 261, the second microporous membrane 242 is shown with a second peripheral edge 262, the third microporous membrane 243 is shown with a third peripheral edge 263, and the fourth microporous membrane 244 is shown with a fourth peripheral edge 264. As alluded to above, any combination of these microporous membranes 241, 242, 243, 244 can be bonded at their respective peripheral edges 261, 262, 263, 264. In examples, the second and third microporous membranes 242, 243 are bonded at their peripheral edges 262, 263 to form the reservoir 130 therebetween the second and third microporous membranes 242, 243. In some such examples, the first and fourth microporous membranes 241, 244 are unbonded from the second and third peripheral edges 262, 263 of the second and third microporous membranes 242, 243 respectively. In some such examples, the first and fourth microporous membranes 241, 244 are unbonded from each other in part or entirely. In any of these instances, the bonding at peripheral edges 261, 262, 263, 264 of the microporous membranes 241, 242, 243, 244 can be a sealing bond and can optionally accommodate and sealingly bond additional structures, such as the intake conduit 120, to the drainage device 110. In an alternative embodiment similar to the embodiment described above, the bonding can be applied as described except between the first and second membranes 241 and 242 which can be replaced with a single unified layer with sub-layers having the properties of the first and second membranes, and except between the third and fourth membranes 243 and 244 which can likewise be replaced with a single unified layer with sub-layers having the properties of the third and fourth membranes.

Notably, at least a portion of the continuous wall 112 can have a wall portion (e.g., some or all of the wall 112) composed of a microporous material. The wall portion can have a wall portion internal side 251 facing the internal reservoir 130 and a wall portion external side 253 that opposes the wall portion internal side 251 and faces the exterior region of the human eye. The wall portion internal side 251 can have a low porosity surface extending an entirety of the wall portion internal side 251. The wall portion external side 253 can have an alternating surface comprising the low porosity surface disposed between high porosity surfaces.

The conduit 120 can be arranged so as to be extending from the body by a conduit length. The conduit 120 can have opposing first and second conduit ends 122, 124 defining a passage through the conduit 120 such that the passage extends between the opposing first and second conduit ends 122, 124. The first conduit end 122 can be engaging the internal reservoir opening to provide a fluidic connection between the second conduit end 124 and the internal reservoir 130. The conduit length can be sufficient enough to dispose the first conduit end 122 at the exterior region of the human eye and to dispose the second conduit end 124 at the interior region of the human eye. In examples, the fluidic connection between the second conduit end 124 and the internal reservoir 130 further extends from the internal reservoir 130 through the microporous material to provide a fluidic communication from the internal reservoir 130 to the exterior region of the human eye. This fluidic communication can define a flow path through the microporous material. As further described below, the flow path through the microporous material can be in a direction that is directed away from the internal reservoir 130 and/or proceeds from a low porosity microporous region to a high porosity microporous region.

Various features of another example of a drainage system 100 consistent with various aspects of the present disclosure is shown in FIG. 2E. In particular, like other drainage devices discussed elsewhere herein, FIG. 2E shows a drainage system 100 having a wall 112 with a reservoir 130 defined therein and an intake conduit 120 that is in fluid communication with the reservoir 130. As is also the case in FIGS. 1A-1C and 2A-2D, here, the drainage system 100 relates to draining biological fluid from one portion of a patient's body to another. Such devices can have a low profile with appreciable fluid flow resistance in the early post-operation period to avoid hypotony. This device 110 may be smaller in size (e.g., in one or multiple dimensions, including length, width, and thickness) and therefore more suitable for smaller patients than the device 110 in FIGS. 2A-2D. In some examples, thickness of the device 110 (that is, a maximum thickness of the shunt or shunt body 110) may range from about 25 µm to about 30 µm, about 30 µm to about 40 µm, about 40 µm to about 50 µm, about 50 µm to about 60 µm, from about 60 µm to about 70 µm, from about 70 µm to about 80 µm, from about 80 µm to about 90 µm, from about 90 µm to about 100 µm, from about 10 µm to about 150 µm, from about 150 µm to about 200 µm, from about 200 µm to about 250 µm, from about 250 µm to about 300 µm, from about 300 µm to about 350 µm, from about 350 µm to about 400 µm, from about 400 µm to about 450 µm, from about 450 µm to about 500 µm, or any other suitable value or range therebetween and/or combination of ranges thereof.

The drainage system 100 shown here is similar in many respects to the drainage systems discussed above. For instance, the drainage system 100 shown here can include first and second layers as discussed with respect to FIGS. 2A-2D. These layers are bonded (e.g., at second and third microporous membranes) around an intake conduit 120 similar to that discussed with respect to FIGS. 1A-1C. Although shown extending to a particular location, the distal end of the intake conduit 120 can be positioned (e.g., more proximally or distally than illustrated, suspended between or positioned along the internal side of the reservoir 130, etc.) such that it is in communication with the reservoir 130. Other variations will be apparent to those skilled in the art.

As discussed above, drainage from the internal portion of the eye into the reservoir 130 can be facilitate by creating a flow passage therebetween. An example medium for creating such a fluid passage is via an intake conduit 120. The intake conduit 120 can be a hollow member that is optionally elongate and flexible, such as a shunt. The intake conduit 120 can be arranged to be in fluid communication with the reservoir 130 and optionally in sealing engagement therewith. In this regard, the intake conduit 120 can have the second end thereof communicating with the reservoir 130 and the opposing first defining a port. As such, the first end can be a proximal end of the intake conduit 120, and the second end can be a distal end of the intake conduit 120. The intake conduit 120 can be configured for placement within the eye to facilitate a drainage from the internal portion of the eye, through the port, and to the reservoir 130.

Additional configurations of flow passages with variable resistance are discussed in detail in U.S. Provisional Application No. 63/276,183, entitled "BIOLOGICAL FLUID DRAINAGE DEVICES, SYSTEMS, AND METHODS," filed on Nov. 5, 2021, the entire disclosure of which is herein incorporated by reference in its entirety.

Figure 3A:
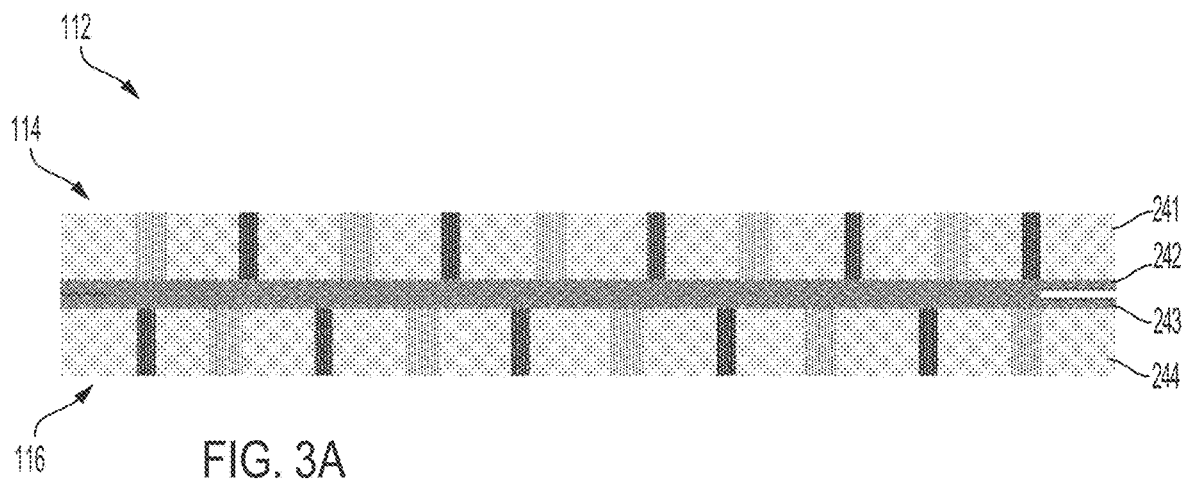
FIG. 3A is a schematic view of wall of the drainage device in a deflated state.
Figure 3B:
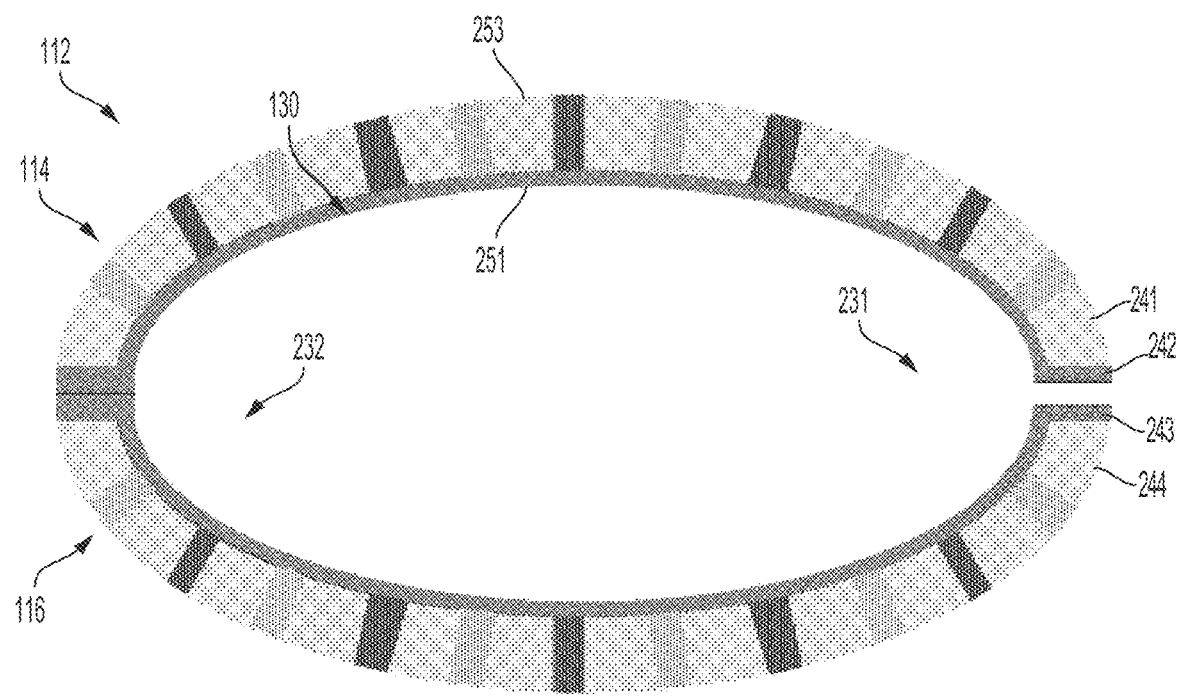
FIG. 3B is a schematic view of the wall of the drainage device in an inflated state.
Figure 3C:
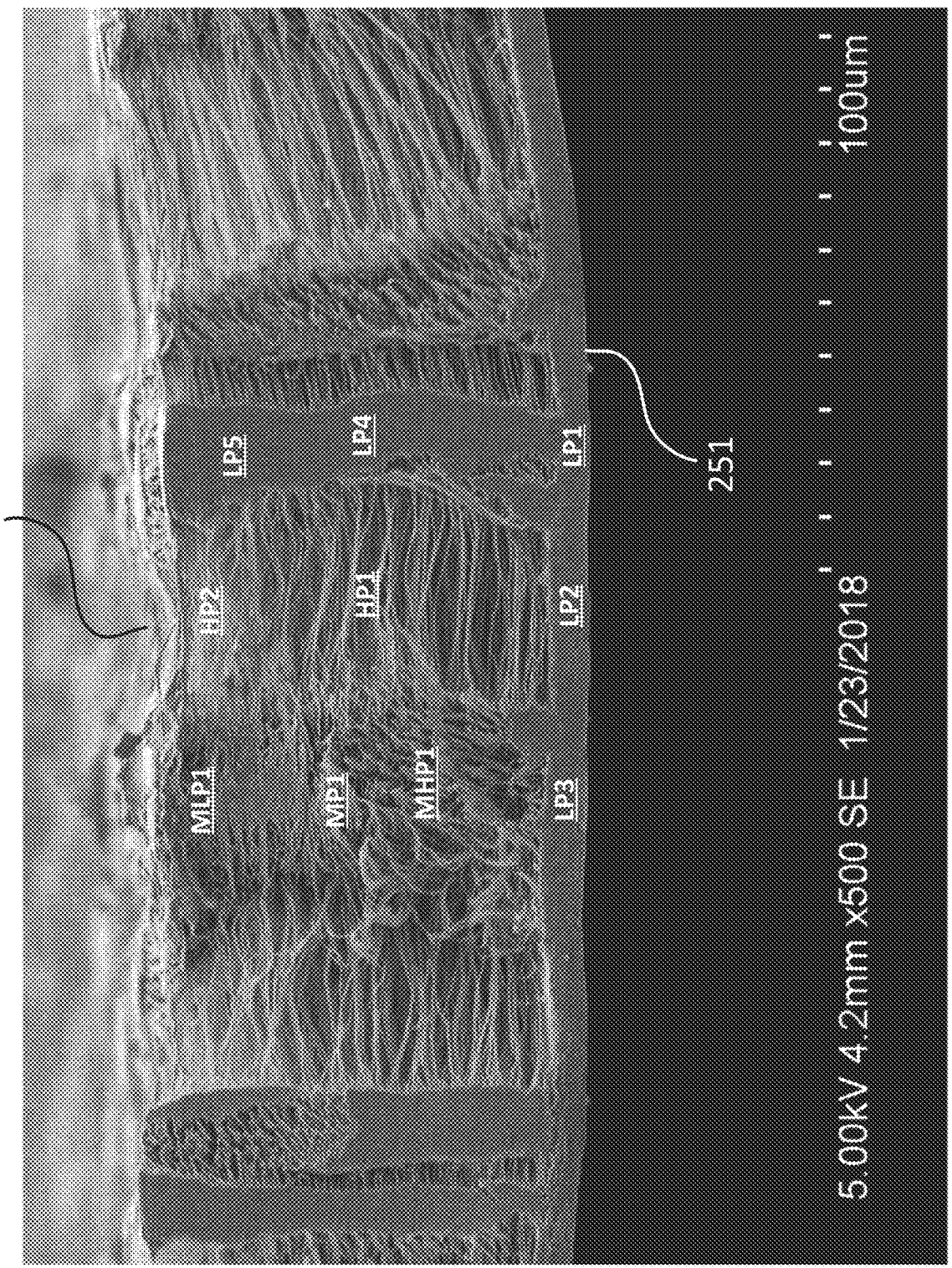
FIG. 3C is an SEM image of a portion of the microstructure schematically illustrated in the drainage system of FIGS. 3A and 3B, with the SEM image scaled as shown.

Details of the microporous material will now be discussed with reference to FIGS. 3A-3C. For clarity, these figures omit showing the conduit but it is understood that the conduit can be placed in fluid communication with the reservoir 130 as discussed elsewhere herein. In particular, FIGS. 3A and 3B show cross-sectional views of the wall 112 in the drainage system with a reservoir 130 disposed therein taken along a midsection of a width of the drainage system. More specifically, FIG. 3A shows the drainage device in a deflated or drained state (where little to no fluid is in the reservoir 130); and FIG. 3B shows the drainage device in an inflated state (where fluid has collected in the reservoir 130 so as to cause the reservoir 130 to inflate). In some examples, the inflated state may be when the wall 112 of the reservoir 130 is in the hydrophobic state, and the drained state may be when the wall 112 of the reservoir 130 is in the hydrophobic state, such that the draining of the fluid inside the reservoir 130 may occur in the hydrophilic state or as when the wall 112 transitions from the hydrophobic state to the hydrophilic state as explained herein. FIG. 3C is a close-up view of a microstructure in the drainage system of FIGS. 3A and 3B. Displayed at the bottom of FIG. 3C is: "5.00 kV 4.2 mm x500 SE Jan. 23, 2018," and the distance between two consecutive lines as shown at the bottom right hand corner represents 10 µm.

With reference to FIGS. 3A and 3B, a microstructure, through which biological fluid penetrates, can be included within a portion (e.g., some or all) of the microporous material. The microstructure can comprise multiple deposits of microporous membranes therein such that the microporous material is a multi-membrane material. Grouped or coupled deposits of microporous membranes can form a layer of the microporous material, which can be overlapped, folded, or similarly arranged. Under these circumstances, a reservoir 130 can be formed with a reservoir proximal section 231 and a reservoir distal section 232 and can diffuse collected fluid into surrounding tissue outside of the wall 112.

Inflation of the reservoir 130 can occur at the unbonded portions of the wall 112. As noted above, the second and third microporous membranes 242, 243 can be bonded at their peripheries such that interior portions thereof are unbonded. As these portions are unbonded, they are free to separate from each other (or one from the other) to allow the reservoir 130 to fill with fluid. The reservoir 130 can have a reservoir proximal section 231, which can be positioned adjacent the distal end of the intake conduit as further discussed below, and a reservoir distal section 232 that is positioned opposite of the reservoir proximal section 231. Fluid flow into (or within) the reservoir 130 can be directed from the distal end of the intake conduit toward a periphery of chamber. In this regard, the reservoir proximal section 231 can be configured to inflate before the reservoir distal section 232.

Engagement of the fluid with the microporous material can impart a flow resistance, which can result in pressure within the reservoir 130. For instance, second and third microporous membranes 242, 243 of the wall 112 can be situated adjacent to each other and can optionally be in contact with each other. As the reservoir 130 fills, the second and third microporous membranes 242, 243 can be gradually forced apart by fluid flowing into the reservoir 130. For instance, because the interior surface of the reservoir 130 can initially be hydrophobic, flow into the reservoir 130 can build pressure thereby forcing inflation of the reservoir 130 (e.g., second and third chambers being forced away from each other). As the wall 112 transitions from the hydrophobic state to the hydrophilic state and the fluid flow engages the reservoir 130, a variable flow resistance can be imparted to the fluid flow. The variable flow resistance can correspond to a rate of change in pressure with respect to flow rate over time. In examples, the wall 112 transitions from the hydrophobic state having a first flow resistance, to a partially hydrophilic state having a second flow resistance, to the hydrophilic state having a third flow resistance; and wherein the first flow resistance is greater than both the second flow resistance and the third flow resistance, and the second flow resistance is greater than the third flow resistance.

Diffusion rates of biological fluid from the reservoir 130 through the wall 112 can be influenced by the flow rate, which increases with decreasing flow resistance. As the reservoir 130 is inflated and the microporous material transitions from the hydrophobic state to the hydrophilic state, this diffusion can occur in many directions (e.g., radially outward from the reservoir 130, through unbonded portions of the peripheral edge, etc.). When flow into the reservoir 130 is less than flow out of the reservoir 130, the reservoir 130 can move from the inflated state toward the deflated state. On the other hand, when flow into the reservoir 130 is more than flow out of the reservoir 130, the reservoir 130 can move from the deflated state toward the inflated state. Assuming continuous flow into the reservoir 130, the reservoir 130 can remain in the inflated state, in an intermediate state between the inflated and deflated states. In any of these instances, there is a pressure associated with the amount of flow and/or a fill level of the reservoir 130. After collection of the fluid in the reservoir 130, fluid can be diffuse via penetration through the wall 112 at various rates depending on the state of transition of the microporous material.

Permeabilities of each layer of the microporous material can vary across dimensions (e.g., the thickness or length) of the microstructure therein. Under these circumstances, in certain instances, a first microporous membrane 241 permeability of the first microporous membrane 241 can be higher than a second microporous membrane 242 permeability of the second microporous membrane 242. Similarly, a fourth microporous membrane 244 permeability of the fourth microporous membrane 244 can be higher than a third microporous membrane 243 permeability of the third microporous membrane 243. In examples, the second microporous membrane 242 permeability can be about the same as the third microporous membrane 243 permeability. In examples, the first microporous membrane 241 permeability can be about the same as the fourth microporous membrane 244 permeability. In some such examples, each of the second microporous membrane 242 permeability and the third microporous membrane 243 permeability are different from the first microporous membrane 241 permeability and the fourth microporous membrane 244 permeability.

Porosities of membranes within the microporous material can be arranged to influence tissue ingrowth capabilities at portions thereof. It may be desired that tissue ingrowth occurs at portions of the wall 112 (e.g., at an external side 253 of the wall 112) and resisted at other portions of the wall 112 (e.g., at the reservoir 130). Tissue ingrowth at the external side 253 of the wall 112 can fix the device at an implanted location, and resisting ingrowth at the reservoir 130 can inhibit the reservoir 130 from being uninflatable due to tissue growth across the reservoir 130. For this function to be achieved, porosity at one side of the microporous material can be greater than that of another opposing side of the microporous material. In this regard, the microporous material can have a tight side (e.g., where the porosity is greater) and an open side (e.g., where the porosity is lesser). In examples, the second and third microporous membranes 242, 243 can be configured to resist tissue ingrowth. In some examples, the first and fourth microporous membranes 241, 244 are configured to permit tissue ingrowth, and wherein the second and third microporous membranes 242, 243 have an expanded state that is maintained adjacent to the bonded peripheral edges of the first and second layers 114, 116.

Penetrations in the microstructure can permit penetration of fluid into the microporous material. These penetrations can vary in size, e.g., based on the function of a given microporous membrane. In examples, either or both of the first and fourth microporous membranes 241, 244 can include penetrations that range in size (or average size) to permit ingrowth of vessels and other tissues. In further examples, either or both of the second and third microporous membranes 242, 243 are configured or selected such that the penetrations therein are generally sized to minimize, resist, or prevent the ingrowth and attachment of tissue, while maintaining aqueous humor permeability.

Internal portions of the microporous material can have varying porosities as can be seen in FIG. 3C. The internal portions can extend between the wall internal side 251 and the wall external side 253. At any of these portions of the wall, the porosity can comparatively range in degree from low porosity (LP), medium-low porosity (MLP), medium porosity (MP), medium-high porosity (MHP), and high porosity (HP). Assuming for discussion purposes here that drainage travels along a relatively straight path through a microporous material so as to sequentially engage porosities of the wall portion internal side 251, a uniform internal portion, and the wall portion external side 253, the combined flow resistance can be represented by likewise concatenating their respective porosities. For instance, the wall portion internal side 251 typically has a low porosity throughout (e.g., to resist tissue ingrowth into the reservoir 130), and portions of the interior portions and wall portion external side 253 can have any of the aforementioned degrees of porosity. Under these circumstances when the internal portion has a medium porosity and, for example, the internal portions have a medium porosity and the wall portion external side 253 has a high porosity, the flow passage through the microporous material from the reservoir 130 to tissue surrounding the device can be represented as LP-MP-HP. More examples are discussed here below.

Various flow paths can be present within the microporous material. Relatively linear flow paths may comprise regions LP1-LP4-LP5, for example or LP3-MHP1-MP1-MLP1. Under some conditions, e.g., where there is high pressure in the reservoir 130, at least some flow may proceed through the most direct path through the microporous material, such as LP1-LP4-LP5 or LP2-HP1-HP2. Although some flow paths may be relatively straight, there are also flow paths that are nonlinear. For instance, under certain conditions, at least some flow may proceed to flow through areas of increasingly less resistance such as LP1-HP1-HP2 or LP3-MHP1-HP1-HP2. As will be appreciated, the microstructure of the microporous materials may undergo modification processes to obtain certain types of flow through the microstructure. For instance, the microstructure may have relatively uniform layers across layered within the microstructure, or as shown here, have variable portions throughout the thickness of the microporous material.

In examples, the wall portion defines a wall portion thickness extending between the wall portion internal side 251 and the wall portion external side 253. The wall portion thickness can define an internal region of the wall portion having a transition porosity that is between a porosity of the low porosity surface of the wall portion internal side 251 and a porosity of the high porosity surface of the wall portion external side 253. In addition, or in alternative, the internal region can have an internal region porosity that is equal to porosities of the low porosity surfaces of the internal side and the external side. In addition, or in alternative, the internal region can have an internal region porosity that is equal to a porosity of the low porosity surface of the internal side. In addition, or in alternative, the internal region can have an internal region porosity that is equal to a porosity of the high porosity surface of the external side.

Figure 4A:
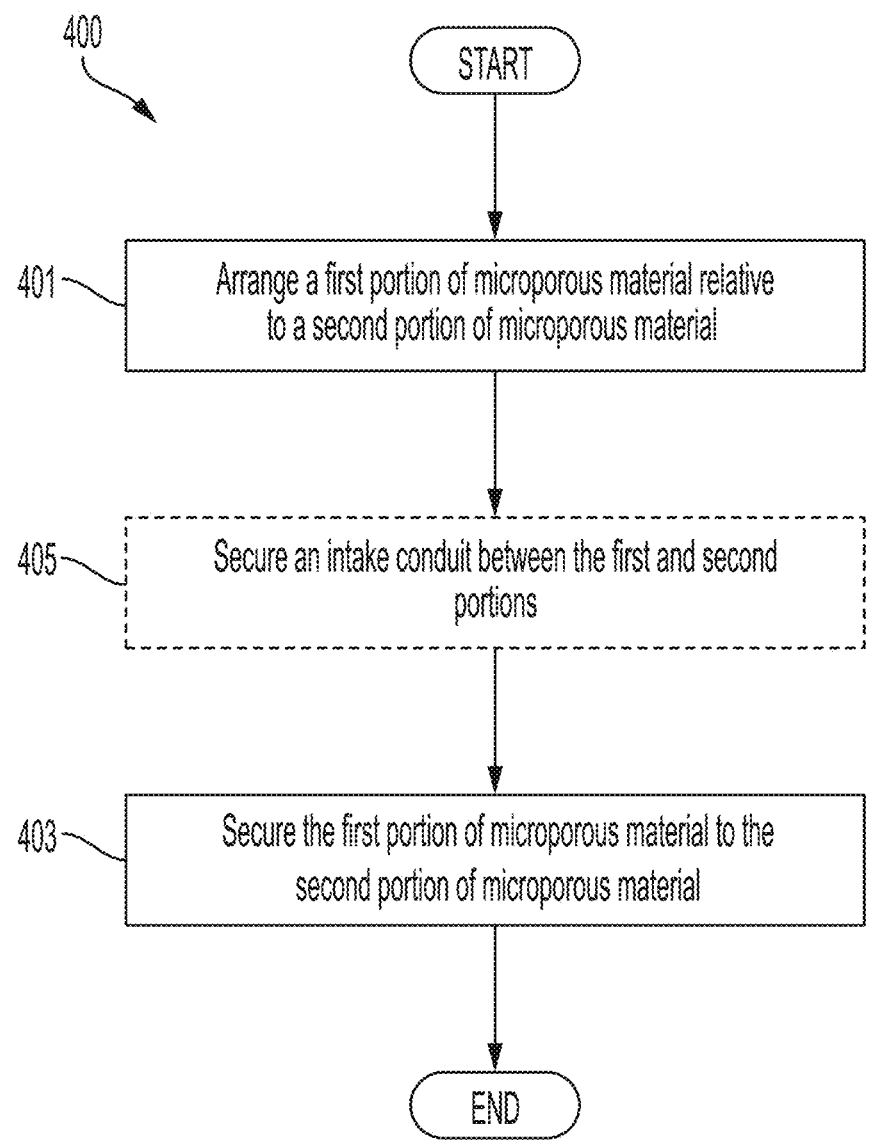
FIG. 4A is a flowchart of a method of manufacture consistent with various aspects of the present disclosure.

FIG. 4A shows a flowchart of a method 400 consistent with aspects of the present disclosure. As shown, the method 400 can be useful for forming glaucoma drainage device is disclosed herein and can include drainage systems disclosed elsewhere herein, including the drainage system 100. At step 401, the method 400 can include arranging a first portion of a first microporous material over a second portion of a second microporous material. Each of the first microporous material and the second microporous material that transitions from a hydrophobic state that to a hydrophilic state. At step 403, the method 400 can include securing the first portion to the second portion so as to form a wall that has a reservoir therebetween. The reservoir can be configured to be in fluid communication within the eye to receive a drainage from an internal portion of the eye into the reservoir. The wall can define a variable flow resistance as the wall transitions from the hydrophobic state to the hydrophilic state. In examples, at step 405, the method 400 can include securing an intake conduit between the first portion and the second portion. The intake conduit can be configured to receive the drainage.

A user may take care when constructing the drainage system, particular as it pertains to bonding portions thereof. In examples, securing the first portion to the second portion can include refraining from bonding the first microporous membrane to the fourth microporous membrane. In examples, securing the first portion to the second portion can include arranging the first layer and the second layer in a stacked configuration such that the first microporous membrane and the fourth microporous membrane are the outermost membranes of the wall and the second microporous membrane and third microporous membrane are the innermost membranes of the wall.

Figure 4B:
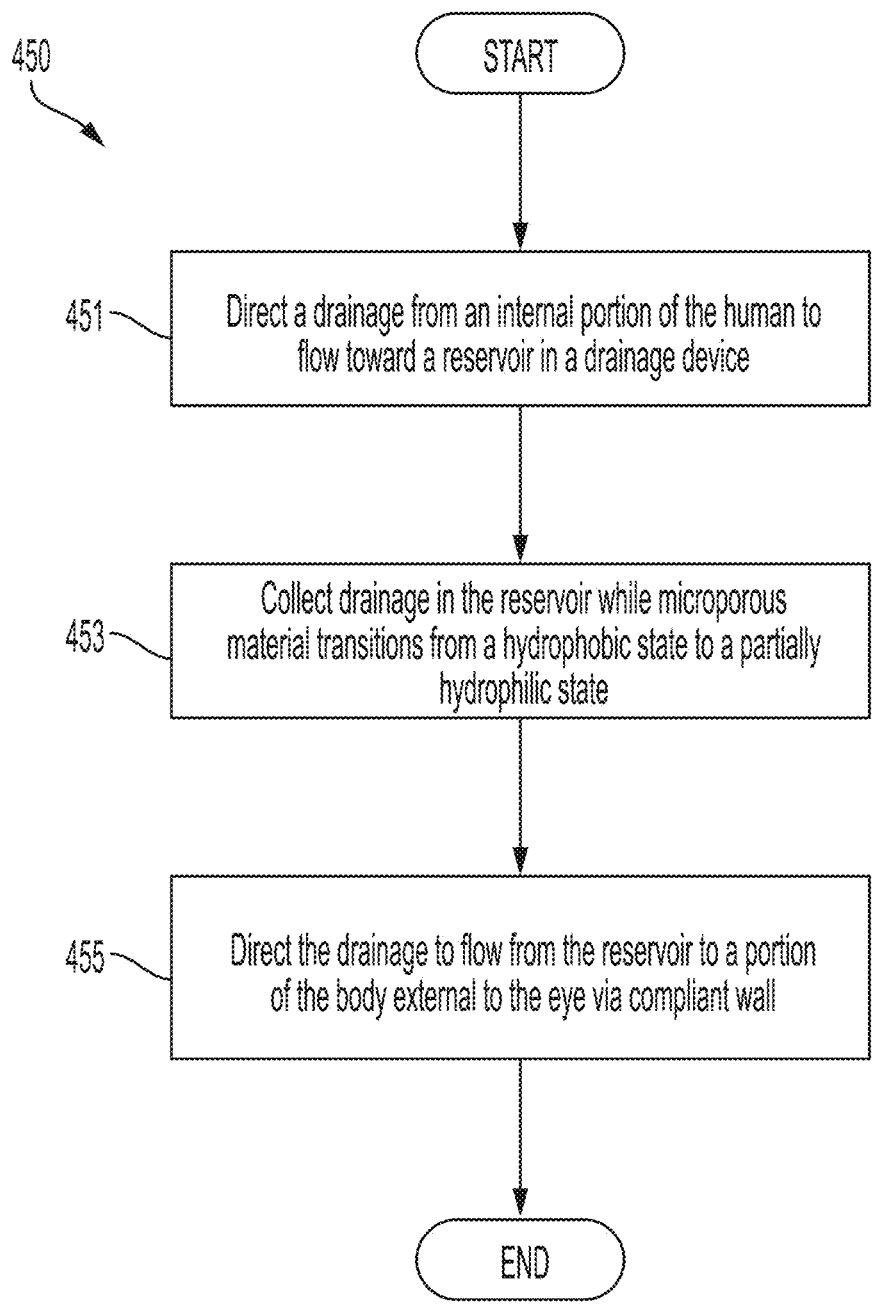
FIG. 4B is a flowchart of a method of use consistent with various aspects of the present disclosure.

Another method 450 is shown in FIG. 4B. This method a method of use for drainage devices disclosed elsewhere herein, including the drainage device 110. At step 451, the method 450 can include directing a drainage from an internal portion of the human to flow toward a reservoir in a drainage device. At step 453, the method 450 can include collecting drainage in the reservoir until microporous material transitions from a hydrophobic state to a partially hydrophilic state. At step 455, the method 450 can include directing the drainage to flow from the reservoir to a portion of the body external to the eye via compliant wall.

The system shown in FIGS. 1A-1C is provided as an example of the various features of the system and, although the combination of those illustrated features is clearly within the scope of invention, that example and its illustration are not meant to suggest the inventive concepts provided herein are limited from fewer features, additional features, or alternative features to one or more of those features shown in FIGS. 1A-1C. For example, in various embodiments, the components and/or characteristics of the system shown in FIG. 1A-1C may include the components and characteristics described with reference to any other figure, such as FIGS. 2A-2E, 3A-3C, and 4A and 4B. It should also be understood that the reverse is true as well. One or more of the components depicted in FIGS. 1A-1C can be employed in addition to, or as an alternative to components depicted in FIGS. 2A-2E, 3A-3C, and 4A and 4B. This goes for any figure and the components and characteristics shown therein and discussed with reference thereto herein.

Figure 7A:
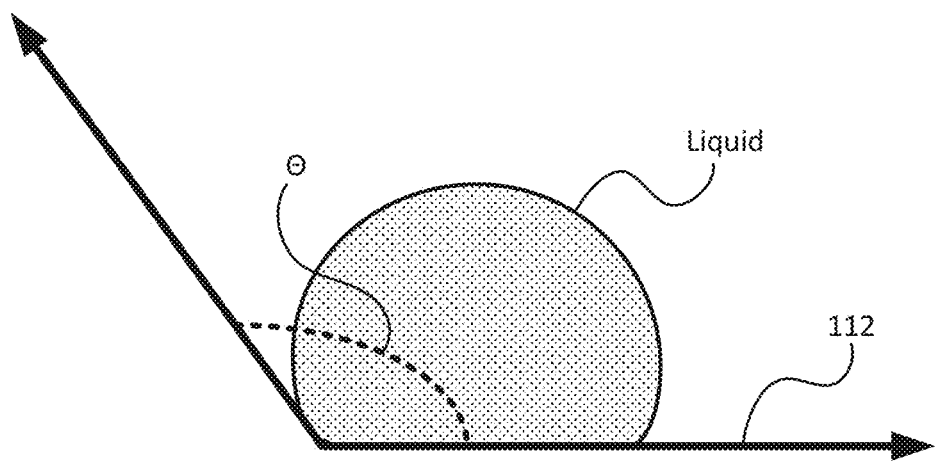
FIGS. 7A and 7B are schematic side views of a sessile drop method test performed on a surface.
Figure 7B:
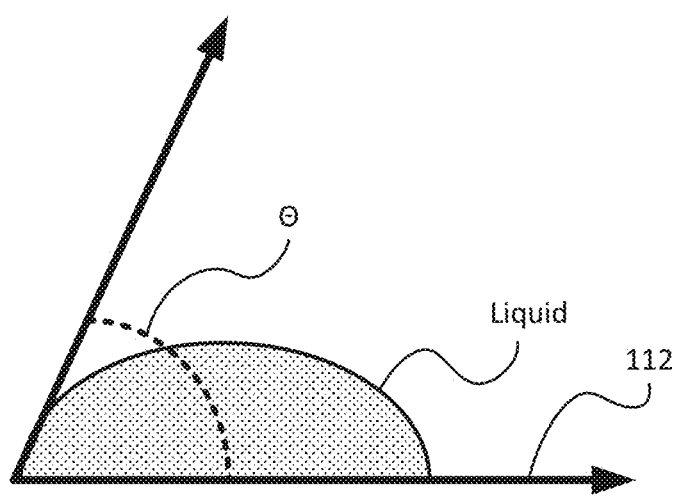

FIGS. 7A and 7B show an example of how to test whether a surface is hydrophobic or hydrophilic, also referred to as a "sessile drop method". Such a test is typically performed with an optical tensiometer which ranges from manual instruments to completely automated systems. In both of these examples, a drop of liquid or fluid ("Liquid") is placed on a surface that is to be tested, which in this case is the wall 112 (represented by the horizontal arrow) of the glaucoma drainage device 110. Subsequently, a static contact angle ($\Theta$) of the liquid is measured from the surface, i.e. the wall 112, by taking an image of the drop using a high-resolution camera, from which the contact angle may be automatically determined using any suitable software. In FIG. 7A, the contact angle is an obtuse angle, i.e. greater than 90 degrees, which indicates that the surface of the wall 112 is hydrophobic. In FIG. 7B, the contact angle is an acute angle, i.e. less than 90 degrees, which indicates that the surface of the wall 112 is hydrophilic. In some examples, the transition from the hydrophobic state to the hydrophilic state constitutes a decrease in the contact angle by at least 10 degrees, at least 15 degrees, at least 20 degrees, at least 25 degrees, at least 30 degrees, at least 35 degrees, at least 40 degrees, at least 45 degrees, at least 50 degrees, at least 55 degrees, at least 60 degrees, at least 65 degrees, at least 70 degrees, at least 75 degrees, at least 80 degrees, at least 85 degrees, at least 90 degrees, or any other suitable value or range therebetween. As previously explained, the wall 112, or more specifically a microporous material thereof, may transition from a hydrophobic state to a hydrophilic state, and the speed or rate of this transition can be measured using this method.

FIGS. 8A through 8E show different stages of the wall 112 during its transition from one state to another, as shown in five different backlit microscope images. The measurements may be taken using a process defined by the following steps: (1) a device 110 with a reservoir 130 is fluidly connected to any suitable micropump apparatus that has a pressure sensor in line; (2) the pump flow rate is arbitrarily set to 50 µL/min and the micropump apparatus is activated to apply the predetermined pressure by injecting a fluid (liquid) into the reservoir 130; (3) the pressure is measured with respect to the reservoir 130 can be recorded over time; and (4) a change in the measured pressure is detected/recorded over a period of time, such as 3 days, 7 days, 14 days, and 30 days, as suitable. Thereafter the device 110 may be placed on a backlit stage for observation, as done to produce FIGS. 8A through 8E in an example.

Figure 8A:
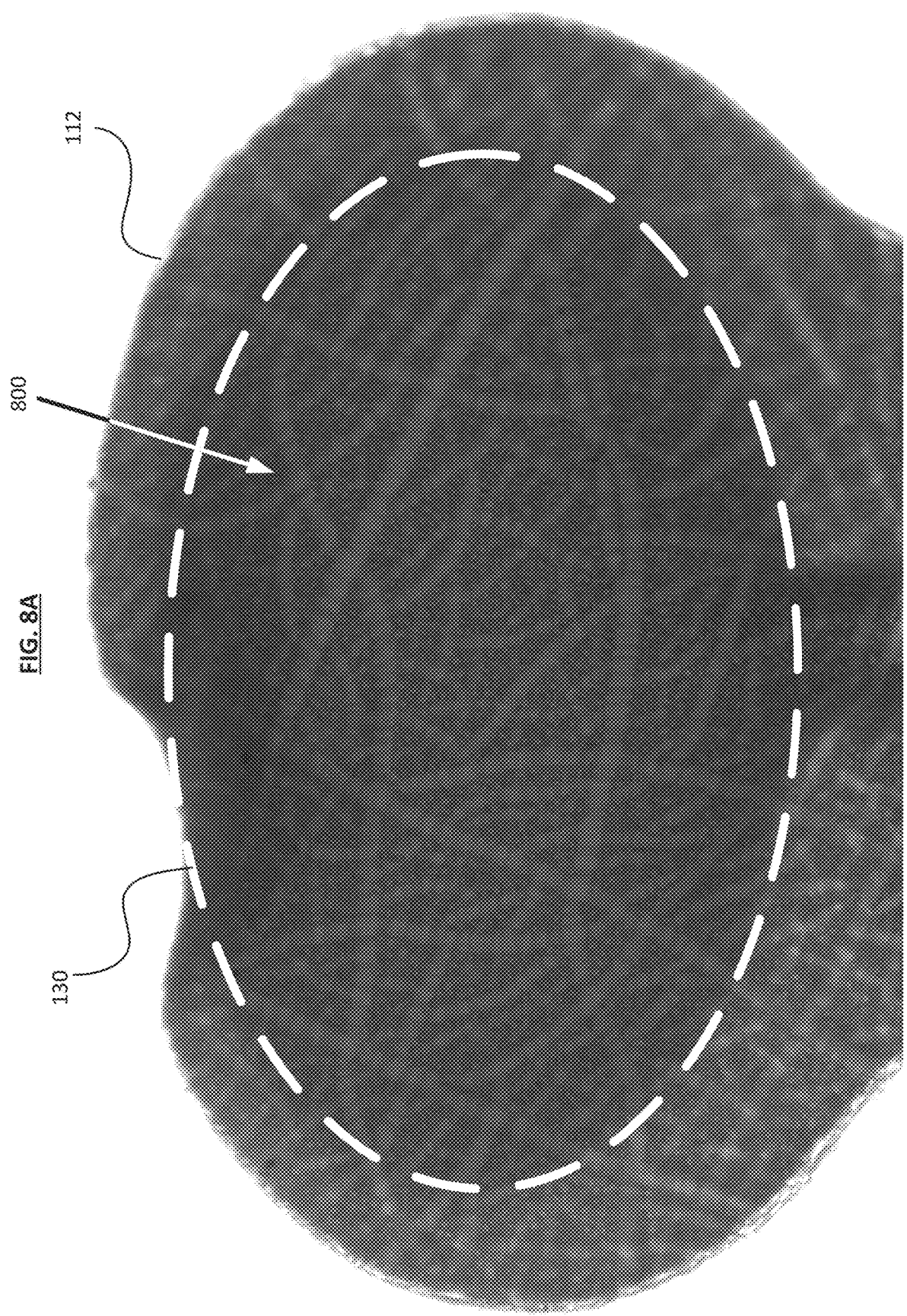
Figure 8B:
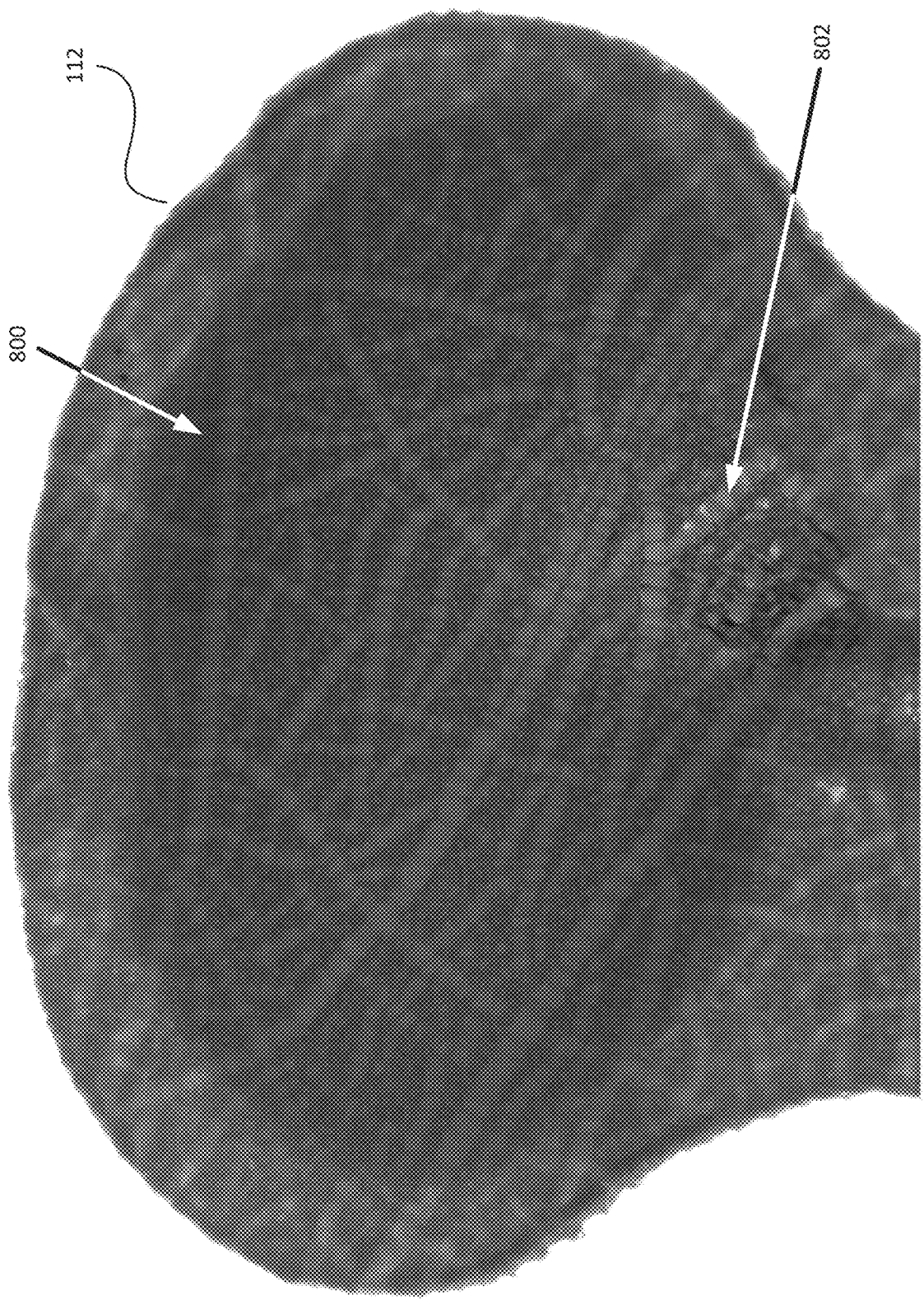
Figure 8C:
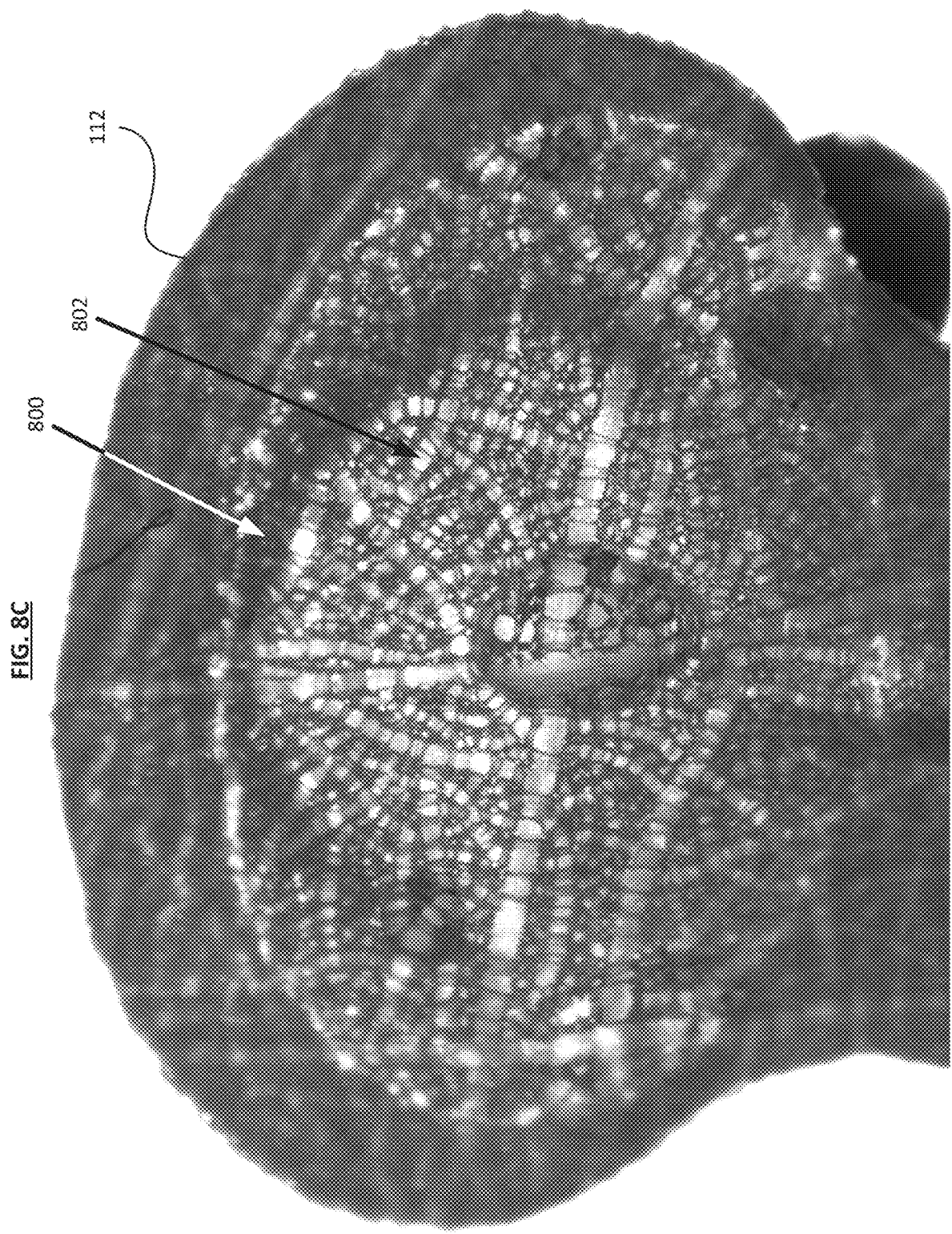
Figure 8D:
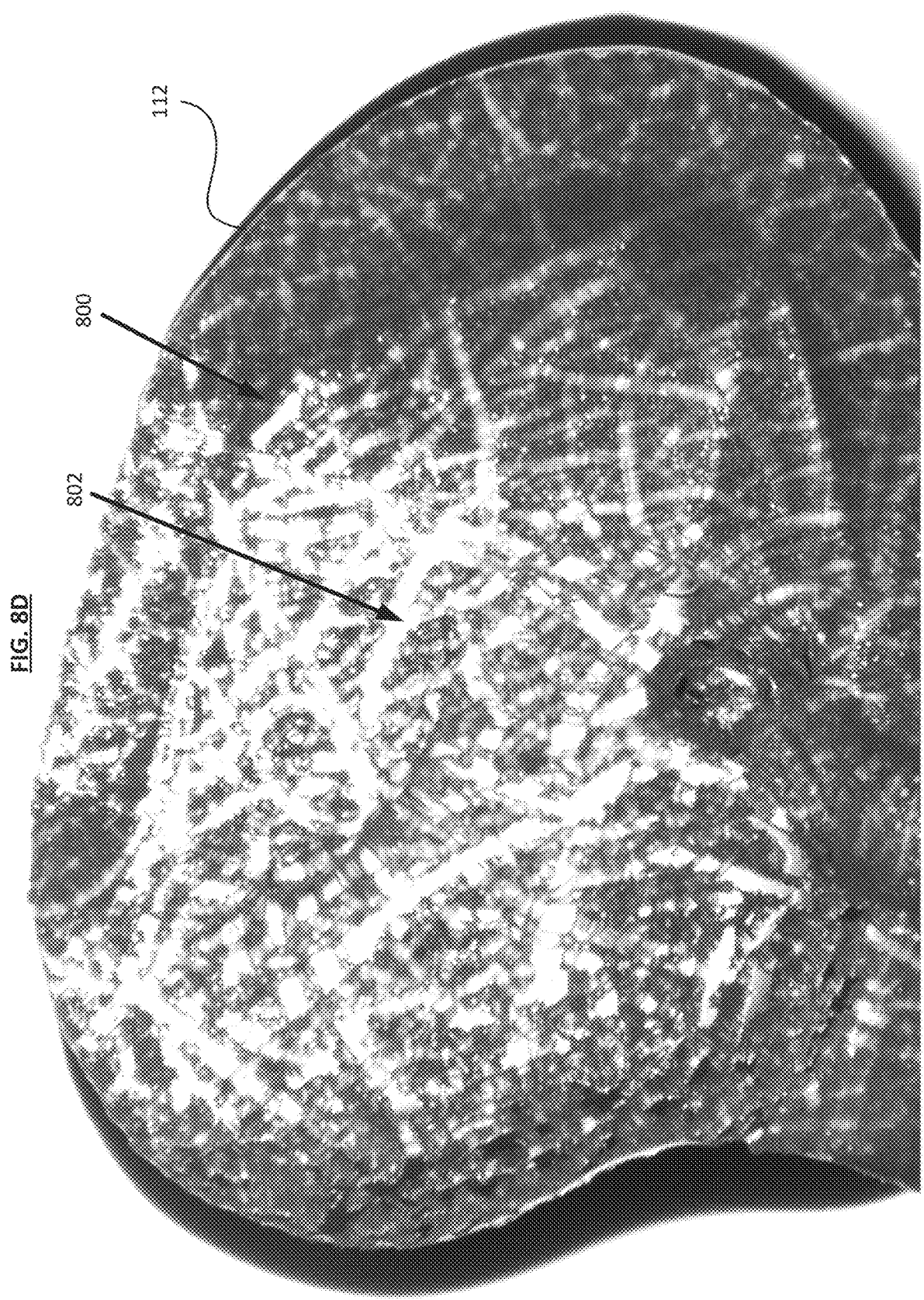

FIG. 8A is the image taken on Day 0, FIG. 8B is the image taken on Day 3, FIG. 8C is the image taken on Day 7, FIG. 8D is the image taken on Day 14, and FIG. 8E is the image taken on Day 30 after the reservoir 130 is filled with a fluid. In FIG. 8A, the outline of the reservoir 130 is shown in a broken white line for reference. The wall 112 is shown to include comparatively darker regions 800 and comparatively lighter regions 802. The lighter regions 802 indicate areas of the wall 112 that are more translucent than the darker regions 800, with the translucency representing the amount of wetness, transparency, and/or hydrophilicity of the wall 112 as it transitions from one state to another. As such, in the hydrophobic state, the microporous material is opaque or less translucent, and in the hydrophilic state, the microporous material is transparent or more translucent. Hereinafter, the term "opaque" may be used when an object has less than 20% optical transmission, less than 15% optical transmission, less than 10% optical transmission, or less than 5% optical transmission, for example. The term "translucent" may be used when an object has optical transmission greater than "opaque" and less than "transparent", such as from 20% to 80% optical transmission, for example. The term "transparent" may be used when an object has greater than 80% transmission, greater than 85% transmission, greater than 90% transmission, or greater than 95% transmission, for example. In some examples, the microporous material may be transparent when it is possible to observe an object through the material.

As shown in FIG. 8A, on Day 0, substantially the entire surface of the wall 112 shows darker regions 800 which are opaque. As shown in FIG. 8B, on Day 3, a region of translucency (lighter region 802) appears in a section of the wall 112. In FIG. 8C, on Day 7, the region of translucency (lighter region 802) spreads to cover a greater section of the wall 112 than in FIG. 8B, and the spreading continues in FIG. 8D, on Day 14. In FIG. 8E, on Day 30, substantially the entire surface of the wall 112 shows lighter regions 802 which are transparent. As such, of the course of 30 days, the wall 112 transitions from an opaque, hydrophobic state to a translucent, hydrophilic state.

Figure 9A:
FIGS. 9A through 9C are microscope images of a drainage device in various states of transitioning from a hydrophobic state to a hydrophilic state consistent with various aspects of the present disclosure.
Figure 9B:
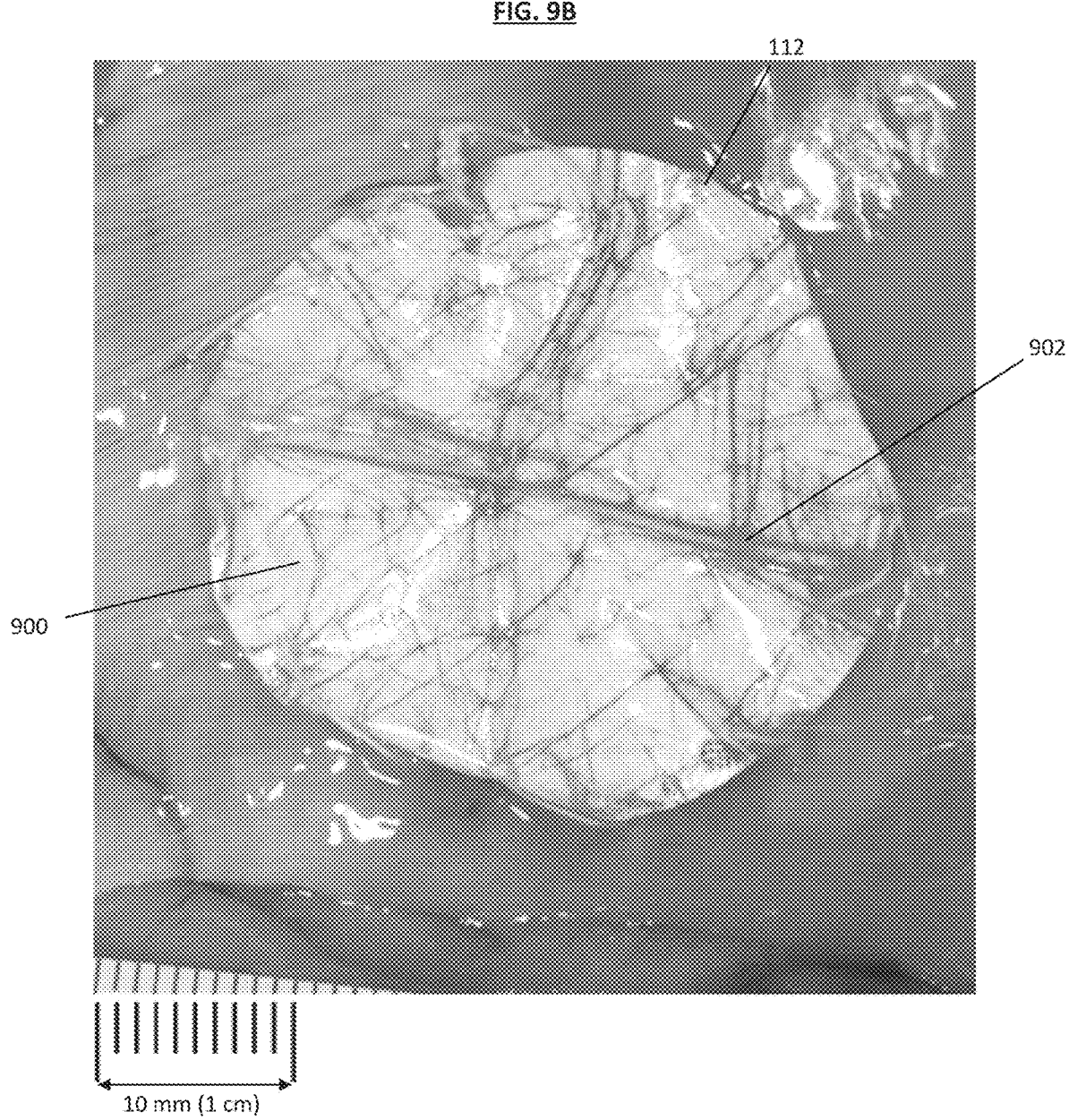
Figure 9C:
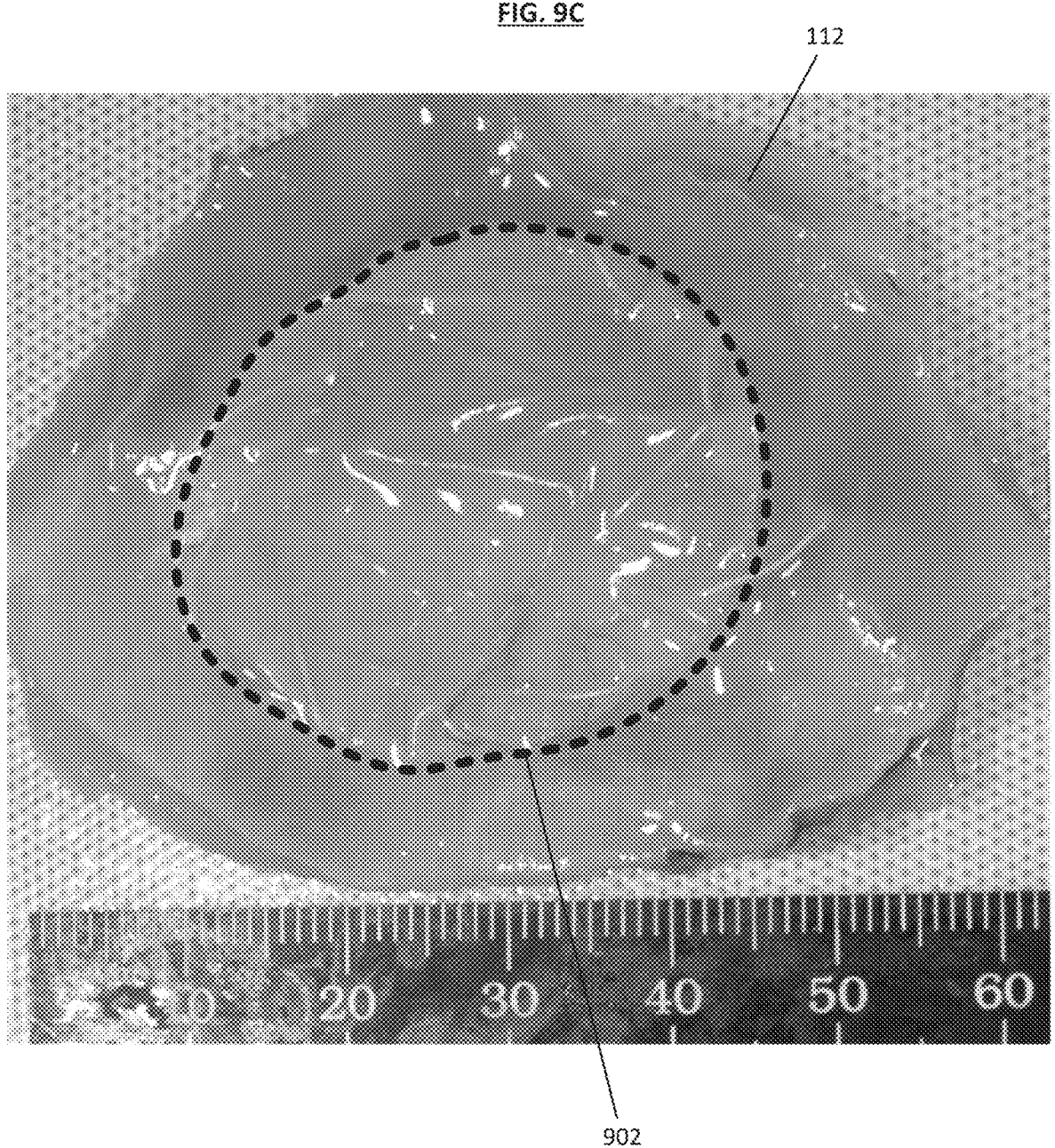

FIGS. 9A through 9C show different stages of the wall 112 during its transition from one state to another, as shown in three different microscope images. In these figures, the white portions are unwetted regions 900 which correspond to the darker regions 800 of FIGS. 8A through 8E, and the shaded portions are wetted regions 902 which correspond to the lighter regions 802 of FIGS. 8A through 8E. The walls 112 of the device 110 as shown are in scale, as shown by the ruler indicating centimeters (in FIG. 9A) and millimeters (in FIG. 9C). As such, in FIG. 9A, which is the image taken on Day 3, most of the surface of the wall 112 is unwetted and therefore show hydrophobic properties with regions of wetted regions 902 dispersed throughout, whereas in FIG. 9B, which is the image taken on Day 7, a portion of the wall 112 are wetted in vivo, and in FIG. 9C, which is the image taken on Day 30 (with a dotted line showing a periphery of the wall 112), substantially the entire surface of the wall 112 are wetted and therefore show hydrophilic properties. Therefore, over the course of 30 days, the entirety of the microporous material of the wall 112 transitions from the hydrophobic state to the hydrophilic state. In some examples, a first portion of the microporous material transitions from the hydrophobic state to the hydrophilic state within 3 days. In some examples, a second portion of the microporous material different from the first portion transitions from the hydrophobic state to the hydrophilic state within 7 days. The first portion and the second portion may be the lighter regions 802 shown in FIG. 8B or the shaded regions 902 shown in FIG. 9A, where these figures show the wall 112 after 3 days of including fluid in the reservoir 130 or wetting, respectively. Alternatively, the first portion and the second portion may be the lighter regions 802 shown in FIG. 8C or the shaded regions 902 shown in FIG. 9B, where these figures show the wall 112 after 7 days of including fluid in the reservoir 130 or wetting, respectively. In some examples, less than 10%, less than 7%, less than 5%, less than 3%, less than 1%, or any other suitable value or range therebetween, of the surface of the wall 112 may be the first portion that has transitioned from hydrophobic state to hydrophilic state within 3 days. Furthermore, in some examples, from 10% to 20%, from 7% to 15%, from 5% to 10%, from 3% to 5%, or any other suitable value or range therebetween may be the sum of the first portion and the second portion that have transitioned from hydrophobic state to hydrophilic state within 7 days.

Figure 10:
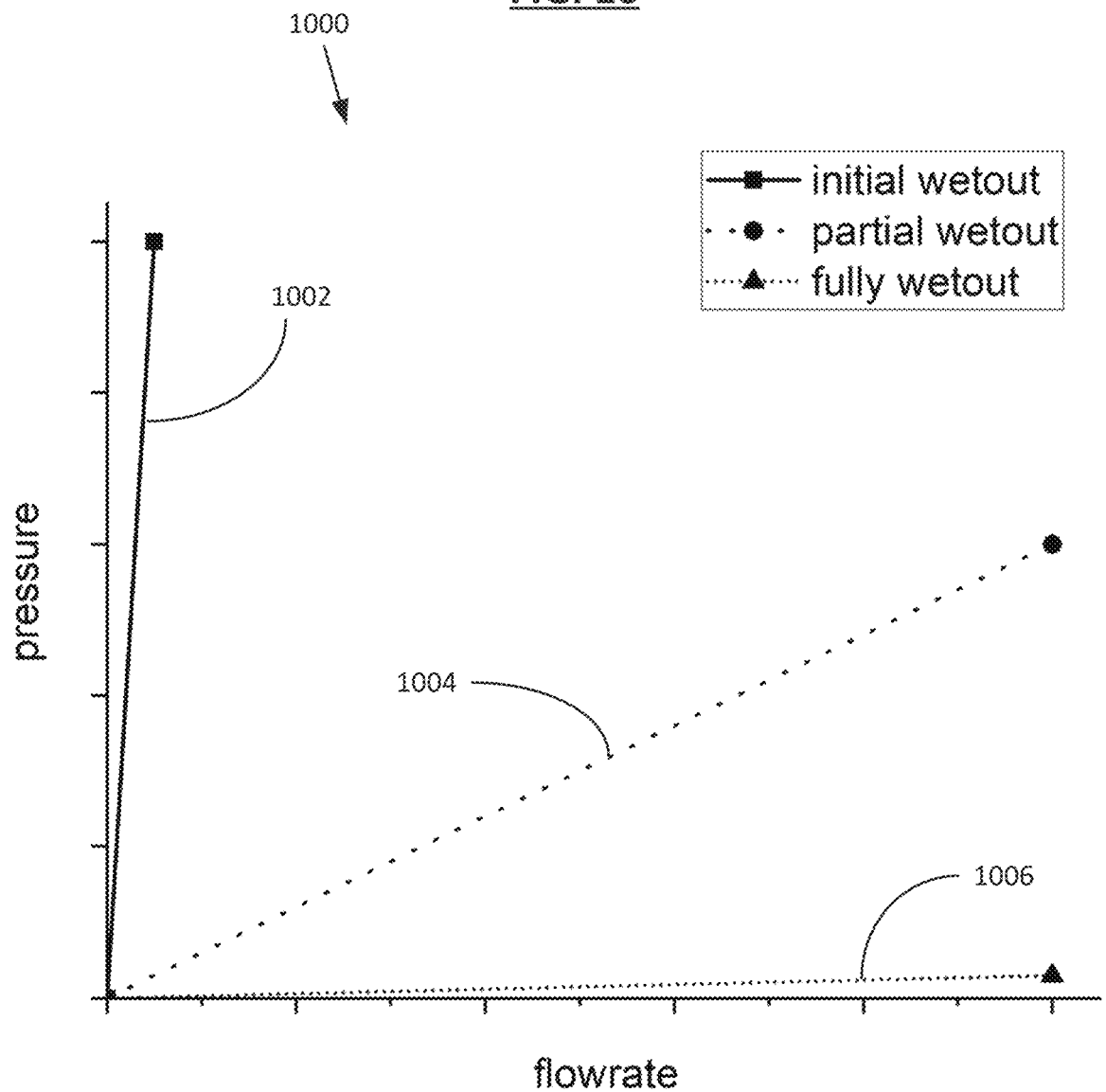
FIG. 10 is a graph comparing flowrate vs pressure over three different periods of time during the wetting.

FIG. 10 shows a graph 1000 with flowrate on the x-axis and pressure on the y-axis, showing the difference in the properties of the device 110 over time using three different lines as the device 110 undergoes wetting in vivo. A solid line 1002 (represented by a square) shows an initial state of the device 110 at the beginning of a wet-out, i.e. being placed in an environment with fluid/liquid to facilitate the wetting of the device 110. The initial state may be at day 0 of being disposed in the fluid/liquid environment. A dotted line 1004 (represented by a circle) shows a state of partial wet-out, which may be between day 0 and day 30, for example at day 3, day 7, day 14, or any other suitable number of days therebetween but excluding day 0 and day 30. Another dotted line 1006 (represented by a triangle) shows a state of full or complete wet-out, which may be at day 30. The graph 1000 compares the slopes of the lines 1002, 1004, and 1006, which represent flow resistance. It is to be understood that the flow resistance is calculated as: Flow Resistance=Pressure/Flowrate. Therefore, because the slope decreases from line 1002 to line 1006, the flow resistance also decreases from the initial (day 0) state to the final (day 30) state of wetting.

Figure 11A:
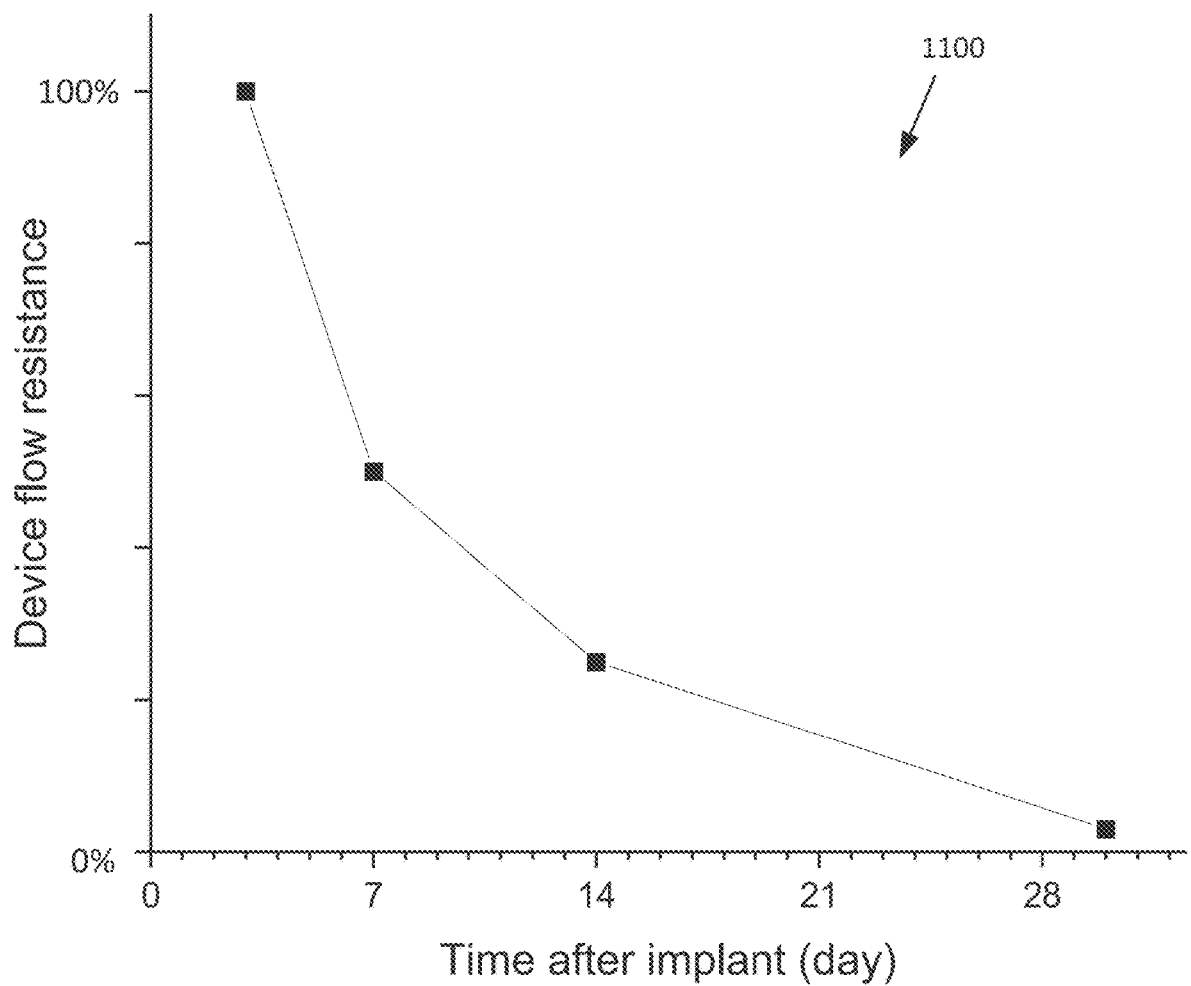
FIG. 11A is a graph comparing a percentage of device flow resistance over the course of wetting.

FIG. 11A shows a graph 1100 with time after implant on the x-axis and percentage change in flow resistance of the device 110 on the y-axis. The flow resistance is shown to decrease over time from 100% at day 3 to near 0% at day 30. The change over time of the flow resistance is shown as asymptotic, although in some examples the change over time may be more linear. In some examples, a portion of the flow resistance does not change, which is represented by a "latent flow resistance" of the device. The portion of the flow resistance that does change is the flow resistance of the portion of the structure which is affected by the wetting of the device as the device transitions from the hydrophobic state to the hydrophilic state, by which time the device only has the latent flow resistance. For example, in the example shown, the 0% flow resistance represents that the changeable flow resistance of the device has reached 0%, whereas the latent flow resistance of the device remains due to the fact that any physical device cannot realistically be completely free of all flow resistance unless the device disintegrates or melts, leaving no structure behind. Because the device 110 does not disintegrate over time but rather wets out to transition to its hydrophilic state, as explained above, the device would retain the latent flow resistance even after the wetting is complete, for example after the 30-day mark.

FIG. 11B shows a graph 1102 with time after implant on the x-axis and percentage area of the device 110 which has completed the wetting on the y-axis. The graph 1102 shows an increase in the percentage area of the device that is wetted as time progresses from day 0 (beginning of the wetting) to day 30 by which point 100% of the area of the device is completely wetted. In some examples, such as the one shown in the graph, the percentage increase is substantially linear over time, but in some examples, the change may be nonlinear. In some examples, a "substantially linear" percentage increase may be defined as a set of percentage datapoints having a coefficient of determination (a.k.a. the $R^2$ value) of at least 0.90, at least 0.91, at least 0.92, at least 0.93, at least 0.94, at least 0.95, or any other suitable value or range therebetween, for example, but no greater than 1, with respect to a linear regression model which is calculated based on the datapoints.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A glaucoma shunt for draining a fluid from an eye to a tissue surrounding the eye, the glaucoma shunt being implantable within tissue of the eye, the glaucoma shunt comprising:
a shunt body that is formed from a microporous material that is arranged so as to form a reservoir within the shunt body; and
a conduit in fluid communication with the reservoir, the conduit being insertable into the eye such that the fluid at a distal end of the conduit is allowed to flow through the conduit and accumulate within the reservoir,
wherein the microporous material transitions from a hydrophobic state to a hydrophilic state within 30 days through wetting with body fluids while maintaining structural integrity of the microporous material as the fluid that is accumulated in the reservoir diffuses to the tissue surrounding the eye through the microporous material so as to provide a variable flow resistance as the microporous material transitions from the hydrophobic state to the hydrophilic state, and
wherein the transition occurs without dissolution or disintegration of the microporous material.

2. The glaucoma shunt of claim 1, wherein a first portion of the microporous material transitions from the hydrophobic state to the hydrophilic state within 3 days.

3. The glaucoma shunt of claim 2, wherein a second portion of the microporous material different from the first portion transitions from the hydrophobic state to the hydrophilic state within 7 days.

4. The glaucoma shunt of claim 1, wherein an entirety of the microporous material transitions from the hydrophobic state to the hydrophilic state within 30 days.

5. The glaucoma shunt of claim 1, wherein in the hydrophobic state, the microporous material is opaque.

6. The glaucoma shunt of claim 1, wherein in the hydrophilic state, the microporous material is transparent.

7. The glaucoma shunt of claim 1, wherein the shunt body has a maximum thickness of no greater than 500 µm.

8. The glaucoma shunt of claim 1, wherein in the hydrophobic state, a drop of water placed on a surface of the microporous material forms a contact angle of greater than 90 degrees with respect to the surface, and in the hydrophilic state, a drop of water placed on a surface of the microporous material forms the contact angle of less than 90 degrees with respect to the surface, wherein the transition from the hydrophobic state to the hydrophilic state constitutes a decrease in the contact angle by at least 10 degrees.

9. The glaucoma shunt of claim 1, wherein the variable flow resistance is greater in the hydrophobic state than in the hydrophilic state.

10. The glaucoma shunt of claim 1, wherein the microporous material is more translucent in the hydrophilic state than in the hydrophobic state due to refractive index matching between body fluids and the microporous material structure during the wetting process.

11. The glaucoma shunt of claim 1,
wherein the shunt body has a continuous wall that defines the reservoir and a reservoir opening in the continuous wall communicating with the internal reservoir and through which the conduit is engagingly received; and
wherein at least a portion of the continuous wall has a wall portion composed of the microporous material, the wall portion having an internal side facing the internal reservoir and an opposing external side facing the exterior region of the human eye, the wall portion internal side having a low porosity surface extending an entirety of the wall portion internal side, the wall portion external side having alternating low porosity and high porosity surfaces.

12. The glaucoma shunt of claim 1, wherein the microporous material comprises a first layer having a first microporous membrane integrated with a second microporous membrane and a second layer having a third microporous membrane integrated with a fourth microporous membrane.

13. The glaucoma shunt of claim 12, wherein the microporous material comprises expanded polytetrafluoroethylene (ePTFE).

14. The glaucoma shunt of claim 13, wherein a first microporous membrane permeability of the first microporous membrane is greater than a second microporous membrane permeability of the second microporous membrane; and wherein a fourth microporous membrane permeability of the fourth microporous membrane is greater than a third microporous membrane permeability of the third microporous membrane.

15. The glaucoma shunt of claim 14, wherein the first layer and the second layer are in a stacked configuration such that the first microporous membrane and the fourth microporous membrane are outermost membranes of the shunt body and the second microporous membrane and third microporous membrane are innermost membranes of the shunt body defining the reservoir.

16. The glaucoma shunt of claim 12,
wherein the first microporous membrane has a first microporous membrane permeability, the second microporous membrane has a second microporous membrane permeability, the third microporous membrane has a third microporous membrane permeability, and the fourth microporous membrane has a fourth microporous membrane permeability,
wherein the second microporous membrane permeability is about the same as the third microporous membrane permeability, and the first microporous membrane permeability is about the same as the fourth microporous membrane permeability, and
wherein each of the second microporous membrane permeability and the third microporous membrane permeability are different from the first microporous membrane permeability and the fourth microporous membrane permeability.

17. The glaucoma shunt of claim 12,
wherein the second and third microporous membranes are bonded to each other along peripheral edges of the first and second layers to define the reservoir and to dispose the reservoir between the second and third microporous membranes,
wherein the second and third microporous membranes are configured to resist tissue ingrowth,
wherein the first and fourth microporous membranes are configured to permit tissue ingrowth, and
wherein the second and third microporous membranes have an expanded state that is maintained adjacent to the peripheral edges of the first and second layers.

18. The glaucoma shunt of claim 12, wherein the reservoir is configured to move between a collapsed state in which the second and third microporous membranes resist fluid flow therebetween and an expanded state in which fluid is allowed to flow between the second and third microporous membranes.

19. The glaucoma shunt of claim 18, wherein fluid flow into the reservoir is directed from the distal end of the conduit toward a periphery of the reservoir.

20. The glaucoma shunt of claim 18,
wherein the reservoir has a reservoir proximal section that is adjacent the distal end of the conduit and a reservoir distal section that is positioned opposite of the reservoir proximal section, and
wherein during drainage of the fluid, the reservoir proximal section is configured to inflate before the reservoir distal section.

21. The glaucoma shunt of claim 1, wherein the variable flow resistance corresponds to a rate of change in pressure with respect to flow rate over time.

22. The glaucoma shunt of claim 21,
wherein the microporous material transitions from the hydrophobic state having a first flow resistance to a partially hydrophilic state having a second flow resistance and then to the hydrophilic state having a third flow resistance, and
wherein the first flow resistance is greater than both the second flow resistance and the third flow resistance, and the second flow resistance is greater than the third flow resistance.

23. The glaucoma shunt of claim 1,
wherein the microporous material is configured to transition from the hydrophobic state to the hydrophilic state based on a wetting of the microporous material with the fluid, and
wherein the microporous material is configured such that wetting of an outer portion of the shunt body occurs before wetting of the reservoir.

24. An aqueous humor diffusion device comprising:
a device body that is formed from a microporous material that is arranged so as to form a reservoir within the device body, the reservoir being configured to receive and accumulate fluid,
wherein the microporous material transitions from a hydrophobic state to a hydrophilic state within 30 days through wetting with body fluids while maintaining structural integrity of the microporous material as fluid that is accumulated in the reservoir diffuses to tissue surrounding the device through the microporous material so as to provide a variable flow resistance as the microporous material transitions from the hydrophobic state to the hydrophilic state, and
wherein the transition occurs without dissolution or disintegration of the microporous material.

25. The aqueous humor diffusion device of claim 24, wherein a first portion of the microporous material transitions from the hydrophobic state to the hydrophilic state within 3 days.

26. The aqueous humor diffusion device of claim 25, wherein a second portion of the microporous material different from the first portion transitions from the hydrophobic state to the hydrophilic state within 7 days.

27. The aqueous humor diffusion device of claim 24, wherein an entirety of the microporous material transitions from the hydrophobic state to the hydrophilic state within 30 days.

28. The aqueous humor diffusion device of claim 24, wherein in the hydrophobic state, the microporous material is opaque.

29. The aqueous humor diffusion device of claim 24, wherein in the hydrophilic state, the microporous material is transparent.

30. The aqueous humor diffusion device of claim 24, wherein the shunt body has a maximum thickness of no greater than 500 µm.

31. The aqueous humor diffusion device of claim 24, wherein in the hydrophobic state, a drop of water placed on a surface of the microporous material forms a contact angle of greater than 90 degrees with respect to the surface, and in the hydrophilic state, a drop of water placed on a surface of the microporous material forms the contact angle of less than 90 degrees with respect to the surface, wherein the transition from the hydrophobic state to the hydrophilic state constitutes a decrease in the contact angle by at least 10 degrees.

32. The aqueous humor diffusion device of claim 24, wherein the variable flow resistance is greater in the hydrophobic state than in the hydrophilic state.

33. The aqueous humor diffusion device of claim 24, wherein the microporous material is more translucent in the hydrophilic state than in the hydrophobic state due to refractive index matching between body fluids and the microporous material structure during the wetting process.

34. The aqueous humor diffusion device of claim 24, wherein the microporous material comprises a first layer having a first microporous membrane bonded to a second microporous membrane and a second layer comprising a third microporous membrane bonded to a fourth microporous membrane.

35. The aqueous humor diffusion device of claim 34, wherein the microporous material comprises expanded polytetrafluoroethylene (ePTFE).

36. The aqueous humor diffusion device of claim 35,
wherein a first microporous membrane permeability of the first microporous membrane is greater than a second microporous membrane permeability of the second microporous membrane, and
wherein a fourth microporous membrane permeability of the fourth microporous membrane is greater than a third microporous membrane permeability of the third microporous membrane.

37. The aqueous humor diffusion device of claim 36, wherein the first layer and the second layer are in a stacked configuration such that the first microporous membrane and the fourth microporous membrane are outermost membranes of the device body and the second microporous membrane and third microporous membrane are innermost membranes of the device body defining the reservoir.

38. The aqueous humor diffusion device of claim 34,
wherein the first microporous membrane has a first microporous membrane permeability, the second microporous membrane has a second microporous membrane permeability, the third microporous membrane has a third microporous membrane permeability, and the fourth microporous membrane has a fourth microporous membrane permeability,
wherein the second microporous membrane permeability is about the same as the third microporous membrane permeability, and the first microporous membrane permeability is about the same as the fourth microporous membrane permeability, and
wherein each of the second microporous membrane permeability and the third microporous membrane permeability are different from the first microporous membrane permeability and the fourth microporous membrane permeability.

39. The aqueous humor diffusion device of claim 34,
wherein the second and third microporous membranes are bonded to each other along peripheral edges of the first and second layers to define the reservoir and to dispose the reservoir between the second and third microporous membranes,
wherein the second and third microporous membranes are configured to resist tissue ingrowth,
wherein the first and fourth microporous membranes are configured to permit tissue ingrowth, and
wherein the second and third microporous membranes have an expanded state that is maintained adjacent to the peripheral edges of the first and second layers.

40. The aqueous humor diffusion device of claim 34, wherein the reservoir is configured to move between a collapsed state in which the second and third microporous membranes resist fluid flow therebetween and an expanded state in which fluid is allowed to flow between the second and third microporous membranes.

41. The aqueous humor diffusion device of claim 40, wherein fluid flow into the reservoir is directed from a proximal portion of the reservoir toward a periphery of chamber.

42. The aqueous humor diffusion device of claim 40,
wherein the reservoir has a reservoir proximal section that is configured to be positioned adjacent a reservoir port through which the fluid is received and a reservoir distal section that is positioned opposite of the reservoir proximal section, and
wherein during drainage of the fluid, the reservoir proximal section is configured to inflate before the reservoir distal section.

43. The aqueous humor diffusion device of claim 24, wherein the variable flow resistance corresponds to a rate of change in pressure with respect to flow rate over time.

44. The aqueous humor diffusion device of claim 43,
wherein the microporous material transitions from the hydrophobic state having a first flow resistance to a partially hydrophilic state having a second flow resistance and then to the hydrophilic state having a third flow resistance; and
wherein the first flow resistance is greater than both the second flow resistance and the third flow resistance, and the second flow resistance is greater than the third flow resistance.

45. The aqueous humor diffusion device of claim 24,
wherein the microporous material is configured to transition from the hydrophobic state to the hydrophilic state based on a wetting of the microporous material with the fluid, and
wherein the microporous material is configured such that wetting of an outer portion of the device body occurs before wetting of the reservoir.

46. A method for forming glaucoma drainage device that is implantable, the method comprising:
arranging a microporous material so as to form a device body with a reservoir defined therein, the reservoir being configured to receive and accumulate fluid; and
securing portions of the microporous material that forms the reservoir such that as fluid is accumulated in the reservoir the microporous material transitions from a hydrophobic state to a hydrophilic state within 30 days through wetting with body fluids while maintaining structural integrity of the microporous material as the fluid diffuses to tissue surrounding the device through the microporous material so as to provide a variable flow resistance as the microporous material transitions from the hydrophobic state to the hydrophilic state,
wherein the transition occurs without dissolution or disintegration of the microporous material.

47. The method of claim 46, wherein a first portion of the microporous material transitions from the hydrophobic state to the hydrophilic state within 3 days.

48. The method of claim 47, wherein a second portion of the microporous material different from the first portion transitions from the hydrophobic state to the hydrophilic state within 7 days.

49. The method of claim 46, wherein an entirety of the microporous material transitions from the hydrophobic state to the hydrophilic state within 30 days.

50. The method of claim 46, wherein in the hydrophobic state, the microporous material is opaque.

51. The method of claim 46, wherein in the hydrophilic state, the microporous material is transparent.

52. The method of claim 46, wherein the shunt body has a maximum thickness of no greater than 500 μm.

53. The method of claim 46, wherein in the hydrophobic state, a drop of water placed on a surface of the microporous material forms a contact angle of greater than 90 degrees with respect to the surface, and in the hydrophilic state, a drop of water placed on a surface of the microporous material forms the contact angle of less than 90 degrees with respect to the surface, wherein the transition from the hydrophobic state to the hydrophilic state constitutes a decrease in the contact angle by at least 10 degrees.

54. The method of claim 46, wherein the variable flow resistance is greater in the hydrophobic state than in the hydrophilic state.

55. The method of claim 46, wherein the microporous material is more translucent in the hydrophilic state than in the hydrophobic state due to refractive index matching between body fluids and the microporous material structure during the wetting process.

56. The method of claim 46,
wherein the reservoir receives the fluid through a port in the device body, and
wherein the method further comprises securing an intake conduit to the device body at the port, the intake conduit being configured to receive the drainage.

57. The method of claim 46,
wherein the one or more microporous materials comprise a first layer having a first microporous membrane bonded to a second microporous membrane and a second layer comprising a third microporous membrane bonded to a fourth microporous membrane, and
wherein securing portions of the one or more microporous materials comprises bonding the second microporous membrane to the third microporous membrane.

58. The method of claim 57,
wherein the second and third microporous membranes are bonded to each other along peripheral edges of the first and second layers to define the reservoir and to dispose the reservoir between the second and third microporous membranes,
wherein the second and third microporous membranes are configured to resist tissue ingrowth,
wherein the first and fourth microporous membranes are configured to permit tissue ingrowth, and
wherein the second and third microporous membranes have an expanded state that is maintained adjacent to the peripheral edges of the first and second layers.

59. The method of claim 57, wherein securing portions of the microporous material comprises refraining from bonding the first microporous membrane to the fourth microporous membrane.

60. The method of claim 57, wherein securing portions of the one or more microporous materials comprises arranging the first layer and the second layer in a stacked configuration such that the first microporous membrane and the fourth microporous membrane are outermost membranes of the device body and the second microporous membrane and third microporous membrane are innermost membranes of the device body.

61. A glaucoma drainage device for draining a fluid from an interior region of a human eye to an exterior region of the human eye, the glaucoma drainage device comprising:
a body having a continuous wall defining an internal reservoir within the body and a reservoir opening in the wall communicating with the internal reservoir; and
a conduit extending from the body by a conduit length, the conduit having opposing first and second ends defining a passage through the conduit extending between the opposing first and second ends, the conduit first end engaging the reservoir opening to provide a fluidic connection between the conduit second end and the reservoir, the conduit length being sufficient to dispose the conduit first end at the exterior region of the human eye and to dispose the conduit second end at the interior region of the human eye,
wherein at least a portion of the continuous wall has a wall portion composed of a microporous material, the wall portion having an internal side facing the reservoir and an opposing external side facing the exterior region of the human eye, the wall portion internal side low porosity surface extending an entirety of the wall portion internal side, the wall portion external side having alternating low porosity and high porosity surfaces, and
wherein the wall portion has an initial hydrophobic state that transitions to a final hydrophilic state within 30 days through wetting with body fluids while maintaining structural integrity of the microporous material when the fluid engages the wall portion, and
wherein the transition occurs without dissolution or disintegration of the microporous material.

62. The glaucoma drainage device of claim 61, wherein a first portion of the microporous material transitions from the hydrophobic state to the hydrophilic state within 3 days.

63. The glaucoma drainage device of claim 62, wherein a second portion of the microporous material different from the first portion transitions from the hydrophobic state to the hydrophilic state within 7 days.

64. The glaucoma drainage device of claim 61, wherein an entirety of the microporous material transitions from the hydrophobic state to the hydrophilic state within 30 days.

65. The glaucoma drainage device of claim 61, wherein in the hydrophobic state, the microporous material is opaque.

66. The glaucoma drainage device of claim 61, wherein in the hydrophilic state, the microporous material is transparent.

67. The glaucoma drainage device of claim 61, wherein the shunt body has a maximum thickness of no greater than 500 μm.

68. The glaucoma drainage device of claim 61, wherein in the hydrophobic state, a drop of water placed on a surface of the microporous material forms a contact angle of greater than 90 degrees with respect to the surface, and in the hydrophilic state, a drop of water placed on a surface of the microporous material forms the contact angle of less than 90 degrees with respect to the surface, wherein the transition from the hydrophobic state to the hydrophilic state constitutes a decrease in the contact angle by at least 10 degrees.

69. The glaucoma drainage device of claim 61, wherein the variable flow resistance is greater in the hydrophobic state than in the hydrophilic state.

70. The glaucoma drainage device of claim 61, wherein the microporous material is more translucent in the hydrophilic state than in the hydrophobic state due to refractive index matching between body fluids and the microporous material structure during the wetting process.

71. The glaucoma drainage device of claim 61, wherein the wall portion defines a wall portion thickness extending between the internal side and the external side, the wall portion thickness defining an internal region of the wall portion having a transition porosity that is between a porosity of the low porosity surface of the internal side and a porosity of the high porosity surface of the external side.

72. The glaucoma drainage device of claim 61, wherein the wall portion defines a wall portion thickness extending between the internal side and the external side, the wall portion thickness defining an internal region of the wall portion extending between the low porosity surface of the internal side and the low porosity surface of the external side, the internal region having an internal region porosity that is equal to porosities of the low porosity surfaces of the internal side and the external side.

73. The glaucoma drainage device of claim 61, wherein the wall portion defines a wall portion thickness extending between the internal side and the external side, the wall portion thickness defining an internal region of the wall portion extending between the low porosity surface of the internal side and the high porosity surface of the external side, the internal region having an internal region porosity that is equal to a porosity of the low porosity surface of the internal side.

74. The glaucoma drainage device of claim 61, wherein the wall portion defines a wall portion thickness extending between the internal side and the external side, the wall portion thickness defining an internal region of the wall portion extending between the low porosity surface of the internal side and the high porosity surface of the external side, the internal region having an internal region porosity that is equal to a porosity of the high porosity surface of the external side.

75. The glaucoma drainage device of claim 61, wherein the fluidic connection between the conduit second end and the reservoir further extends from the reservoir through the microporous material to provide a fluidic communication from the reservoir to the exterior region of the human eye.

76. The glaucoma drainage device of claim 75, wherein the fluidic communication defines a flow path through the microporous material.

77. The glaucoma drainage device of claim 76, wherein the flow path through the microporous material is in a direction that is directed away from the reservoir.

78. The glaucoma drainage device of claim 76, wherein the flow path through the microporous material proceeds from a microporous region having a low porosity to a microporous region having a high porosity.

* * * * *